United States Patent [19]
Tamagaki et al.

[11] Patent Number: 5,608,543
[45] Date of Patent: Mar. 4, 1997

[54] JOINT-PORTION PROCESSING DEVICE FOR IMAGE DATA FOR USE IN AN IMAGE PROCESSING APPARATUS

[75] Inventors: Akira Tamagaki, Soraku-gun; Tsutomu Taniguchi; Nobuyuki Ueda, both of Yamatokoriyama; Masami Oka, Osaka; Kenji Matsumoto, Yamatokoriyama; Fuminori Miyoshi, Nara, all of Japan

[73] Assignee: Sharp Kabushiki Kaisha, Osaka, Japan

[21] Appl. No.: 449,686

[22] Filed: May 24, 1995

Related U.S. Application Data

[62] Division of Ser. No. 153,897, Nov. 17, 1993, Pat. No. 5,452,105.

[30] Foreign Application Priority Data

Nov. 19, 1992 [JP] Japan .................................. 4-310328
May 7, 1993 [JP] Japan .................................. 5-106834
Jun. 16, 1993 [JP] Japan .................................. 5-145230

[51] Int. Cl.[6] .................................................. H04N 1/387
[52] U.S. Cl. ..................... 358/450; 358/451; 358/453; 382/284
[58] Field of Search ............................ 358/450–453, 358/448; 382/178, 199, 268, 284, 298; 395/139, 146; H04N 1/387

[56] References Cited

U.S. PATENT DOCUMENTS

| | | |
|---|---|---|
| 4,272,756 | 6/1981 | Kakumoto et al. . |
| 4,428,077 | 1/1984 | Shimada et al. ........................... 382/44 |
| 4,504,969 | 3/1985 | Suzuki et al. ............................. 382/284 |
| 4,819,083 | 4/1989 | Kawai et al. . |
| 4,903,311 | 2/1990 | Nakamura ................................ 382/178 |
| 4,980,706 | 12/1990 | Someya .................................... 358/453 |
| 5,018,023 | 5/1991 | Kubota . |
| 5,018,026 | 5/1991 | Takada ..................................... 358/453 |
| 5,140,647 | 8/1992 | Ise et al. ................................... 382/284 |
| 5,222,158 | 6/1993 | Takasaki et al. ........................... 382/44 |
| 5,377,330 | 12/1994 | Kubota et al. ............................. 382/284 |
| 5,424,853 | 6/1995 | Miyaza . |

FOREIGN PATENT DOCUMENTS

| | | |
|---|---|---|
| 0163841 | 12/1985 | European Pat. Off. . |
| 0267456 | 5/1988 | European Pat. Off. . |
| 0451579 | 10/1991 | European Pat. Off. . |
| 0508121 | 10/1992 | European Pat. Off. . |
| 56-33752 | 8/1981 | Japan . |
| 331567 | 11/1992 | Japan . |
| 9312501 | 6/1993 | WIPO . |

OTHER PUBLICATIONS

Image Processing Apparatus, Eto et al., 1994.

Primary Examiner—Kim Vu

[57] ABSTRACT

An image processing apparatus includes a joining-portion processing section for combining partial images that have been read in a divided manner. Focused on partial document data predeterminately specified among a plurality of partial document data stored in an image memory, the joint-portion processing section performs a recognizing operation on the joints, a positioning operation and other operations beginning with the proximity of the specified partial document data. The partial images are then combined together to form one complete image. For example, in the case of copying an original document, which is of a size too large to be copied in one operation, on one sheet of paper in a reduced manner, it becomes possible to eliminate time consuming tasks such as trimming and pasting of the partial documents as well as calculating of the reduction rate. Thus, the efficiency of the operation is improved, and by specifying the partial document data from which the operation is started, it is possible to join the partial images accurately irrespective of the order of inputting the partial documents.

15 Claims, 38 Drawing Sheets

F I G. 10
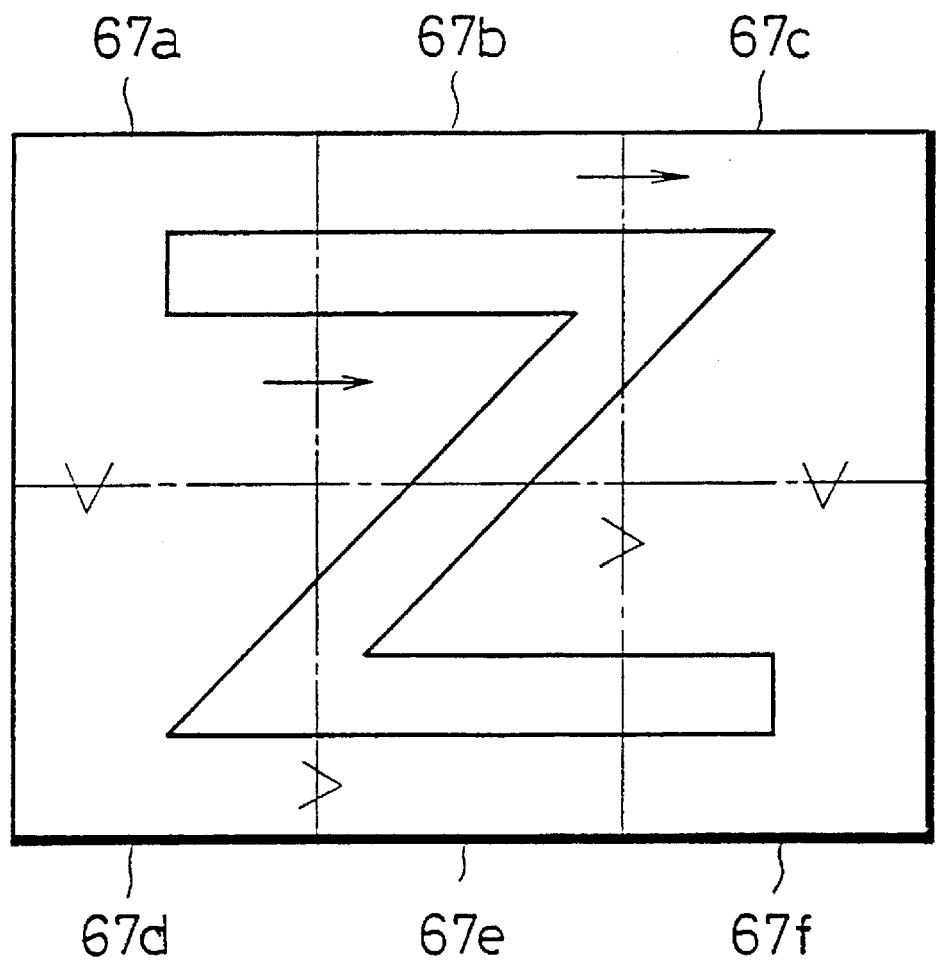

FIG. 21

| a₁ | b₁ |
|---|---|
| IMAGE a | IMAGE b |
| a₃   a₄ | b₃   b₄ |
| a₂ | b₂ |
| c₁ | d₁ |
| IMAGE c | IMAGE d |
| c₃   c₄ | d₃   d₄ |
| c₂ | d₂ |

FIG.26(a)　　FIG.26(b)　　FIG.26(c)
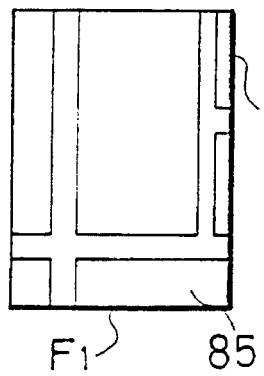
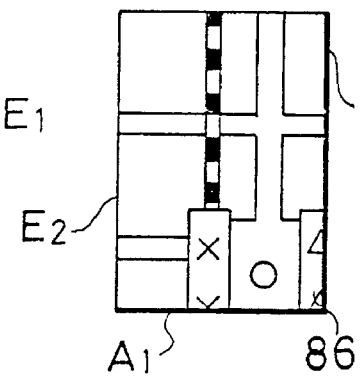
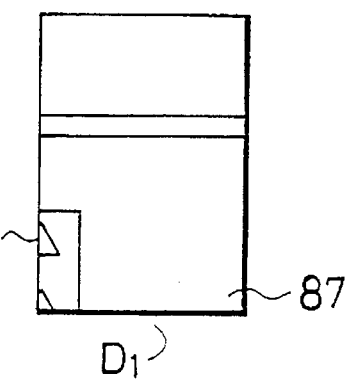
FIG.26(d)　　FIG.26(e)　　FIG 26(f)
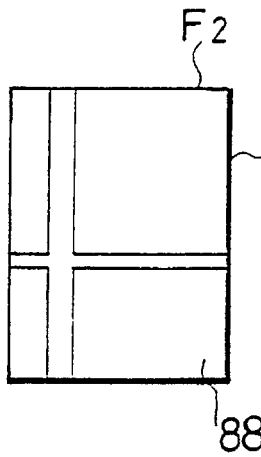
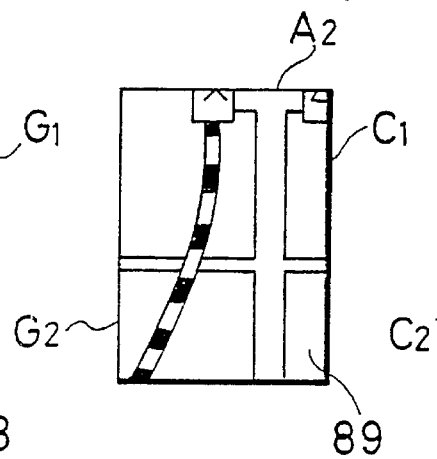
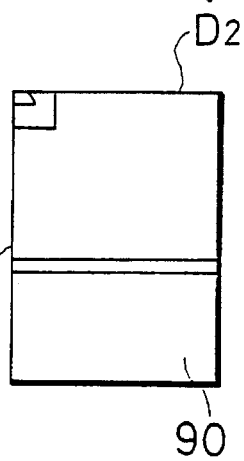

FIG. 41 (a)
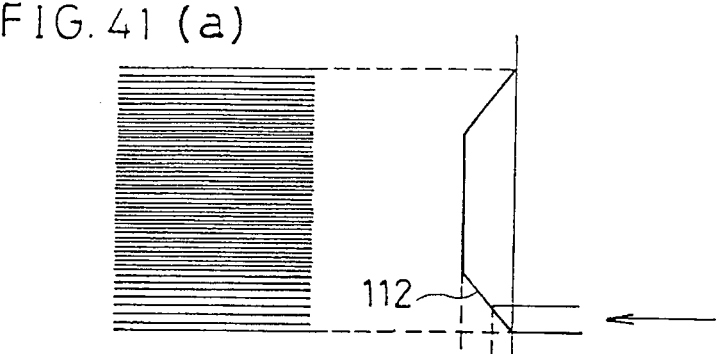
CHANGE IN DENSITY
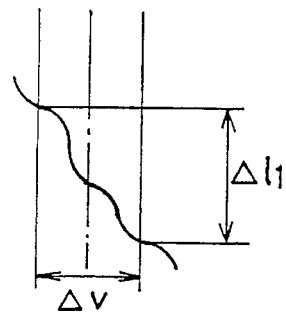
FIG. 41 (b)
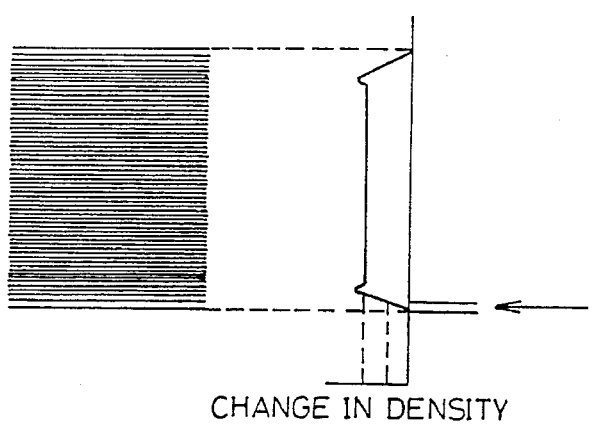
CHANGE IN DENSITY
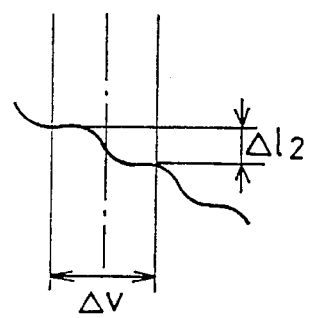
FIG. 41 (c)
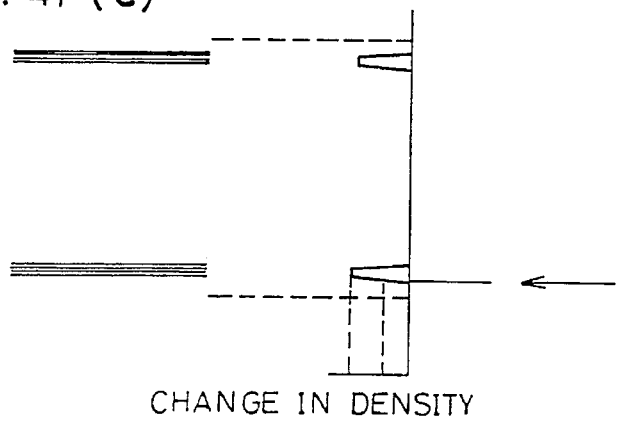
CHANGE IN DENSITY
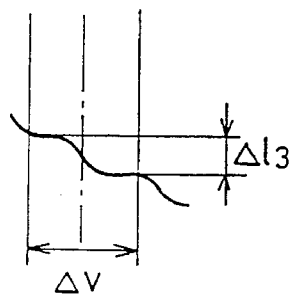

F I G . 42
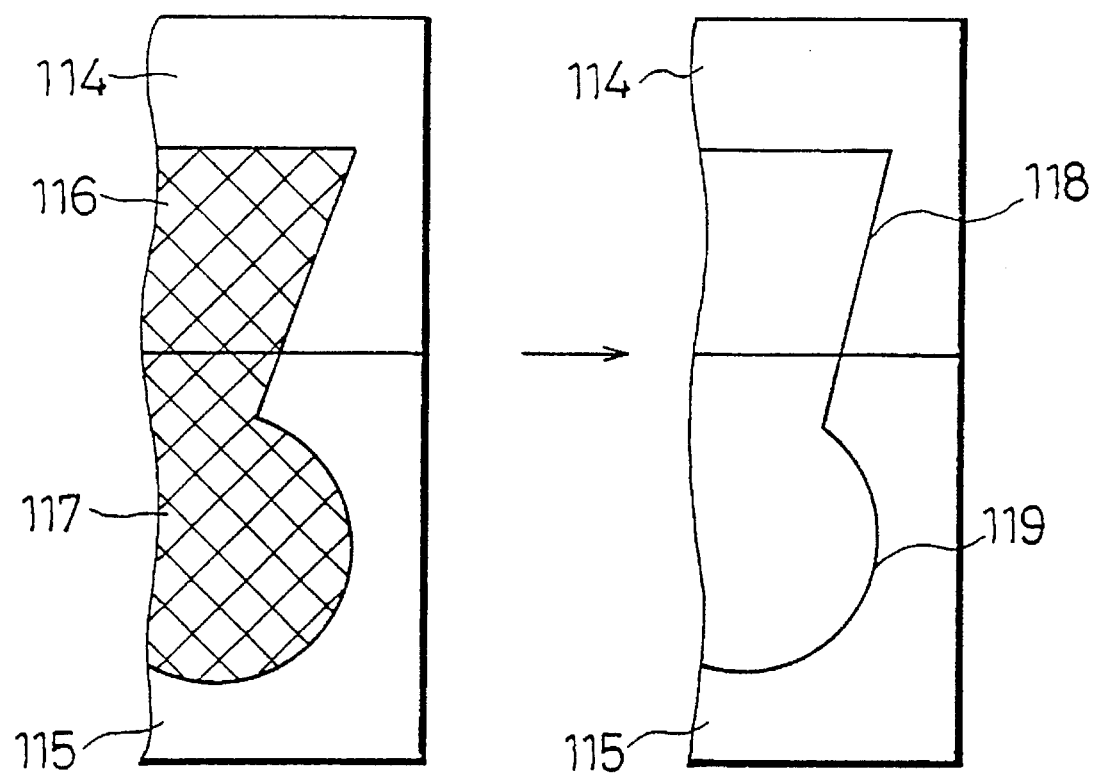

JOINT-PORTION PROCESSING DEVICE FOR IMAGE DATA FOR USE IN AN IMAGE PROCESSING APPARATUS

This application is a divisional of application Ser. No. 08/153,897, filed on Nov. 17, 1993, now U.S. Pat. No. 5,452,105 the entire contents of which are hereby incorporated by reference.

FIELD OF THE INVENTION

The present invention relates to image processing apparatuses, such as copying machines, scanners, facsimiles, and printers, which are capable of automatically joining images, which have been read in a divided manner, and forming the joined image on a recording medium of a desired size.

BACKGROUND OF THE INVENTION

In order to combine a plurality of images together and to record the combined image on one sheet of paper, an information recording apparatus, such as disclosed in Japanese Examined Patent Publication No. 33752/1981 (Tokukoushou 56-33752), is employed. In this apparatus, image data for each page is stored as each independent data. For example, if image data of 4 pages of A-4 size are respectively stored as independent data, the information recording apparatus is capable of reducing the stored image data respectively and combining them together so as to form the combined image on one sheet of paper of A-4 size.

Here, in the case of applying the above-mentioned operation to an original document of a large size which cannot be read through one complete scanning, the image of the original document is read in a divided manner. These divided images are stored as divided image data including of a plurality of pages. However, in the above-mentioned apparatus, since the image data are stored as individual data for respective pages, there is no correlation between those individual data for respective pages. For this reason, even if the divided image data are reduced for the respective pages, and combined together, the divided images cannot be joined together into the original form.

Therefore, in the case of copying an original document having a size larger than, for example, the document platen on one sheet of paper of a desired size, the following method is used:

(1) An original document is divided into a plurality of regions, and those regions are respectively reduced and copied to form divided original documents;

(2) The divided original documents are trimmed and pasted to form one sheet of original document;

(3) The original document thus joined together is again copied.

However, in such a method including the above (1) through (3), troublesome and time consuming tasks are required in positioning and pasting the divided original documents manually, and in calculating a reduction rate in accordance with the size of copy sheet whereon a complete copied image is formed. Further, even if the reduction rate is set uniformly in obtaining the divided original documents, slight errors are inevitable in the reduction rates for the divided original documents. Therefore, offsets might be produced at the joints when those divided original documents are joined together.

Meanwhile, Japanese Laid-Open Patent Publication No. 331567/1992 (Tokukaihei 4-331567) has disclosed a digital image forming apparatus wherein in the case of copying an original document that is larger than the copiable size, a plurality of image data that have been individually read are combined and compiled, and are reduced into a copiable size.

In this apparatus, if the copying operation is performed on an original document that is, for example, twice as large as the readable size, the original document is divided into two equal portions, and the portions are successively read. Then, the image data thus read are reduced, if necessary. In this case, upon reading the image data, the original document to be read later is placed on the document platen in a state where it is rotated by 180 degrees with respect to the original document that was read previously. Then, the image data that was read firstly is rotated by 90 degrees, while the image data that was read secondly is rotated by 90 degrees in the direction opposite to the first rotation, and both of the image data are combined together. Thus, a combined image is formed on one sheet of paper. Therefore, with such a digital image forming apparatus, the aforementioned troublesome and time consuming tasks are eliminated, and even in the case of copying an original document larger than the size of the document platen, a copied image is formed on one sheet of paper of a desired size.

However, in such an digital image forming apparatus, since the image data are merely reduced, and merely rotated in the predetermined directions, offsets might be produced at the joints in a combined image, thereby causing an adverse effect on picture quality. Further, in the case where divided original documents of an image come up to a number of pages, sufficient attention should be paid to the orientations of the original documents or to other factors when they are placed on the document platen. This raises a problem related to low efficiency in operation.

SUMMARY OF THE INVENTION

It is the first objective of the present invention to provide an image processing apparatus which is capable of joining images that have been read in a divided manner accurately in a short time, without causing any adverse effects on the efficiency of operation.

It is the second objective of the present invention to provide an image processing apparatus which is capable of reducing the amount of information by which a joining operation is performed.

In order to achieve the first objective, the image processing apparatus of the present invention comprises:

(1) an input means for reading an image of an original document;

(2) a storage means for storing a plurality of partial images as respective partial document data, the partial images having been read by the input means in a divided manner; and (3) a joint-portion processing means for recognizing reference data in response to an output of the input means, the reference data providing a key by which joints of the partial document data that have been stored in the storage means are retrieved, for recognizing the joints using the recognized reference data as a key, and for positioning the respective partial document data in accordance with the recognized joints.

With the above arrangement, the joint-portion processing means recognizes reference data in response to the output of the input means, and further recognizes the joints of the partial document data that have been stored in the storage means by using the reference data as a key. Then, the joint-portion processing means positions the partial document data in accordance with the recognized joints, and joins those partial document data, thereby forming document data that correspond to the image of the original document.

More specifically, such reference data, which provide a key for detecting the joints, include: for example, specific partial document data that are predeterminately specified; partial document data that are first stored in the storage means; data indicating a layout of the partial document data that are set in accordance with the storage sequence of the partial document data and a divided condition of the image; marks that are added to the partial document data so as to indicate the joints; and numbers that are added to the partial document data so as to determine the layout of the partial document data.

Therefore, in the case of using an original document that has to be read by the input means in a divided manner due to, for example, its large size or other reasons, troublesome and time consuming tasks such as trimming and pasting the divided images are eliminated. This thereby improves efficiency of the operation. Further, joints are recognized from the partial document data using these reference data as a key, and the joining operation is carried out in accordance with the joints. Therefore, even in the case where an image is divided into a number of portions, the joining operation of the divided images is executed accurately in a short time.

Moreover, a variable magnification means for variably magnifying the joined document data into a desired size may be added to the above arrangement. Thus, the joined image is readily reduced and formed on a recording medium of a desired size without the necessity of time consuming calculations on reduction rate.

Also, the image processing apparatus of the present invention is provided with at least the following means in order to achieve the first objective:

(1) an input means for reading an image of an original document;

(2) a storage means for storing a plurality of partial images as respective partial document data, the partial images having been read by the input means in a divided manner; and (3) a joint-portion processing means for obtaining specific image data containing features from the partial document data stored in the storage means by retrieving the partial document data stored in the storage means, and for selecting two partial document data in the order of their increasing number on the specific image data, comparing the specific image data each other, recognizing joints at which the specific image data coincide with each other, and positioning the respective partial document data in accordance with the recognized joints.

With the above arrangement, the joint-portion processing means obtains the specific image data containing features from the partial document data by retrieving the partial document data stored in the storage means, and recognizes joints of the partial document data in the order of their increasing number on the specific image data obtained. In other words, the two partial document data, which have virtually the same amount of specific image data, have a high probability of coincident specific image data. Therefore, by performing the recognition of specific image data in accordance with the above order, it becomes easier to find sides at which their specific image data coincide with each other, even in the case where the sides contain few specific image data and it would be difficult to find joints from the sides.

Therefore, with the arrangement where the sequence of the joining operation is set in accordance with the amount of specific image data containing features, the joints are recognized in a short time and the layout of the partial document data is easily determined without paying any particular attention to factors such as the sequence of inputting documents and the orientations of the documents upon reading. This occurs in the case of performing the joining operation on, for example, a number of original documents or on original documents having complicated images. As a result, it becomes possible to carry out the joining operation accurately and quickly, to improve the efficiency of operation in joining images, and to prevent offsets that would occur at the joints. This ensures high quality in the images.

Also, the image processing apparatus of the present invention is provided with at least the following means in order to achieve the first objective:

(1) an input means for reading an image of an original document;

(2) a storage means for storing a plurality of partial images as respective partial document data, the partial images having been read by the input means in a divided manner;

(3) a document-color recognition means for forming color data corresponding to the respective partial document data by recognizing the colors of the images read by the input means; and (4) a joint-portion processing means for recognizing joints located between the partial document data stored in the storage means by retrieving the pattern of colors in the partial document data while comparing the color data formed in the document-color recognition means with the partial document data stored in the storage means, and for positioning the respective partial document data in accordance with the recognized joints.

With the above arrangement, the colors of the images read by the input means are recognized by the document-color recognition means. Further, the joint-portion processing means recognizes the joints by performing the retrieving operation while comparing the color data formed in the document-color recognition means with the respective partial document data, thereby joining the partial document data together.

Therefore, even in the case of performing the joining operation on, for example, a number of original documents or on original documents having complicated images, a plurality of partial images are joined together accurately and quickly without paying any particular attention to factors such as the sequence of inputting documents and the orientations of the documents upon reading. Thus, it becomes possible to improve the efficiency of the operation and to enhance the quality of the images.

Moreover, in order to achieve the first and second objectives, the image processing apparatus of the present invention is provided with at least the following means:

(1) an input means for reading an image of an original document;

(2) a storage means for storing a plurality of partial images as respective partial document data, the partial images having been read by the input means in a divided manner; and (3) a joint-portion processing means for recognizing joints located between the partial document data stored in the storage means and for extracting image data that lie in a direction orthogonal to the joints of the partial document data and positioning the respective partial document data in accordance with the image data that lie in a direction orthogonal to the joints.

With the above arrangement, the joint-portion processing means recognizes the joints from the partial document data stored in the storage means, and positions the respective partial document data. In performing this positioning, the image data that lie in a direction orthogonal to the joints of the partial document data are extracted, and the positioning is performed so that the image data that lie in the orthogonal direction coincide with each other. This makes the change of extracted image data clearer in the positioning as compared to the case of extracting image data that have slant angles with respect to the respective joints and performing the positioning by shifting the extracted image data in a parallel or perpendicular direction.

Therefore, since the positioning of the partial document data is carried out more effectively by the use of less image data, it becomes possible to reduce the amount of information, and to shorten the time of the joining operation. Thus, the original documents read in a divided manner are joined together more accurately without causing any adverse effects on the efficiency of the operation.

Also, in order to achieve the first and second objectives, the image processing apparatus of the present invention is provided with at least the following means:

(1) an input means for reading an image of an original document;

(2) a storage means for storing a plurality of partial images as respective partial document data, the partial images having been read by the input means in a divided manner;

(3) a black-document discrimination means for discriminating whether the partial document data in question stored in the storage means are mono-color document data or color document data; and (4) a joint-portion processing means for recognizing joints located between the partial document data stored in the storage means and for converting the color document data that have been discriminated by the black-document discriminating means into mono-color document data and positioning the respective partial document data in accordance with the converted mono-color document data.

With the above arrangement, the joint-portion processing means recognizes the joints from the partial document data stored in the storage means, and positions the respective partial document data so that the respective images are smoothly joined together. In performing the positioning of the partial document data, a discrimination is first made as to whether the partial document data in question stored in the storage means are mono-color document data or color document data. Then, if the discrimination is made as color document data, the color document data are converted into mono-color document data.

Therefore, since the positioning of the partial document data is carried out based on only the mono-color document data, it becomes possible to reduce the amount of information, and to shorten the time of the joining operation, as compared to the case where a decision is made for each of the colors, red, green and blue, in positioning the color document data.

Therefore, since the positioning of the partial document data is carried out more effectively by the use of less image data, it becomes possible to reduce the amount of information, and to shorten the time of the joining operation. Thus, the original documents read in a divided manner are joined together more accurately without causing any adverse effects on the efficiency of the operation.

Also, in order to achieve the first and second objectives, the image processing apparatus of the present invention is provided with at least the following means:

(1) an input means for reading an image of an original document;

(2) a storage means for storing a plurality of partial images as respective partial document data, the partial images having been read by the input means in a divided manner;

(3) a joint-portion processing means for recognizing joints located between the partial document data stored in the storage means, and for enhancing the image data so that the outlines of images located in the proximity of the joints are made distinct, and for positioning the respective partial document data in accordance with the enhanced image data.

With the above arrangement, the joint-portion processing means recognizes the joints from the partial document data stored in the storage means, and positions the respective partial document data so that the respective images are smoothly joined together. Here, in the case of using original documents of half-tone such as photographs wherein outlines of images are in a diffused state, images obtained in the proximity of the joints tend to be obscure upon positioning the partial document data.

In order to solve this problem, an image enhancing operation, such as formation of outline data by emphasizing the density of edges or by means of a differential processing, is performed. This eliminates the diffused state of the images, and makes the outlines of the images clearer. Thus, it becomes possible to perform the positioning of the partial document data more easily as well as more accurately based on the enhanced image data.

Therefore, since the positioning of the partial document data is carried out more effectively by the use of less image data, it becomes possible to reduce the amount of information, and to shorten the time of the joining operation. Thus, the original documents read in a divided manner are joined together more accurately without causing any adverse effects on the efficiency of the operation.

For a fuller understanding of the nature and advantages of the invention, reference should be made to the ensuing detailed description taken in conjunction with the accompanying drawings.

BRIEF DESCRIPTION OF THE DRAWINGS

FIG. 10 is a schematic drawing which shows one example of the partial document data whereon a plurality of marks are put, in the case of performing the operation shown in the flow chart of FIG. 8.

FIG. 21 is a schematic drawing which shows a layout of four images on which the operation shown in the flow chart of FIG. 15 is performed.

FIGS. 26(a) through 26(f) are plan views showing original documents on which the joining operation is carried out.

FIG. 41(a) is a schematic drawing which explains the change in density on partial document data as well as the positional variation on the image in relation to the density before the application of an image-enhancing process; FIG. 41(b) is a schematic drawing which explains the change in density on the partial document data as well as the positional variation on the image in relation to the density after the image-enhancing process has been made by highlighting the edges; and FIG. 41(c) is a schematic drawing which explains the change in density on the partial document data as well as the positional variation of the image in relation to the density after the image-enhancing process has been made by means of the differential processing.

FIG. 42 is a schematic drawing which shows a formation of outline data by applying the image-enhancing process to the document data by means of the differential processing.

DESCRIPTION OF THE EMBODIMENTS

[EMBODIMENT 1]

Referring to FIGS. 1 through 5, the following description will discuss one embodiment of the present invention.

Figure 2:
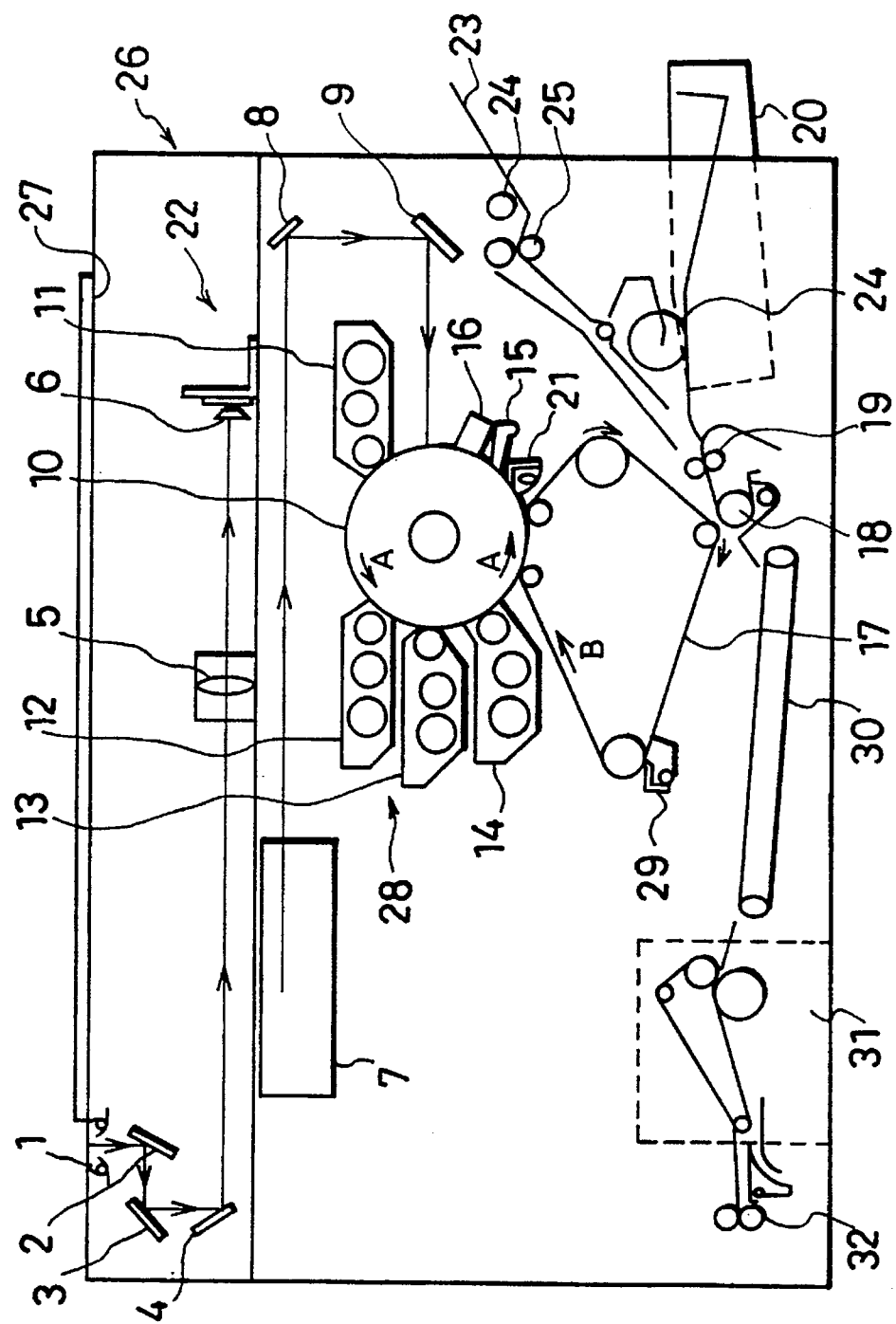
FIG. 2 is an explanatory drawing that schematically shows the construction of the digital copying machine.

As illustrated in FIG. 2, a digital copying machine, which is installed in an image processing apparatus in accordance with the present embodiment, is provided with a document platen 27 made of a hard glass plate, etc. that is installed on the upper surface of a copying machine main body 26. Below the document platen 27 is disposed a scanner unit (input means) 22. The scanner unit 22 is constituted of: a lamp unit 1; mirrors 2, 3 and 4; a lens unit 5; and a CCD (Charge Coupled Device) sensor 6. A reflected light beam, which is obtained by irradiating a document (not shown) placed on the document platen 27 by the lamp unit 1, is directed to the light-receiving face of the CCD sensor 6 through the mirrors 2, 3 and 4 and the lens unit 5, and detected therein as electric signals.

A laser driver unit 7, which has a semiconductor laser, a polygon mirror and an f-θ lens, is installed below the scanner unit 22. Image data of the document, which are detected by the CCD sensor 6 as the electric signals, are temporarily stored in an image memory (storage means) 43 installed in the image processing apparatus (see FIG. 1), which will be described later. After having been subject to predetermined processing in the image processing apparatus, the image data are sent to the laser driver unit 7. The laser driver unit 7 projects a laser beam from the semiconductor laser in response to document data inputted thereto. The laser beam is diffracted by the polygon mirror in a constant angular velocity, and the laser beam that has been subjected to the diffraction in the constant angular velocity is corrected by the f-θ lens so that it is further diffracted in a constant angular velocity on a photoreceptor drum 10.

A laser beam released from the laser driver unit 7 is reflected by the mirrors 8 and 9 that are disposed in the light path, and projected onto the photoreceptor drum 10, thereby forming an electrostatic latent image on the photoreceptor drum 10. The photoreceptor drum 10 is capable of rotating in the direction of arrow A as shown in FIG. 2. On the periphery of the photoreceptor drum 10, are disposed a charger 16 for charging the photoreceptor drum 10 so as to impart a predetermined voltage to its surface prior to an exposure executed by laser driver unit 7. Further, from the charger 16 along the rotation direction of the photoreceptor drum 10, are installed in the following order: a developing device 28, a transferring belt 17, a cleaning device 21, an electrostatic eliminating lamp 15, etc.

The developing device 28 includes a black developer vessel 11, a yellow developer vessel 12, a magenta developer vessel 13, and cyan developer vessel 14, and those developer vessels 11 through 14 respectively house toners having corresponding colors. The developing device 28 supplies toner onto the electrostatic latent image on the photoreceptor drum 10 such that a toner image is formed thereon.

The transferring belt 17, which is provided in the form of an endless belt, is installed so as to move in the direction of arrow B in the drawing, and one portion of the transferring belt 17 is pressed against the photoreceptor drum 10 such that the toner image on the photoreceptor drum 10 is transferred thereonto. After the tone image has been transferred, the residual toner on the photoreceptor drum 10 is removed therefrom by the cleaning device 21. Further, prior to the next charge, the residual electric potential on the photoreceptor drum 10 is eliminated by the electrostatic eliminating lamp 15.

On the paper-feeding side with respect to the transferring belt 17, are installed a resist roller 19, a feeding cassette 20, and a feeding tray 23. In the proximity of the feeding cassette 20 and the feeding tray 23, are installed a feeding roller 24, a transporting roller 25, etc. Copy sheets stored inside the feeding cassette 20 or on the feeding tray 23 are supplied onto the transferring belt 17 at predetermined intervals by a resist roller 19.

Below the transferring belt 17, is installed a transferring roller 18 which presses a copy sheet sent thereto from the resist roller 19 against the transferring belt 17, and allows the toner image on the transferring belt 17 to be transferred onto the copy sheet.

On the paper-discharging side with respect to the transferring belt 17, are installed a conveyer belt 30, a fixing device 31 and a discharge roller 32. A copy sheet whereon the toner image has been transferred is transported to the fixing device 31 by the conveyer belt 30, and the toner image is fused onto the copy sheet by heat. The copy sheet whereon the toner image has been fused by heat is discharged outside the copying machine main body 26 by a discharge roller 32.

In the above arrangement, a color-copy (3 color copy) operation is carried out in the following sequence. First, the charger 16 uniformly charges the surface of the photoreceptor drum 10, and the scanner unit 22 executes the first scanning. The document data detected by the CCD sensor 6 are processed in the image processing section, and are released from the laser driver unit 7 as a laser beam representative of yellow data. The surface of the photoreceptor drum 10 is exposed by the laser beam, and a electrostatic latent image for yellow-use is formed on the exposed portion of the photoreceptor drum 10. Then, yellow toner is supplied to the electrostatic latent image within the image region from the yellow developer vessel 12, and a yellow toner image is thus formed.

Next, the yellow toner image is transferred onto the transferring belt 17 that is pressed against the photoreceptor drum 10. At this time, although some toner that has not been consumed in the transferring process remains on the surface of the photoreceptor drum 10, the residual toner is scraped off by the cleaning device 21. Moreover, the electrostatic eliminating lamp 15 eliminates the residual charge on the surface of the photoreceptor drum 10.

After completion of the above processes, the charger 16 again charges the surface of the photoreceptor drum 10 uniformly, and the scanner unit 22 executes the second scanning. The document data are processed in the image processing section, and are released as a laser beam representative of magenta data. The surface of the photoreceptor drum 10 is exposed by the laser beam, and an electrostatic latent image for magenta-use is formed on the exposed portion of the photoreceptor drum 10. Then, magenta toner is supplied to the electrostatic latent image from the magenta developer vessel 13, and a magenta toner image is thus formed. Thereafter, this toner image is transferred onto the transferring belt 17 so as to be superimposed on the former yellow toner image. After the cleaning device 21 and the electrostatic eliminating lamp 15 have carried out the same processes as described earlier, the charger 16 again charges the surface of the photoreceptor drum 10 uniformly.

Then, the scanner unit 22 executes the third scanning, and an electrostatic latent image for cyan-use is formed by exposing the photoreceptor drum 10 with a laser beam representative of cyan data. Then, cyan toner is supplied to the electrostatic latent image from the cyan developer vessel 14, and a cyan toner image is thus formed. Thereafter, this cyan toner image is transferred onto the transferring belt 17 so as to be finally superimposed on the former toner images.

A complete toner image on the transferring belt 17, which has been formed by superimposing three toner images, is transferred onto a copy sheet, and the complete toner image is fused onto the copy sheet by heat. Thereafter, the copy sheet is discharged out of the apparatus by the discharge roller 32.

The sequence of processes described above is a sequence for carrying out a three-color copying operation. In the case of a four-color copying operation, a process using black toner in the black developer vessel 11 is added to the above-mentioned sequence. In the case of a mono-color copying operation, black toner is supplied to the electrostatic latent image from the black developer vessel 11, and the black toner image thus formed is transferred onto a copy sheet through the transferring belt 17.

Figure 1:
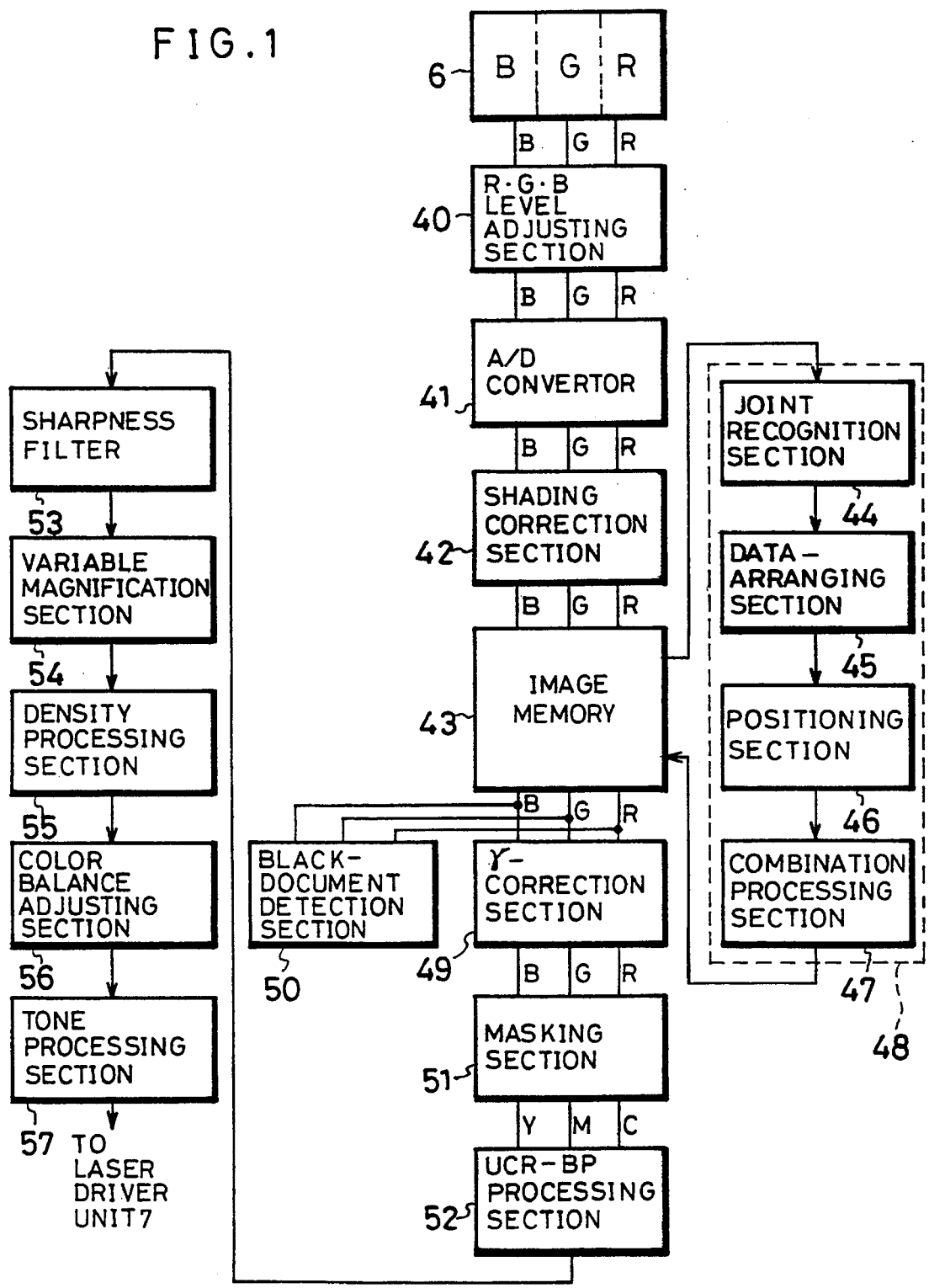
FIG. 1 is a block diagram showing a construction of an image processing system that is installed in a digital copying machine in one embodiment of the present invention.

Referring to FIG. 1, the following description will discuss the construction, functions, etc. of the image processing section for suitably processing the image data read by the CCD sensor 6 and for releasing the data to laser driver unit 7.

As shown in FIG. 1, the image processing section, which executes color reproduction according to the colors of a document and a joining operation on partial document data that have been obtained by reading an image in a divided manner as a plurality of partial images, is constituted of a R.G.B level-adjusting section 40, an A/D convertor 41, a shading correction section 42, an image memory 43, a joint-portion processing section (joint-portion processing means) 48, a γ correction section 49, a black-document detection section 50, a masking section 51, a UCR(Under Color Removal)-BP(Black Print) processing section 52, a sharpness filter 53, a variable magnification section (variable magnification means) 54, a density processing section 55, a color-balance adjusting section 56, tone processing section 57, etc.

In the image processing section, analog signals, that being, partial document data of R, G, B obtained from the CCD sensor 6, are compensated for their dispersions between R, G, B due to the respective sensors, and are then converted into digital signals in the A/D convertor 41. Thereafter, the partial document data are subjected to a shading correction for correcting variations in sensitivity of the sensors for each picture element, unevenness in brightness of the lens, etc. in the shading correction section 42, and are temporarily stored in the image memory 43.

In this case, if a joining mode, which will be described later, is specified, a plurality of documents that are to be joined for their images are successively scanned. Thereafter, partial images on the respective documents are separately stored in the image memory 43 as respective partial document data. The partial document data are sent from the image memory 43 to the joint-portion processing section 48.

The joint-portion processing section 48 includes a joint recognition section 44, a data-arranging section 45, a positioning section 46, and a combination processing section 47. The partial document data inputted to the joint-portion processing section 48 are first sent to the joint recognition section 44 where the joints of the documents are recognized, and are then sent to the data-arranging section 45 where the corresponding joints are arranged side by side with each other. Successively, the partial document data are sent to the positioning section 46 where positioning is made so that images located at the joints coincide with each other, and are then sent to the combination processing section 47 where they are combined together.

After completion of the processing in the joint-portion processing section 48, the document data are again inputted to the image memory 43. Here, as to the sequence of the operations in the above joint-portion processing, its detailed explanation will be given later.

Together with data released from the black-document detection section 50 for making a discrimination between mono-color copy and color copy, the document data released from the image memory 43 are inputted to the γ-correction section 49 where a γ-correction is executed so as to adjust contrast and brightness. Successively, the data of R, G, B, which have been subjected to the γ-correction, are converted into data of C, M, Y (Cyan, Magenta, Yellow) by executing suitable calculations in the masking section 51. In the UCR-BP processing section 52, the C, M, Y data of the document are subjected to the UCR processing for removing grey components from toners of three colors, C, M, Y, and for replacing them with black toner, as well as subjected to the BP processing for adding black toner to the toners of three colors. Thus, $B_K$ (black) data are added to the C, M, Y data of the document.

The sharpness filter 53 emphasizes the sharpness of the $C.M.Y.B_K$ data of the document. Further, the variable magnification section 54 and the density processing section 55 execute suitable processing on the subsequent data so as to impart a specified size and density to the image. The color-balance adjusting section 56 and the tone processing section 57 respectively execute the balance adjustments and tone processing on the respective colors, and the subsequent data are inputted to the laser driver unit 7.

In the digital copying machine of the present embodiment which is provided with the image processing section having the above arrangement, one document which contains the most outstanding features or which forms the center of the image is preliminarily specified among a plurality of documents whose images are to be joined together, and the images are joined together efficiently by using the specified document as the key.

Figure 3:
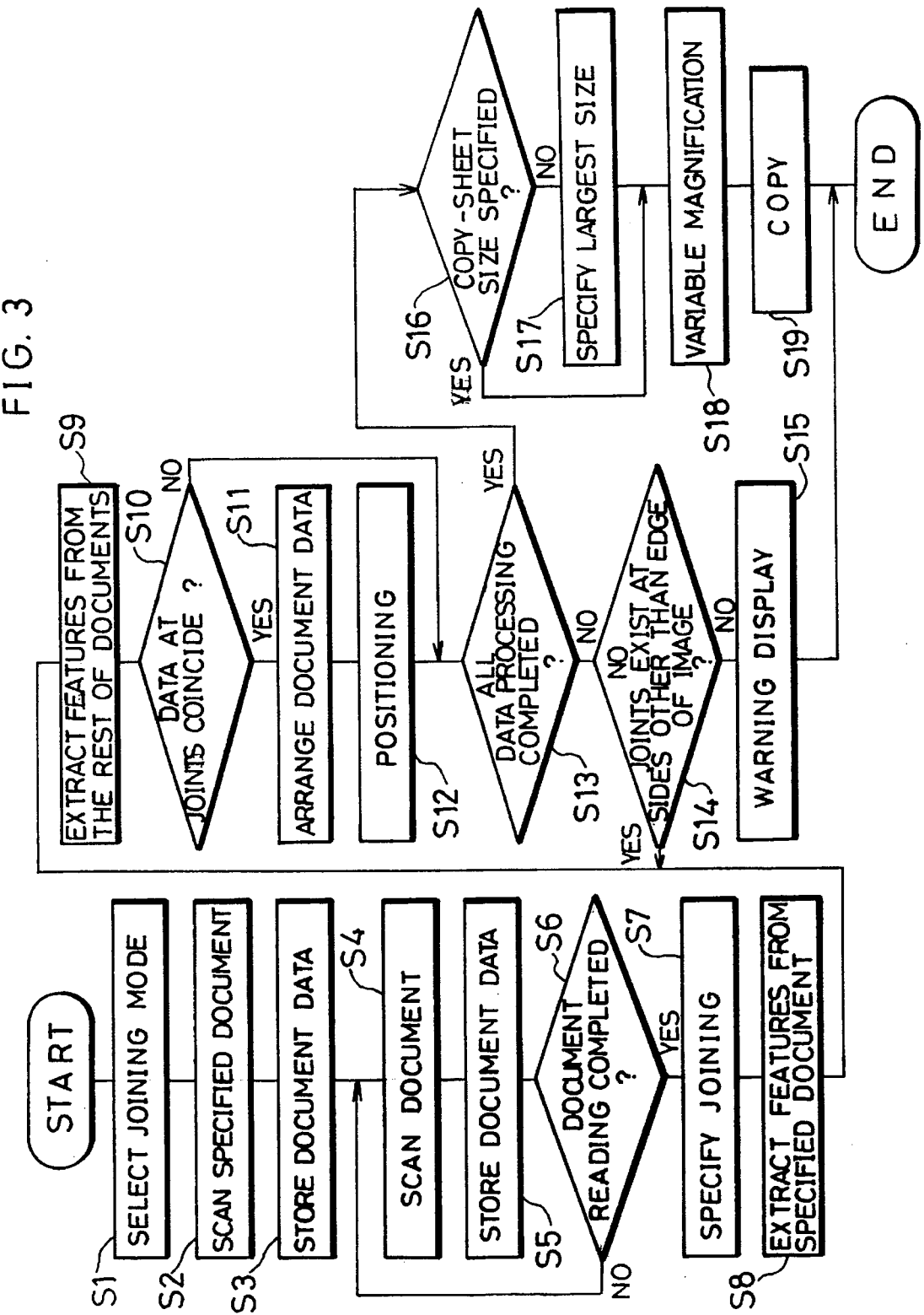
FIG. 3 is a flow chart showing the sequence of processes that are carried out during a joining operation on partial document data in the digital copying machine.

Referring to the flow chart of FIG. 3, an explanation will be given of the sequence of processes that are carried out in the joining operation.

Firstly, when a joining mode is selected through an operation panel, not shown (S1), a specified document that has been preliminarily selected is scanned (S2). The partial document data read through the CCD sensor 6 are stored in the image memory 43 (S3) after having been subjected to the predetermined processing. Successively, the rest of the documents other than the specified document are scanned (S4), and the partial document data read through the CCD sensor 6 are stored in the image memory 43 after having been subjected to the predetermined processing (S5).

These scanning process for the documents and storing process for the partial document data (S4 and S5) are repeated until a judgement is made at S6 that the reading operation of the documents has been completed. In this manner, information for discriminating the partial document data of the specified document from those of the other documents is inputted by storing the specified document data of the specified document at the beginning.

After completion of the reading of the documents, when a joining operation is instructed (S7), features on the specified document are extracted by retrieving data corresponding to predetermined lines from the edge of the partial document data of the specified document and recognizing particular lines and characters within the retrieving region in the joint recognition section 44 (S8). Further, in the same manner, features are extracted from the rest of the documents that were read after the specified document (S9). Then, the features extracted from the rest of the partial document data are compared with the features extracted from the partial document data of the specified document, and if there is a portion where those features coincide with each other, it is judged that a coincidence of data is found between joints of the specified document and the rest of the documents (S10). Successively, the data arranging section 45 arranges the corresponding partial document data so that the edges of the partial document data forming the coincident joints are aligned side by side with each other (S11).

Next, in the positioning section 46, a check is made to find the coincidence of data by shifting the other partial document data in the main scanning direction or in the sub scanning direction that is orthogonal to the main scanning direction while maintaining the specified document data in a fixed state. Thus, the positioning is carried out so that both of the data are set at a position where images between the joints are connected most smoothly (S12). Thereafter, in the combination-processing section 47, the partial document data thus positioned are combined together. Additionally, upon carrying out the above feature-extracting operation, if there is a side having no image data among the edge portions of the partial document data, this side is assumed to form an edge in an image after completion of the joining operation. Then, the rest of sides are successively positioned in relation to the other partial document data.

After completion of the positioning, a judgement is made as to whether all the data processing has been completed (S13). If all the data processing have not been completed, a judgement is made as to whether or not image data forming joints exist at the sides other than the side that has been assumed to be an edge of an image as to the unprocessed partial document data (S14). If no joints exist at the sides other than the side corresponding to an edge of an image, the judgement is made as "YES" at S14, and a warning display indicating "NO" is given to inform that no joining process is operable (S15), thereby stopping the operation.

In contrast, if joints exist at the sides other than the side corresponding to an edge of an image, the judgement is made as "NO" at S14, and the sequence proceeds to S9.

Then, the extracted features are compared between the partial document data that are positioned in relation to the specified document data and the unprocessed partial document data, and comparison, rearrangement and positioning of data are carried out at the joints (S10 to S12).

If it is determined at S13 that all the processing has been completed, a judgement is made as to whether or not the size of copy sheets whereon the joined image is formed is specified (S16). If the size of the copy sheets is not specified, the judgement is made as "NO" at S16, thereby selecting copy sheets having the largest size among the copy sheets that are set in the digital copying machine (S17), and a variable magnification operation is carried out on the combined document data in accordance with the copy sheets having the largest size (S18). In contrast, if the size of the copy sheets is specified, the judgement is made as "YES" at S16, and the variable magnification operation is carried out on the combined document data in accordance with the size of copy sheets that has been specified (S18). Further, conversion of the coordinates is executed on the document data according to the longitudinal feeding or the lateral feeding of the copy sheets, if necessary, and the subsequent data are released to the laser driver unit 7, thereby copying the combined image on copy sheets (S19).

Here, in the above processing, if a loss of image occurs at the joints of the partial document data, a compensating operation for the loss of image is carried out. That is, when the partial document data are positioned, the positioning is made while taking account of such a loss of image, and an additional image to compensate for the loss of image is formed in accordance with the image data that form the joints.

Figure 4:
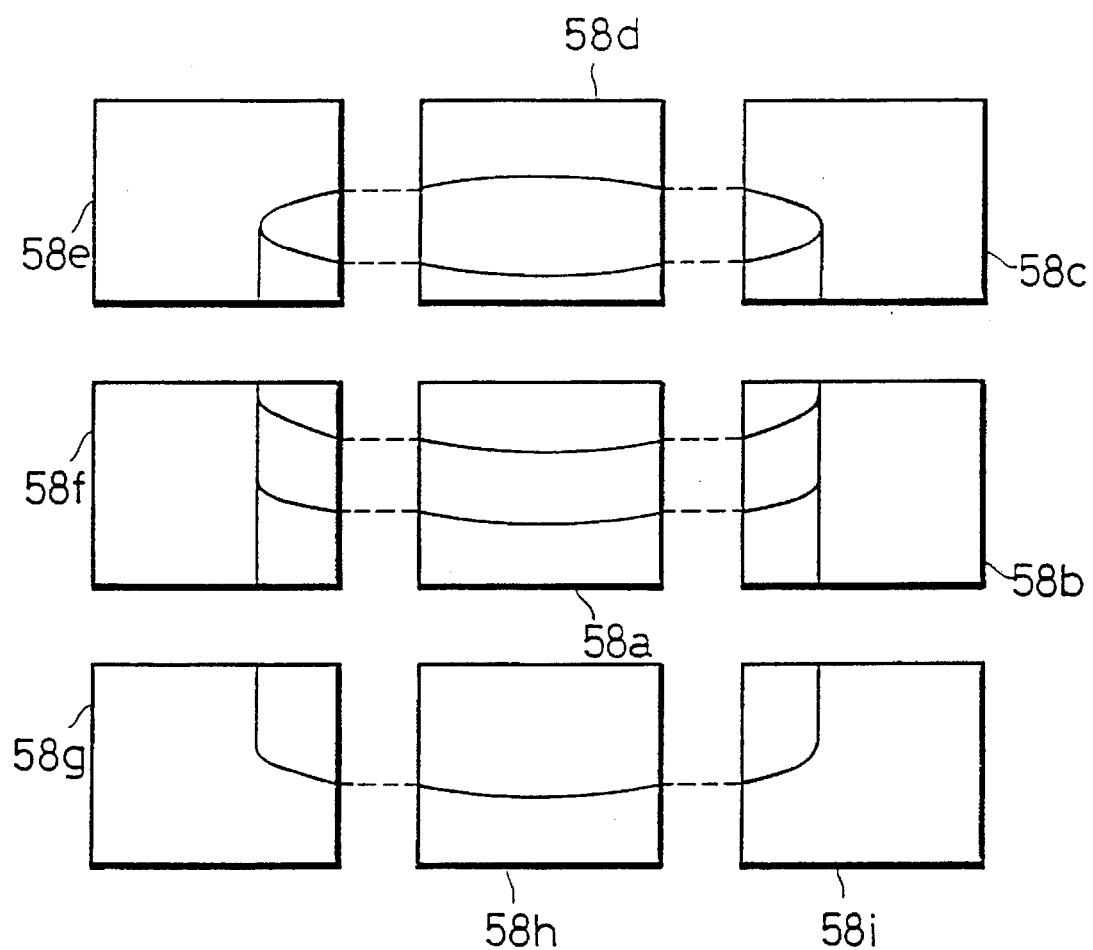
FIG. 4 is a schematic drawing showing partial document data that are stored in an image memory in the image processing system.

Next, an explanation will be given on the above-mentioned joining operation more specifically by reference to FIG. 4 as well as FIGS. 5(*a*), 5(*b*) and 5(*c*). Here, suppose that nine partial document data 58*a* through 58*i*, for example shown in FIG. 4, are stored in the image memory 43, and that the partial document data 58*a* is preliminarily determined as a specified document that forms the center of an image. The joining operation between the partial document data 58*a* and the partial document data 58*b* is carried out following the sequence as shown in FIGS. 5(*a*), 5(*b*) and 5(*c*).

Figure 5A:
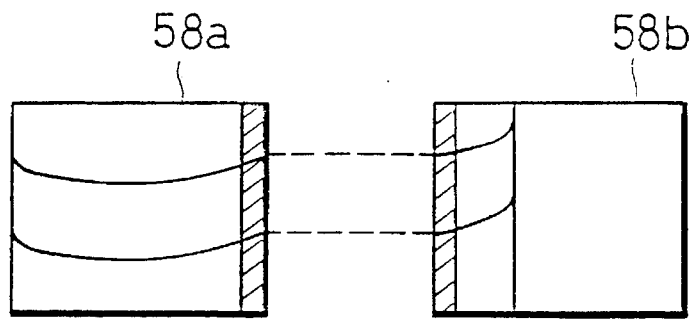
FIG. 5(a) is a schematic drawing which shows retrieving regions in the partial document data.
Figure 5B:
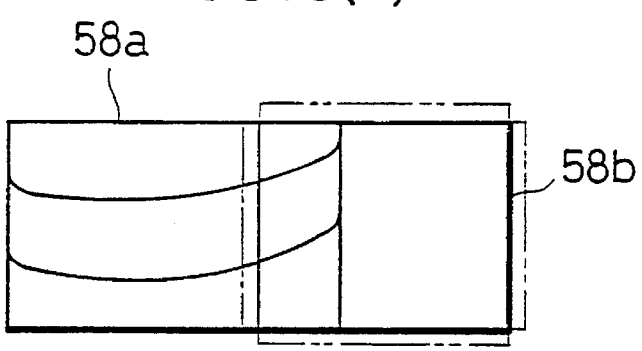
FIG. 5(b) is a schematic drawing which explains the positioning of the partial document data.
Figure 5C:
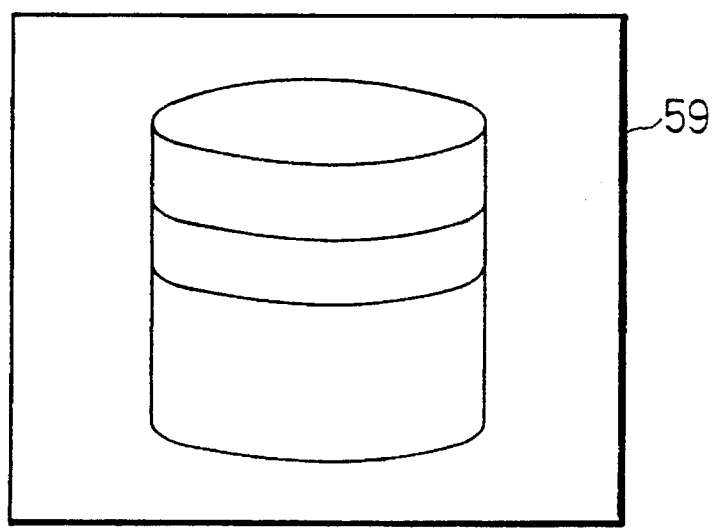
FIG. 5(c) is a plan view showing a copied image that is obtained by joining the partial document data together.

More specifically, data corresponding to predetermined lines from the ends of the respective partial document data 58*a* and 58*b* (indicated by regions having slanting lines in FIG. 5(*a*)) are retrieved so as to recognize peculiar lines and characters. Here, in the case when coincidence of the data is recognized as shown by the broken lines, with one of the partial document data 58*a* maintained in a fixed state, the best-suited position where the portions of the image are suitably joined together is found by checking the consistency of the data while shifting the other partial document data 58*b* in the main scanning direction or in the sub scanning direction, as is indicated by alternate long and two short dashes lines in FIG. 5(*b*). In this manner, the positioning of the partial document data 58*a* and 58*b* is carried out.

Likewise, the positioning is carried out as to the other sides of the partial document data 58*a*, that is, the specified document, by using the partial document data 58*d*, 58*f* and 58*h* (see FIG. 4) that contain coincident data at the respective joints. In contrast, as to the partial document data 58*c*, 58*e*, 58*g* and 58*i* that have no adjacent sides to the partial document data 58*a*, comparison of data is carried out with respect to the partial document data 58*b*, 58*d*, 58*f* and 58*h* that have already been positioned in relation to the partial document data 58*a*, and the arrangement, positioning, etc. of the partial document data are carried out in accordance with the coincident data.

In this manner, the positioning of the partial document data 58a through 58i is carried out, and after combining the images, the joined document data are subjected to a variable magnification operation to be formed into a desired size, thereby obtaining a reduced copy 59 as shown in FIG. 5(*c*).

As described above, in the case where a plurality of documents are successively read, the digital copying machine of the present embodiment extracts features from the respective documents, and forms one image from those documents by joining the documents with respect to sides whereon coincidence of data is found in the features.

Therefore, the present invention eliminates troublesome and time consuming tasks such as reducing a plurality of documents respectively, and trimming and sticking together the reduced portions to form one document, which was necessary in the conventional arrangement. Further, it becomes possible to prevent offsets that would have occured at the joints of the combined document due to errors in reduction rate. Moreover, since it is no longer necessary to repeatedly make copies, wasteful use of toner, copy sheets, etc. can be prevented.

Furthermore, in the digital copying machine of the present embodiment, the joined image is variably magnified into a desired size. Thus, this arrangement makes it unnecessary for the user to calculate a reduction rate in accordance with the number of documents and the size of copy sheets whereon the image is formed.

In the case of joining partial images of a number of documents, if features extracted from the respective documents are compared with one another at random, it will take a lot of time to search for sides having coincident data. However, in the digital copying machine of the present embodiment, an image that has been first read is recognized as a specified document as described earlier, and the joining operation is carried out based on the specified document. Therefore, even in the case of using a number of documents, since one document which contains the most outstanding features or which forms the center of image is first read as the specified document in the the digital copying machine, the detection on joints is carried out in a short time, and the joints can be joined each other accurately.

[EMBODIMENT 2]

Figure 6:
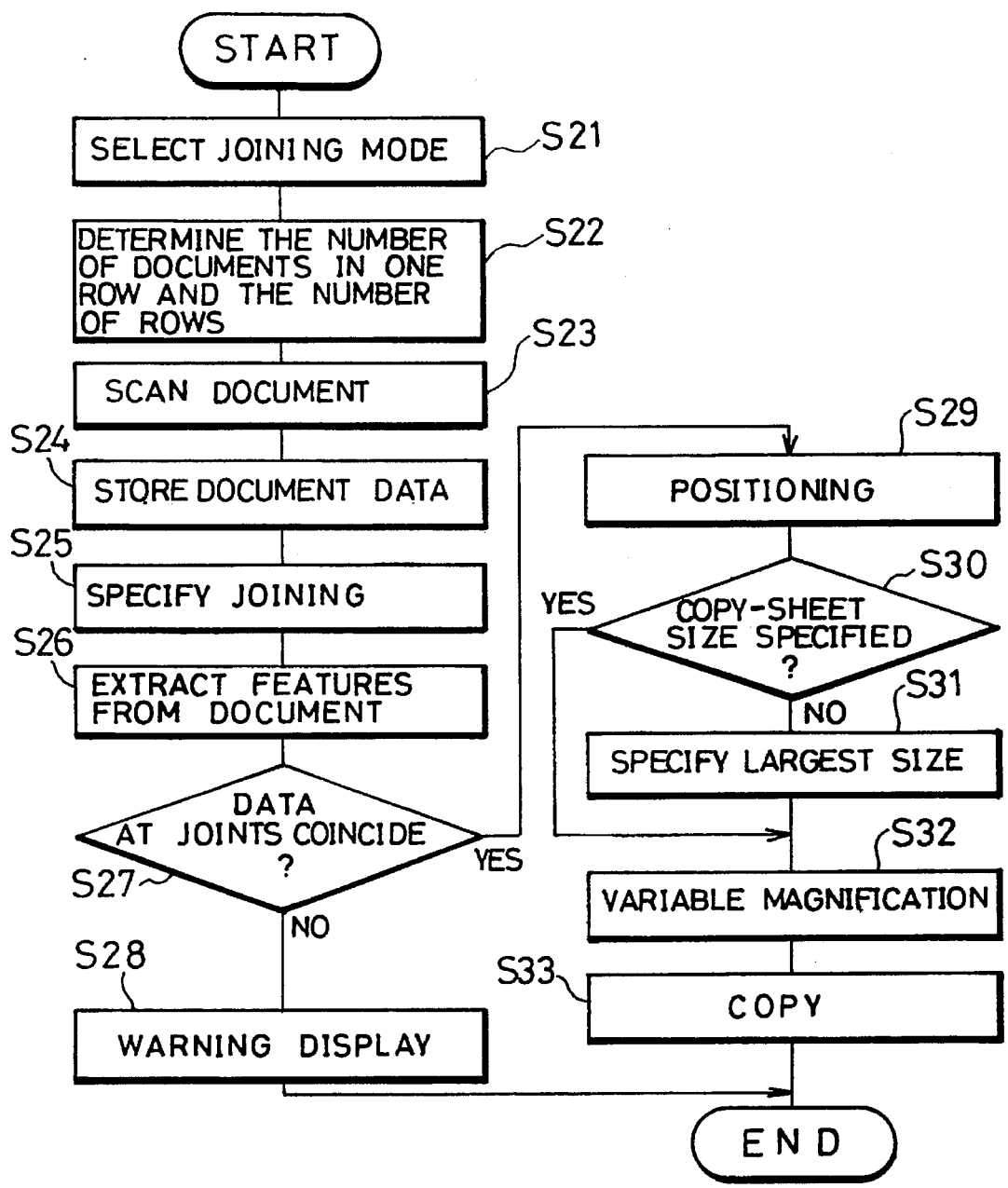
FIG. 6 is a flow chart showing the sequence of processes that are carried out during a joining operation on partial document data in the digital copying machine of another embodiment of the present invention.
Figure 7A:
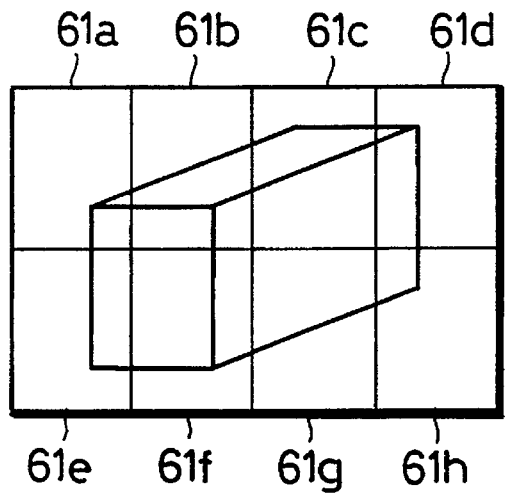
FIG. 7(a) is a schematic drawing which shows a layout of the inputted partial document data in the case of performing the operation shown in the flow chart of FIG. 6.
Figure 7B:
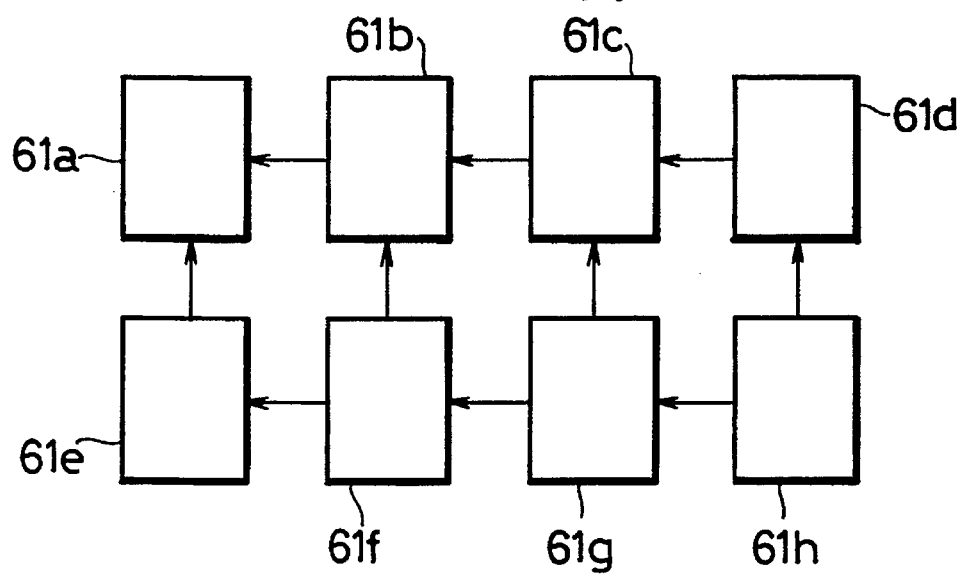
FIG. 7(b) is a schematic drawing which shows the sequence of the joining operation.

Referring to FIGS. 1 and 2 as well as FIGS. 6 and 7, the following description will discuss another embodiment of the present invention. Here, for convenience of explanation, those members that have the same functions and that are described in the aforementioned embodiments are indicated by the same reference numerals and the description thereof is omitted.

As with the digital copying machine described in embodiment 1, a digital copying machine of the present embodiment has a structure shown in FIG. 2. Further, the digital copying machine is provided with an image processing section, which has a construction as shown in FIG. 1.

In the digital copying machine of the present embodiment, the layout of partial document data forming one image is determined in a right and left direction as well as in an up and down direction by setting the divided state of the image in a predetermined manner. The divided state of the image is determined by, for example, the number of rows to divide the documents and the number of documents that are contained in one row. The digital copying machine determines the layout of the partial document data in the order of storage made by the image memory 43 in accordance with the number of rows to divide the documents and the number of documents contained in one row that have been predeterminately set, and the adjacent partial document data are joined together according to the layout.

Referring to the flow chart of FIG. 6, the sequence of processes that are carried out during a joining operation in the digital copying machine of the present embodiment.

Firstly, a joining mode is selected through an operation panel, not shown, (S21), and the number of documents contained in one row and the number of rows are successively determined (S22). Then, documents having divided images are successively scanned in the order by which the joining operation is carried out (S23), and data read through the CCD sensor 6 are stored in the image memory 43 (S24). In accordance with the number of documents contained in one row and the number of rows that are preliminarily set, the partial document data thus stored in the image memory 43 are determined in their layout in the order they are inputted. When the joining operation is instructed (S25), features on the documents are extracted by retrieving data corresponding to predetermined lines from the edge of the partial document data so as to recognize peculiar lines and characters, thus carrying out a feature-extracting operation on the partial document data (S26).

Then, in accordance with the layout of the partial document data determined by the order of storage made by the image memory 43, a check is made to see if the data forming joints coincide with each other by comparing the features preliminarily extracted between the adjacent partial document data (S27). If it is determined that the data coincide with each other, positioning is made so as to get the joints connected to each other smoothly by shifting one partial document data with the other partial document data maintained in a fixed state (S29).

These judgement on the coincidence of data and positioning of the partial document data are first made between the partial document data firstly read and the partial document data secondly read. Successively, positioning is carried out between the partial document data secondly read and those thirdly read, and then between the partial document data thirdly read and those fourthly read, and so on. When the positioning has been made with respect to all the documents contained in one row, it is determined that the joining operation has been completed with respect to the partial document data forming the first row, and a joining operation is started with respect to the partial document data forming the second row.

As to the joining operation on the partial document data forming the second row, it is necessary to take account of not only the lateral connection of the image but also the longitudinal connection thereof, that is, the connection to the partial document data forming the first row. Therefore, as to the partial document data to be disposed in the second row and the following rows, the positioning is successively made while paying attention to coincidence of data in the lateral and longitudinal joints.

In contrast, if it is determined at S27 that no coincidence is found between the data at the joints, and a warning display indicating that no joining process is operable (S28), thereby stopping the operation.

Further, when the positioning has been completed on all the partial document data stored in the image memory 43 such that the partial document data have been combined together, a judgement is made as to whether or not the size of copy sheets whereon the joined image is formed is specified (S30). If the size of the copy sheets is not specified, copy sheets having the largest size among the copy sheets that are set in the digital copying machine are automatically selected (S31), and a variable magnification operation is carried out on the combined document data in accordance with the copy sheets having the largest size (S32). In contrast, if the size of the copy sheets is specified, the judgement is made as "YES" at S30, and the variable magnification operation is carried out on the combined document data in accordance with the size of copy sheets that has been specified (S32).

After having been subjected to the variable magnification operation in accordance with the size of the copy sheets, the document data are further subjected to conversion of the coordinates in accordance with the longitudinal feeding or the lateral feeding of the copy sheets, and other predetermined operations. Then, the subsequent data are released to the laser driver unit 7, and a predetermined copying operation is carried out (S33). Here, if the digital copying machine has a function for compensating for loss of image, it is possible to compensate for any loss of image which would occur at the joints of the partial document data during the above-mentioned joining operation.

Next, referring to an example wherein one image is formed by joining together eight pages of partial document data 61a through 61h (where the number of documents forming one row is four and the number of rows is two) as shown in FIG. 7(a), an explanation will be given in detail on the above-mentioned operation.

First, the divided state of image (in this case, the number of documents forming one row is four and the number of rows is two) is entered, and the partial document data 61a through 61h are then stored in the image memory 43 in succession. Thus, the partial document data 61a through 61h are disposed in two rows in a divided manner according to the order of storage made by the image memory 43.

First, the data-retrieving operation, the positioning, etc. are carried out with respect to the partial document data 61a through 61d forming the first row. More specifically, if coincidence of data is found at the joints, the partial document data 61b are positioned in relation to the partial document data 61a. Likewise, the partial document data 61c are positioned in relation to the partial document data 61b, and the partial document data 61d are positioned in relation to the partial document data 61c.

Next, the data-retrieving operation, the positioning, etc. are carried out with respect to the partial document data 61e through 61h forming the second row. The partial document data 61e, which are first read among the partial document data forming the second row, are positioned under the lower edge of the partial document data 61a in the first row based on the data of the upper edge thereof. Then, the partial document data 61f are positioned in relation to the partial document data 61b and 61e. Likewise, the partial document data 61g are positioned in relation to the partial document data 61c and 61f, and the partial document data 61h are positioned in relation to the partial document data 61d and 61g.

Figure 7C:
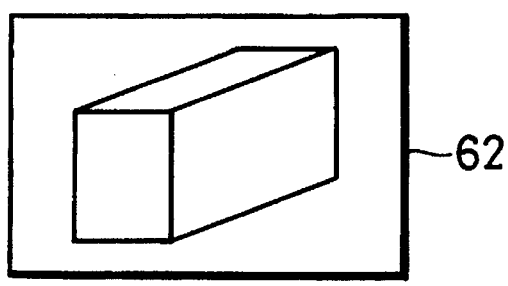
FIG. 7(c) is a plan view showing a copied image that is obtained by joining the partial document data together.

The document data, which have been positioned and combined as described above, are subjected to a variable magnification operation, conversion of the coordinates, and other operations, and a predetermined copying operation is carried out, thereby producing a reduced copy 62 as shown in FIG. 7(c).

As described above, in the digital copying machine of the present embodiment, the divided state of image is preliminarily set by entering the number of rows and the number of documents contained in one row. Further, the layout of the stored partial document data is determined in accordance with the divided state thus set and the order of the partial document data that have been stored in the image memory. Then, the joining operation is successively executed beginning with the partial document data situated on the left end in the first row toward the adjacent partial document data on the right side. After completion of the joining operation in the first row, the same operation is carried out on the second row, thereby finally combining those partial document data into an image on one sheet.

Therefore, as with the aforementioned embodiment 1, in the case of joining together images read in a divided manner and recording the combined image on one sheet of paper having a desired size, the arrangement of the present embodiment eliminates troublesome and time consuming tasks such as trimming and pasting the divided images and calculations on reduction rate, thereby improving efficiency of the operation. Moreover, since it is no longer necessary to repeatedly make copies, wasteful use of toner, copy sheets, etc. can be prevented. Furthermore, even in the case of using a number of inputted partial document data from an image that is divided into many portions, it is possible to carry out the joining operation without the necessity of excessive time, and to ensure high quality in the images by eliminating offsets that would occur at the joints.

[EMBODIMENT 3]

Figure 8:
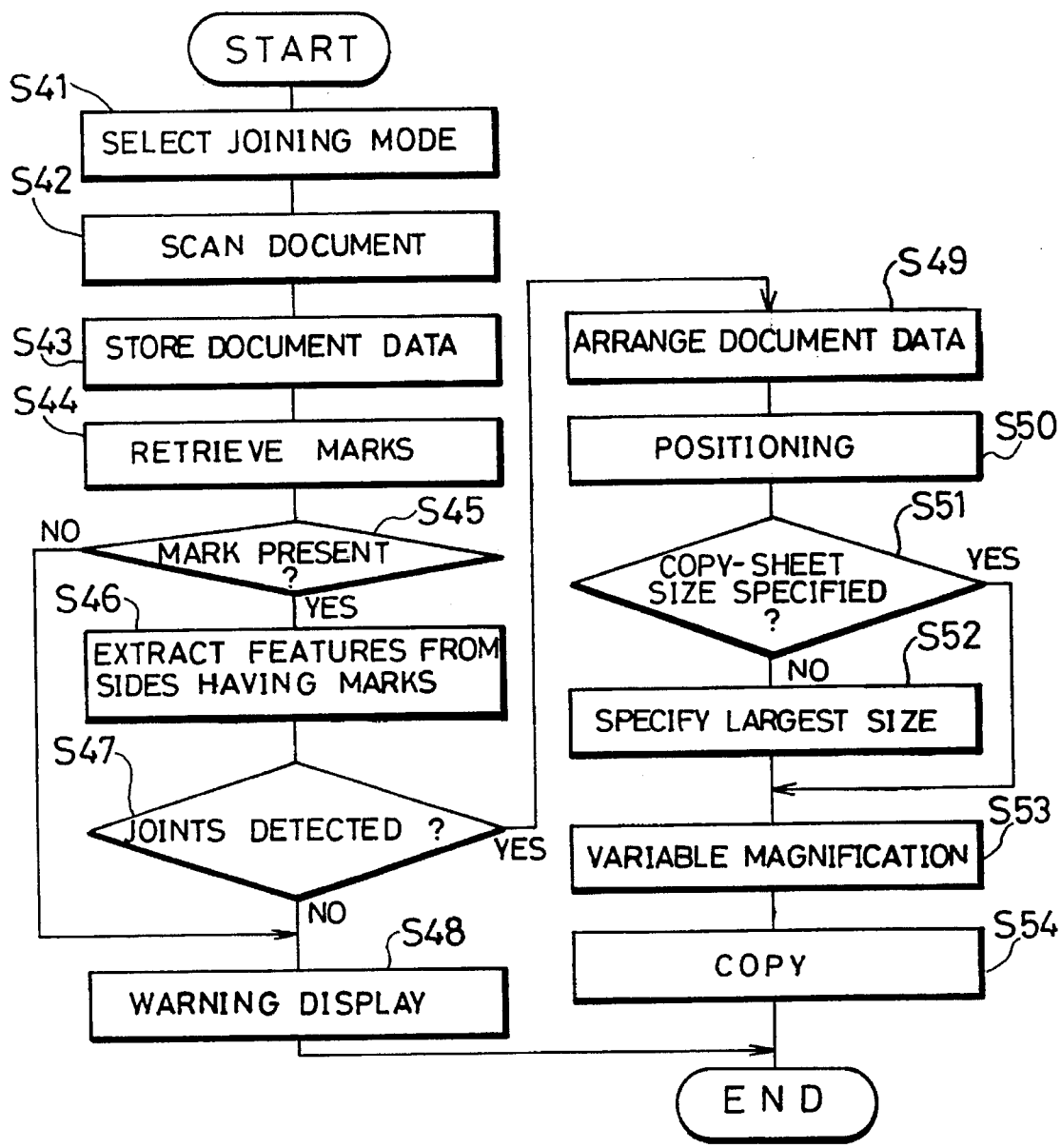
FIG. 8 is a flow chart showing the sequence of processes that are carried out during a joining operation on partial document data in the digital copying machine of still another embodiment of the present invention.

Referring to FIGS. 1 and 2 as well as FIGS. 8 through 10, the following description will discuss another embodiment of the present invention. Here, for convenience of explanation, those members that have the same functions and that are described in the aforementioned embodiments are indicated by the same reference numerals and the description thereof is omitted.

As with the digital copying machine described in the aforementioned embodiment 1, a digital copying machine of the present embodiment has a structure shown in FIG. 2. Further, the digital copying machine is provided with an image processing section, which has a construction as shown in FIG. 1.

In the digital copying machine of the present embodiment, marks are preliminarily put on documents, and the joining operation is carried out in accordance with those marks. The marks are directly put on the documents by the use of a pen having a specified color, for example, before the images are read by the CCD sensor 6. More specifically, the documents are disposed by assuming the joined state of the images, and for example, arrows or the like for use as the marks are put on the sides that form joints. The digital copying machine of the present embodiment has a function for detecting such marks, and retrieves the marks before performing the feature-extracting operation on the partial document data.

The sequence of operations for joining these images by the use of the marks indicating the joints will be described below by reference to the flow chart of FIG. 8.

When the joining mode is selected through an operation panel, not shown, (S41), documents whereon the marks are put are scanned (S42), and the partial document data read by the CCD sensor 6 are stored in the image memory 43 (S43). Here, as to the order of reading the partial document data, it may be determined at random irrespective of the layout of the partial document data. When all the partial document data are stored in the image memory 43, the marks that have been put in a specified color to indicate the joints are retrieved (S44), and a judgement is made as to the presence or absence of the marks (S45). Here, if the marks are not detected, the judgement is made as "NO" at S45, and a warning display is given to inform that no joining process is operable (S48), thereby stopping the operation.

In contrast, if the marks are detected, the judgement is made as "YES" at S45, and features, that is, peculiar lines and characters, are extracted from the partial document data by retrieving data corresponding to predetermined lines from the sides at which the marks coincide with each other (S46). Then, a judgement is made as to the presence or absence of the joints at which the data coincide with each other by comparing the extracted features (S47). Here, if the joints at which the data coincide with each other are not detected, the judgement is made as "NO" at S47, and a warning display is given to inform that no joining process is operable (S48), thereby stopping the operation.

In contrast, if such joints are detected, the judgement is made as "YES" at S48, and the partial document data are arranged so that the sides forming the joints in question, that is, the sides whereon the marks are put, are placed side by side with each other (S49). In such a state, the positioning of the partial document data is executed by finding out the best-suited position on the joints while shifting one partial document data in the main scanning direction or in the sub scanning direction, with the other partial document data maintained in a fixed state (S50). Thereafter, the partial document data are combined together based on the results of the positioning. Here, the marks still exist on the combined document data. However, since the marks are put in the specified color, they are recognized after combining the document data, and erased by the specified-color omitting process.

After the erasing process of the marks, a judgement is made as to whether or not the size of copy sheets is specified (S51). If the size of the copy sheets is not specified, copy sheets having the largest size are selected among the copy sheets that are set in the digital copying machine (S52), and a variable magnification operation is carried out on the combined document data in accordance with the copy sheets having the largest size (S53). In contrast, if the size of the copy sheets is specified, the variable magnification operation is carried out on the combined document data in accordance with the specified size of copy sheets (S53).

After having been subjected to the variable magnification operation in accordance with the size of the copy sheets, the document data are further subjected to conversion of the coordinates in accordance with the longitudinal feeding or the lateral feeding of the copy sheets, and other predetermined operations. Then, the subsequent data are released to the laser driver unit 7, and a joined image is copied on a copy sheet (S54). Here, if the digital copying machine has a function for compensating for losses of image, it is possible to compensate for any loss of image which would occur at the joints of the partial document data.

Figure 9A:
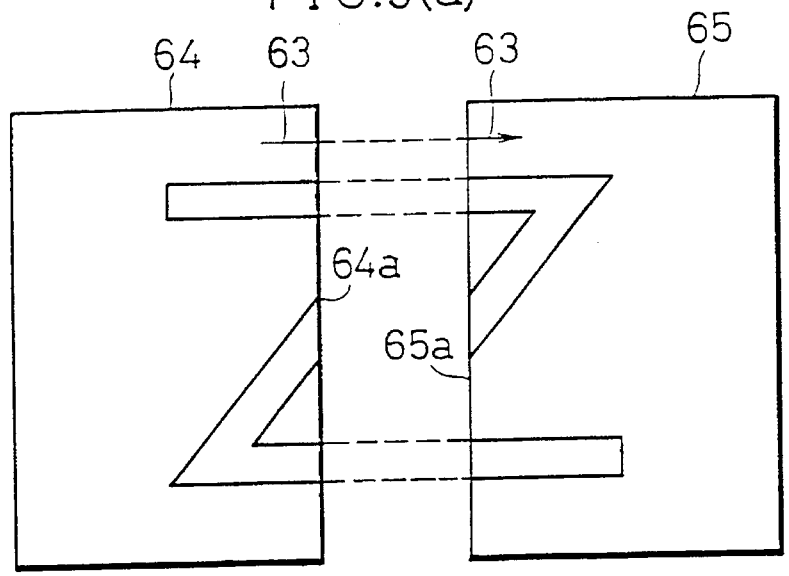
FIG. 9(a) is a schematic drawing which shows one example of the inputted partial document data in the case of performing the operation shown in the flow chart of FIG. 8.

Next, referring to an example wherein the partial document data 64 and 65, for example, shown in FIG. 9(a) are stored in the image memory 43, an explanation will be given in detail on the above-mentioned operation. In the partial document data 64 and 65, a mark 63 is preliminarily put in a specified color with a pen on sides 64a and 65a whereon the joining operation is carried out. When the joining operation of the images is carried out, the mark 63 is first retrieved prior to the feature-extracting operation on peculiar lines and characters from the partial document data 64 and 65. In the feature-extracting operation from the partial document data 64 and 65, assuming that only the sides 64a and 65a having the mark 63 form joints, data corresponding to predetermined lines from the edges of the sides 64a and 65a are retrieved.

Figure 9B:
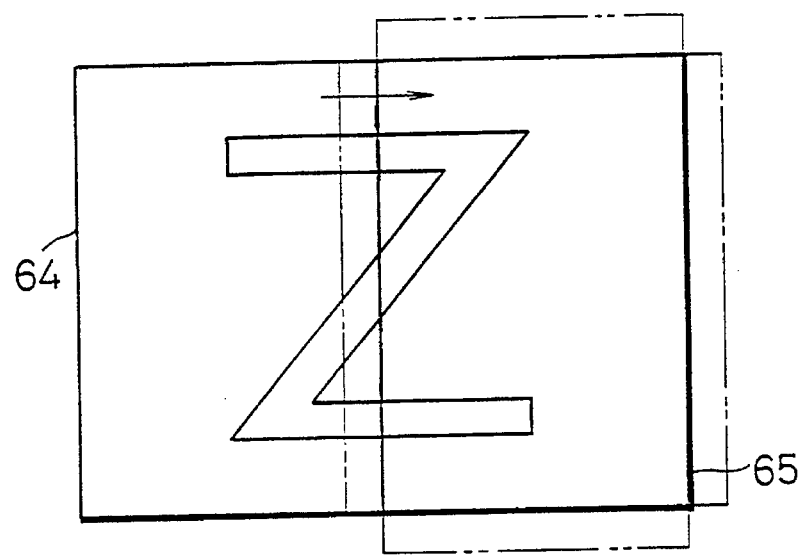
FIG. 9(b) is a schematic drawing which explains the positioning of the partial document data.
Figure 9C:
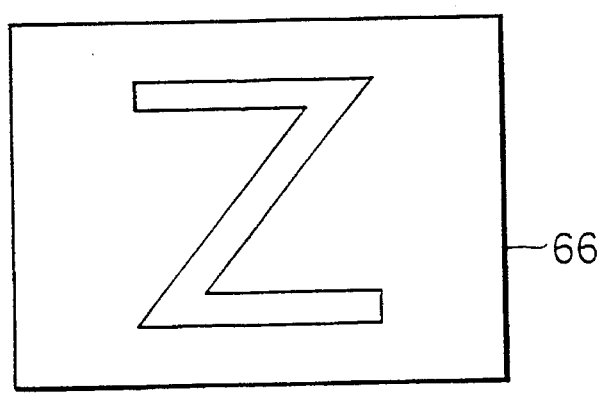
FIG. 9(c) is a plan view showing a copied image that is obtained by joining the partial document data together.
Figure 11:
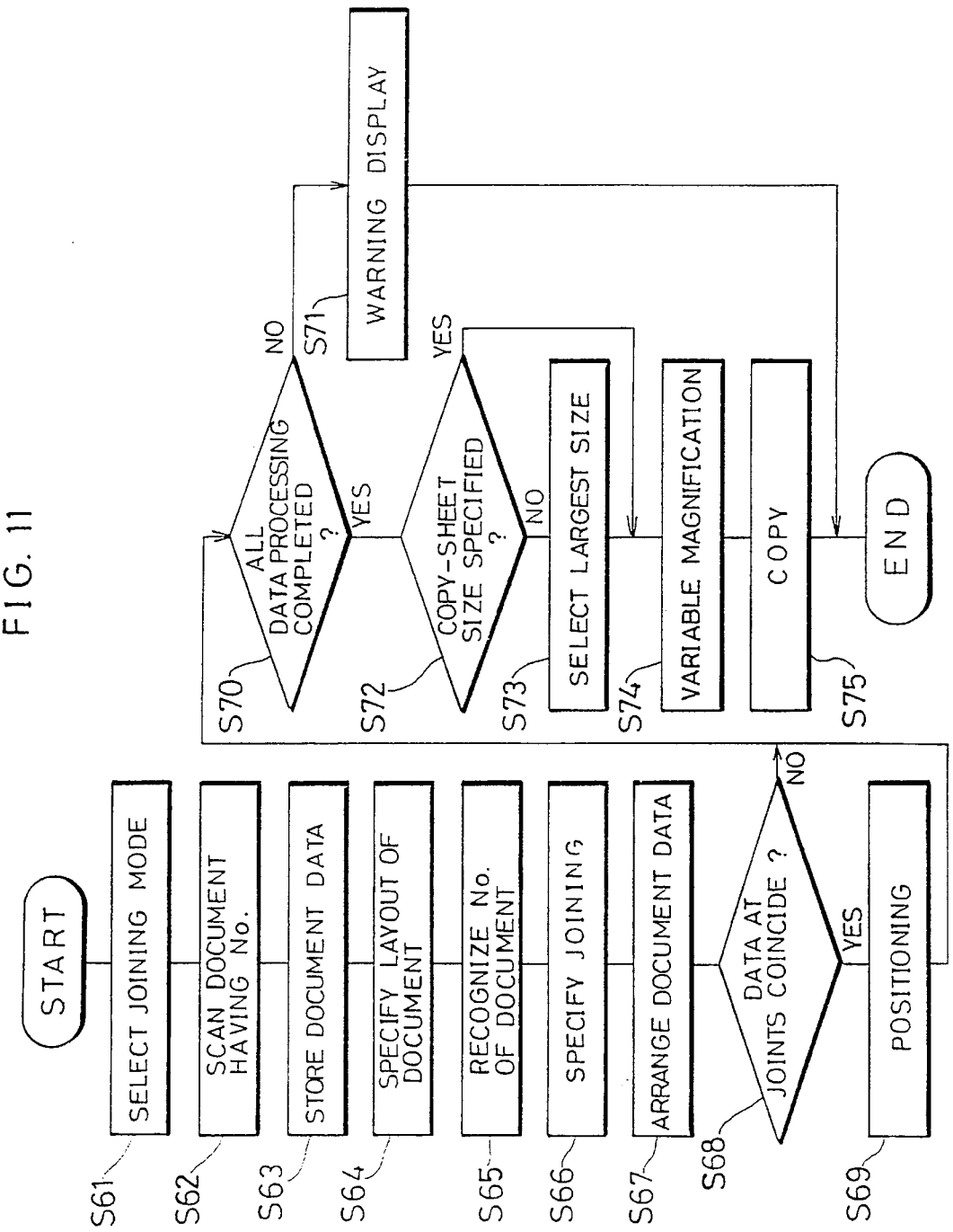
FIG. 11 is a flow chart showing the sequence of processes that are carried out during a joining operation on partial document data in the digital copying machine of still another embodiment of the present invention.

As shown in FIG. 9(b), when portions at which the extracted features coincide with each other are detected, the best-suited position on the joints is found by shifting one partial document data 65 in such a manner as indicated by alternate long and two short dashes lines in FIG. 9(b) with the other partial document data 64 maintained in a fixed state. After positioning the partial document data 64 and 65, both of the partial document data 64 and 65 are combined together. Thereafter, the mark 63 is erased from the combined document data by the specified-color omitting process, and the variable magnification operation, etc. are carried out on the subsequent document data, thereby producing a reduced copy 66 as shown in FIG. 9(c).

As described above, in the digital copying machine of the present invention, upon executing the joining operation, the marks indicating joints are put in a specified color with a pen on documents to be joined, before the documents are read by the CCD sensor 6. Therefore, as with the aforementioned embodiment 1, troublesome and time consuming tasks such as trimming and pasting the divided images and calculations on reduction rate are eliminated, thereby improving efficiency of the operation. Further, since it is no longer necessary to repeatedly make copies, wasteful use of toner, copy sheets, etc. can be prevented. Moreover, in the digital copying machine, upon retrieving the partial document data so as to detect joints, the joints are recognized by detecting the marks; this makes it possible to shorten the processing time, and to join the read images together more accurately and quickly.

Additionally, if the number of divisions of an image increases as shown in FIG. 10, marks having different shapes are put on respective sides forming different joints of the partial document data 67a through 67f. This arrangement makes it possible to detect sides whereon data coincide with each other between the joints more quickly. Thus, as with the above-mentioned case, the joining operation of the images is carried out more accurately and quickly.

[EMBODIMENT 4]

Referring to FIGS. 1 and 2 as well as FIGS. 11 through 14, the following description will discuss still another embodiment of the present invention. Here, for convenience of explanation, those members that have the same functions and that are described in the aforementioned embodiments are indicated by the same reference numerals and the description thereof is omitted.

As with the digital copying machine described in the aforementioned embodiment 1, a digital copying machine of the present embodiment has a structure shown in FIG. 2. Further, the digital copying machine is provided with an image processing section, which has a construction as shown in FIG. 1.

In the digital copying machine of the present embodiment, numbers are preliminarily put on documents, prior to the reading operation of the document data that is performed by the CCD sensor 6, and the joining operation is carried out in accordance with those numbers. The numbers are put on the documents to be joined together by the use of a pen having a specified color before the images are read by the CCD sensor 6. The numbers indicate the order of the joining operation.

The sequence of operations for joining those documents whereon the numbers indicating the order of the joining operation are put will be described below by reference to the flow chart of FIG.

When the joining mode is selected through an operation panel, not shown, (S61), documents whereon the numbers are put are scanned (S62), and the partial document data read by the CCD sensor 6 are stored in the image memory 43 (S63). Here, as to the order of reading the partial document data, it does not need to follow the sequence of the joining operation.

Figure 12:
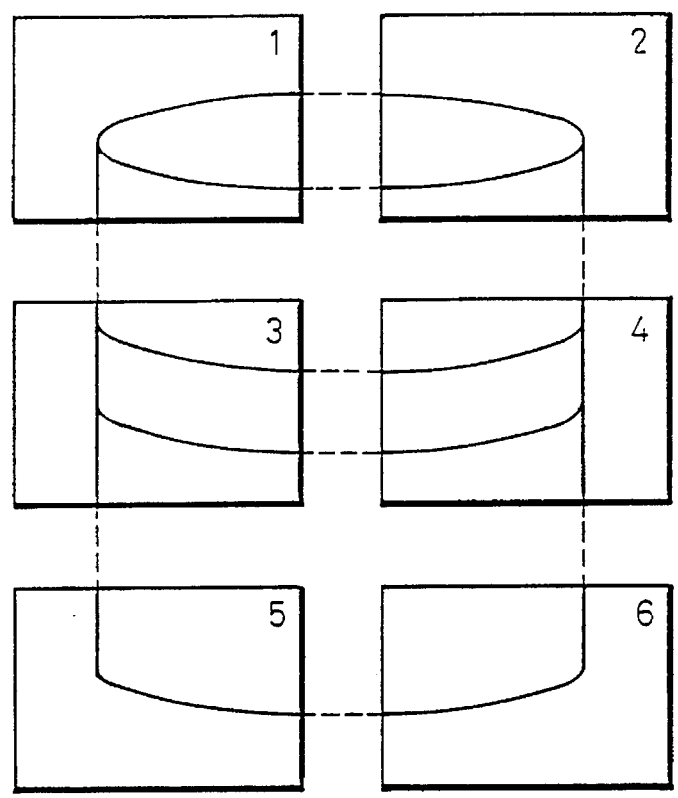
FIG. 12 is a schematic drawing which shows original documents on which the operation shown in the flow chart of FIG. 11 is carried out.
Figure 13:
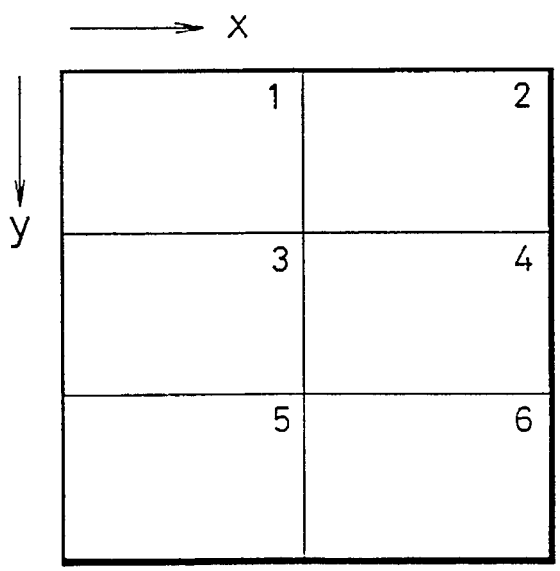
FIG. 13 is a schematic drawing which shows a layout of documents that is determined based on numbers that are put on the documents of FIG. 12.

After all the partial document data are stored in the image memory 43, the numbers of documents that are disposed in the x-direction and y-direction are determined through the operation panel. Thus, the layout of the stored partial document data is specified (S64). As shown in FIG. 12, for example, suppose that six documents whereon the numbers 1 through 6 are put are scanned, and that the number of documents in the x-direction is two and the number of documents in the y-direction is three. In this case, as shown in FIG. 13, the layout of the partial document data is specified so that the numbers are successively put from left to right and from up to down in the drawing.

When the layout of the partial document data is specified in this manner, the numbers put on the respective partial document data stored are recognized (S65). When the joining operation is specified (S66), the partial document data are rearranged in accordance with the numbers Chat have been put thereon, and the partial document data are disposed at the positions that have been preliminarily specified (S67). Then, outstanding characters and lines that form features are recognized by retrieving data corresponding to predetermined lines from the edges of the partial document data. With this arrangement, the features thus recognized are compared with each other between the adjacent partial document data, and portions at which the data coincide with each other are detected as joints of an image (S68).

Here, if no joints are detected, the judgement is made as "NO" at S68. Also, if it is determined at S70 that the joining operation has not been completed on all the partial document data, a warning display is given to inform that no joining is operable (S71), thereby stopping the operation.

In contrast, if joints at which the data coincide with each other are detected, the judgement is made as "YES" at S68, and one partial document data is shifted in the main scanning direction or in the sub scanning direction with the other partial document data maintained in a fixed state in order to find coincidence of the data. Thus, the best-suited position on the joints is detected and the positioning of the partial document data is carried out (S69), thereby permitting the partial document data to be combined. These operations including the detection on joints, the positioning, the combining, etc. are carried out successively in accordance with the numbers put on the partial document data and the layout of the partial document data that has been preliminarily specified. Additionally, the numbers that have been put in the specified color are erased by the specified-color omitting process after combining the document data.

After it is determined at S70 that the joining operation has been completed on all the partial document data stored in the image memory 43, a judgement is made as to whether or not the size of copy sheets is specified (S72). If the size of the copy sheets is not specified at S72, copy sheets having the largest size are selected among the copy sheets that are set in the digital copying machine (S73). Then, a variable magnification operation is carried out on the combined document data in accordance with the copy sheets having the largest size (S74). In contrast, if the size of the copy sheets is specified, the judgement is made as "YES" at S72, the variable magnification operation is carried out on the combined document data in accordance with the specified size of copy sheets (S74). After having been subjected to the variable magnification operation in accordance with the size of the copy sheets, the document data are further subjected to other predetermined operations. Then, the subsequent data are released to the laser driver unit 7, and a joined image is copied on a copy sheet (S75).

Additionally, in the above processing, if a loss of image occurs at the joints, a compensating operation for the loss of image is carried out in the same manner as the case described in embodiment 1.

Figure 14A:
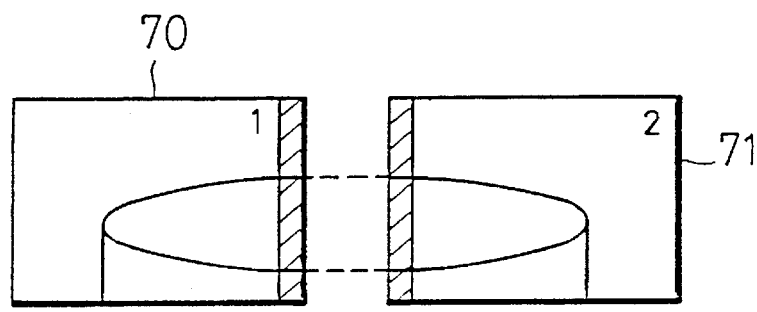
FIG. 14(a) is a schematic drawing which shows retrieving regions in the partial document data in the case of processing one portion of the original documents shown in FIG. 12.
Figure 14B:
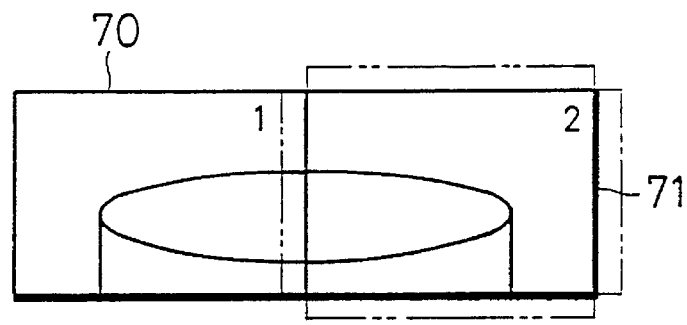
FIG. 14(b) is a schematic drawing which explains the positioning of the partial document data.
Figure 14C:
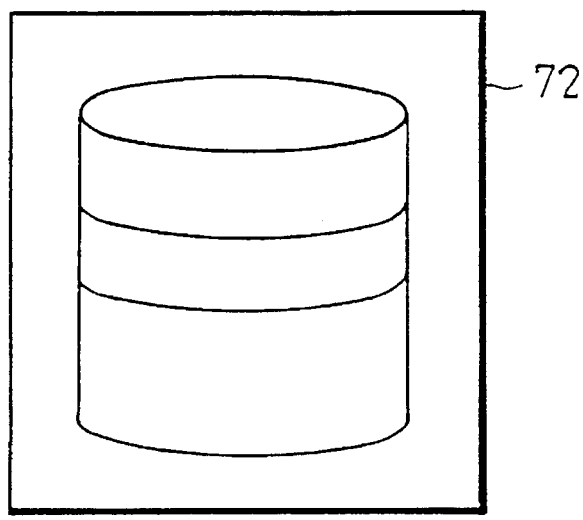
FIG. 14(c) is a plan view showing a copied image that is obtained by joining the partial document data together.

Next, referring to an example wherein a joining operation is carried out on six documents shown in FIG. 12, an explanation will be given in detail on the above-mentioned operation. For example, as to the partial document data 70 and 71 whereon number 1 and number 2 are respectively put as shown in FIG. 14(*a*), features are extracted by retrieving data corresponding to predetermined lines from the edges (indicated by slanting lines in the drawing) with respect to the sides placed opposite to each other.

Then, after comparing the extracted features, if the features coincide with each other, the portions in question are detected as joints. Thereafter, as shown in FIG. 14(*b*), the best-suited position on the joints is found by shifting one partial document data 71 in such a manner as indicated by alternate long and two short dashed lines with the other partial document data 70 maintained in a fixed state. After this positioning, both of the partial document data 70 and 71 are combined together. Thereafter, the numbers are erased from the combined document data by the specified-color omitting process, and the same operations are carried out between the other partial document data, thereby producing a reduced copy 72 as shown in FIG. 14(*c*).

As described above, in the digital copying machine of the present embodiment, the joining operation is carried out in accordance with the numbers put on the documents and the layout of the partial document data that is specified by the numbers. Therefore, as with the aforementioned embodiment 1, troublesome and time consuming tasks such as trimming and pasting the divided images and calculations on reduction rate are eliminated, thereby improving efficiency of the operation as well as reducing wasteful use of copy sheets, toner, etc. Further, upon retrieving the partial document data so as to detect joints, since the detecting operation is readily carried out in accordance with the numbers and the specified layout, it is possible to shorten the processing time. Even in the case of using a number of divided documents forming one image, the stored documents can be joined together quickly and accurately.

[EMBODIMENT 5]

Referring to FIGS. 1 and 2 as well as FIGS. 15 through 28, the following description will discuss still another embodiment of the present invention. Here, for convenience of explanation, those members that have the same functions and that are described in the aforementioned embodiments are indicated by the same reference numerals and the description thereof is omitted.

As with the digital copying machine described in the aforementioned embodiment 1, a digital copying machine of the present embodiment has a structure shown in FIG. 2. Further, the digital copying machine is provided with an image processing section, which has a construction as shown in FIG. 1.

In the digital copying machine of the present embodiment, specific image data forming features are extracted from all the sides of the partial document data that have been stored in the image memory 43, and the joining operation is carried out, beginning with the partial document data that include the most specific image data that have been extracted. Referring to the flow chart of FIG. 15, an explanation will be given on the joining operation that is carried out in accordance with the amount of data.

When the joining mode is selected through an operation panel, not shown, (S81), documents including divided images are scanned (S82), and the partial document data read by the CCD sensor 6 are stored in the image memory 43 (S83). These scanning process on the documents and storing process on the partial document data (S82 and S83) are repeated as many times as the number of the documents forming the image until the completion of the reading process is determined at S84.

After the completion of the reading process, when the joining operation is instructed (S85), a retrieving process is conducted on the data corresponding to predetermined lines from the edges with respect to all the sides of the partial document data stored. Thus, with respect to each side of the partial document data, outstanding lines and characters or the amount of change in data, etc. are recognized as the specific image data, and features are thus extracted from the respective partial document data (S86).

After the features have been extracted from the respective sides of all the partial document data, the amount of change, etc. in the data of the respective sides that have been extracted as the features are compared with one another, thereby comparing the amount of specific image data forming the features. Then, in accordance with the results of the comparison, the joining operation is successively carried out beginning with the sides containing the largest amount of data. In other words, a judgement is made as to the coincidence of data between the joints in question by comparing the extracted features in succession beginning with the sides containing the largest amount of data (S87). If the data coincide with each other, the partial document data are rearranged that the corresponding ends of the partial document data forming the joints are placed opposite to each other (S88), and the positioning is made so that the images are connected to each other smoothly.

The judging process as to the coincidence of data (S87), the rearranging process (S88) and the positioning process on the partial document data are repeated in accordance with the above-mentioned order until the completion of all the data processing is determined at S89. In contrast, if the judgement is "NO" at S87, the rearranging process on the partial document data is not carried out, and the sequence proceeds to S89. Here, during the above process, if there are any sides whereon the joining is not operable, a flag indicating "no coincidence" is set, thereby executing the joining operation on the rest of the sides.

After completion of all the data processing, a compensating operation for loss of data is conducted on the sides for which the flag of "no coincidence" has been set (S90). Then, at S91, a judgement is made as to whether or not the compensating operation for loss of data has been completed. If the compensating operation has been completed, a judgement is successively made as to whether or not the joining operation has been completed (S93). This judgement on the completion of the joining operation is made so as to determine whether or not all the document data stored are combined into an image on one sheet.

In contrast, if it is determined at S91 or S93 that the compensating operation for loss of data has not completed or the joining operation has not been completed, a warning display is given to inform that no joining process is operable (S92), thereby stopping the operation.

After determination of the completion of the joining operation at S93, a judgement is then made as to whether or not the size of copy sheets whereon the combined image is formed is specified (S94). If the size of the copy sheets is not specified, copy sheets having the largest size among the copy sheets that are set in the digital copying machine are selected (S95), and a variable magnification operation is carried out in accordance with the copy sheets having the largest size (S96).

In contrast, if the size of the copy sheets is specified, a variable magnification operation is carried out in accordance with the size of copy sheets that has been specified (S96). Further, conversion of the coordinates is executed on the document data according to the longitudinal feeding or the lateral feeding of the copy sheets (S97), and the subsequent data are released to the laser driver unit 7, thereby carrying out copying operations of the combined image on copy sheets (S98).

Figure 16:
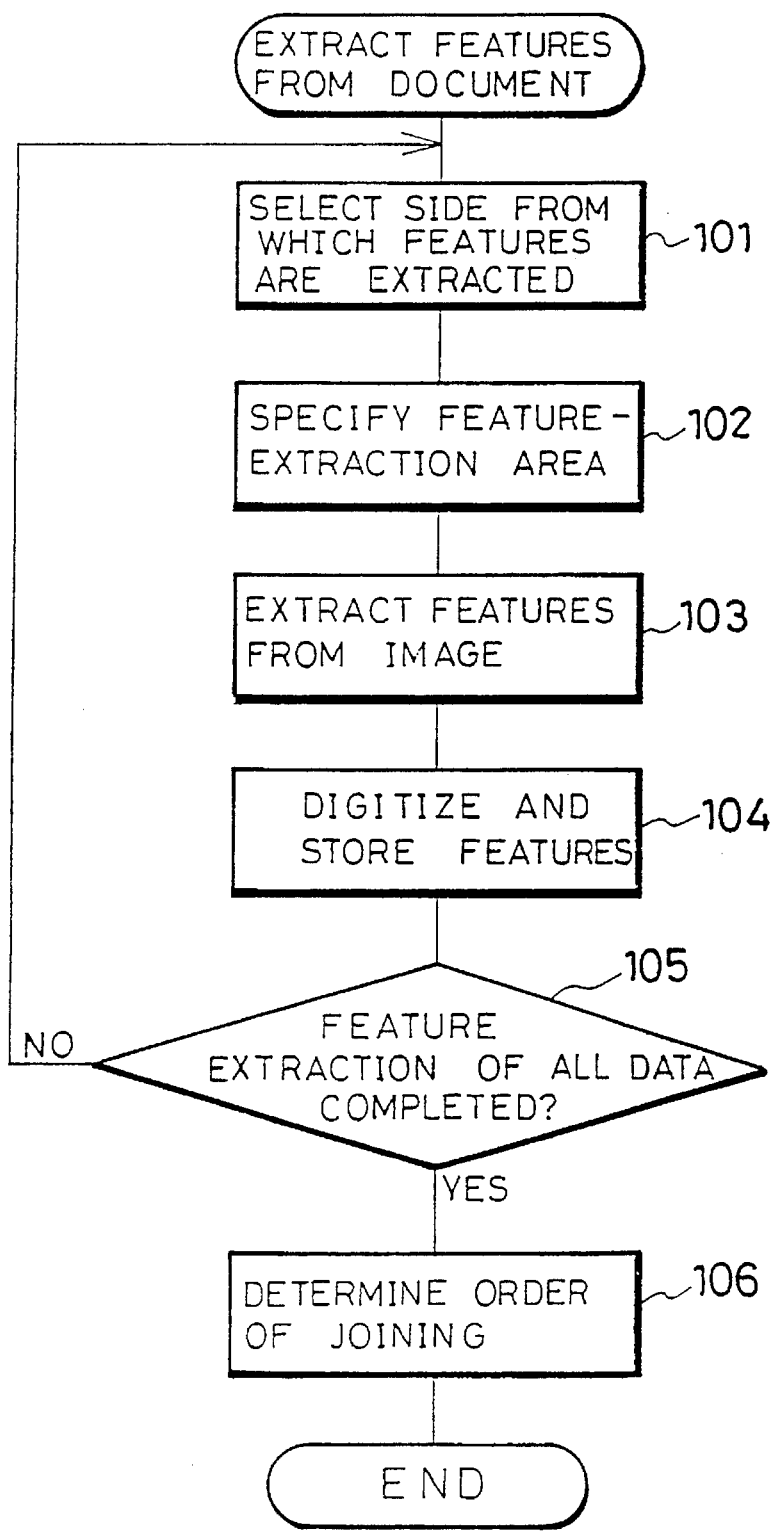
FIG. 16 is a flow chart showing the sequence of processes that are carried out when the features of the original documents are extracted in the flow chart of FIG. 15.

Referring to a flow chart in FIG. 16, an explanation will be given hereinbelow on the extraction of features on the documents in the above-mentioned joining operation.

Firstly, one side, from which features are extracted, is selected at random from the partial document data that have been stored (S101), and an area corresponding to predetermined lines from the end of the selected side, for example, corresponding to several tens of lines inward from the end, is specified as a feature-extraction area (S102). Then, a selection is made to find a best-suited method for making the features clear among methods using the outstanding lines and characters, the arrangement and pattern of data, the amount of change in data, etc., and features that are present within the feature-extraction area are extracted (S103). The extracted features are digitized and stored (S104).

The selection of sides from which features are extracted (S101), the specifying process of the area (S102), the feature-extracting process (S103) and the storing process of the features (S104) are repeated with respect to all the partial document data stored until the completion of feature-extracting process on all the data is determined at S105. After the completion of all the feature-extracting process on all the partial document data is determined at S105, comparisons are made between the amounts of data stored in the form of digits concerning the respective sides, and the order of the joining operations is set in accordance with the increment amount of data that are present on the respective sides (S106).

In other words, there is a high possibility that a pair of sides having almost the same amounts of data forming the features have coincident images. Therefore, the sides are successively combined to make pairs in accordance with the amounts of data that are present on the respective sides beginning with the sides having the largest amount of data. Then, joints in the partial document data in question are recognized by making a judgement as to whether or not the data forming the features are coincident between the paired sides. In this manner, since the joining operation is carried out in succession beginning with the sides having the most amount of data, the joints can be recognized in a short time in comparison with the case wherein the features of the respective sides are compared at random. Further, since the layout of the partial document data is first determined in a rough manner beginning with the sides having the largest amount of data, it is possible to find sides having coincident data easily in a short time even in the case of sides having less amount of data, whose joints were not easily found.

Figure 17:
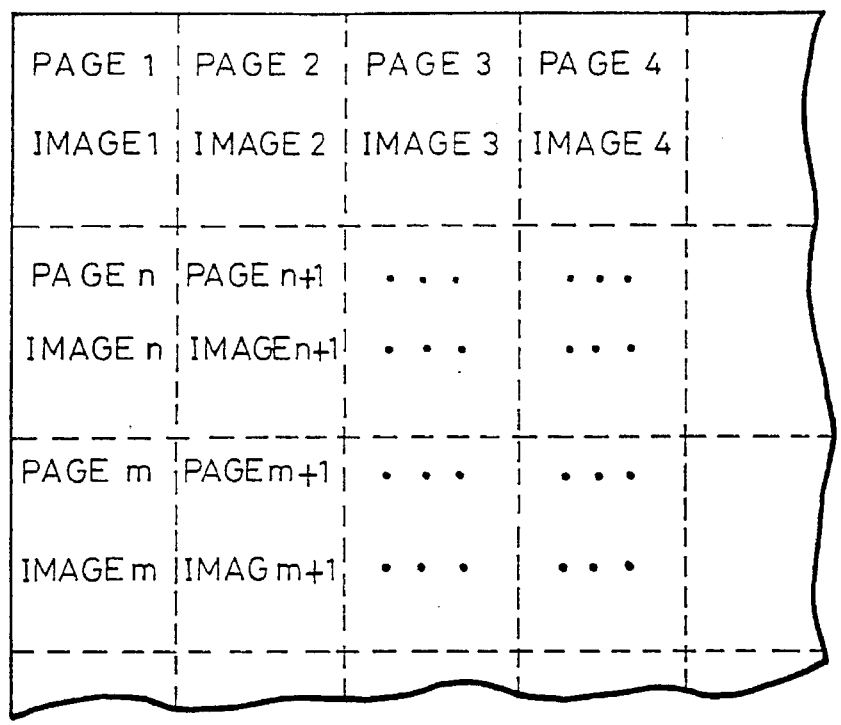
FIG. 17 is a schematic drawing which shows a layout of the partial document data in an image memory of the digital copying machine.
Figure 18:
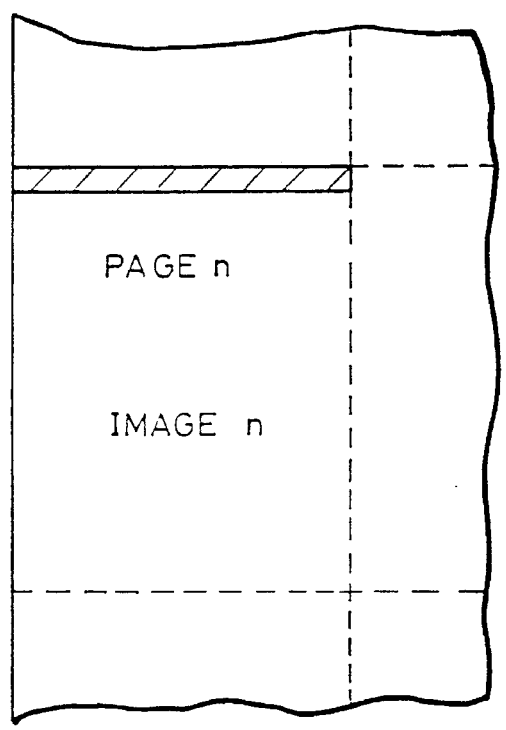
FIG. 18 is a schematic drawing which shows retrieving regions of the partial document data that are stored in the image memory.

Additionally, in the image memory 43, after detecting the size of a document to be read in accordance with the controlling for the normal image reading, storing, copying, etc., an address space is provided in the memory. As shown in FIG. 17, document data are stored therein at a rate of one image per page. Therefore, as shown in FIG. 18, each end of an image (for example, indicated by an area having slanting lines in FIG. 18) can be clearly indicated by an address on the memory, and the feature-extraction area can be specified in accordance with the address.

Figure 19:
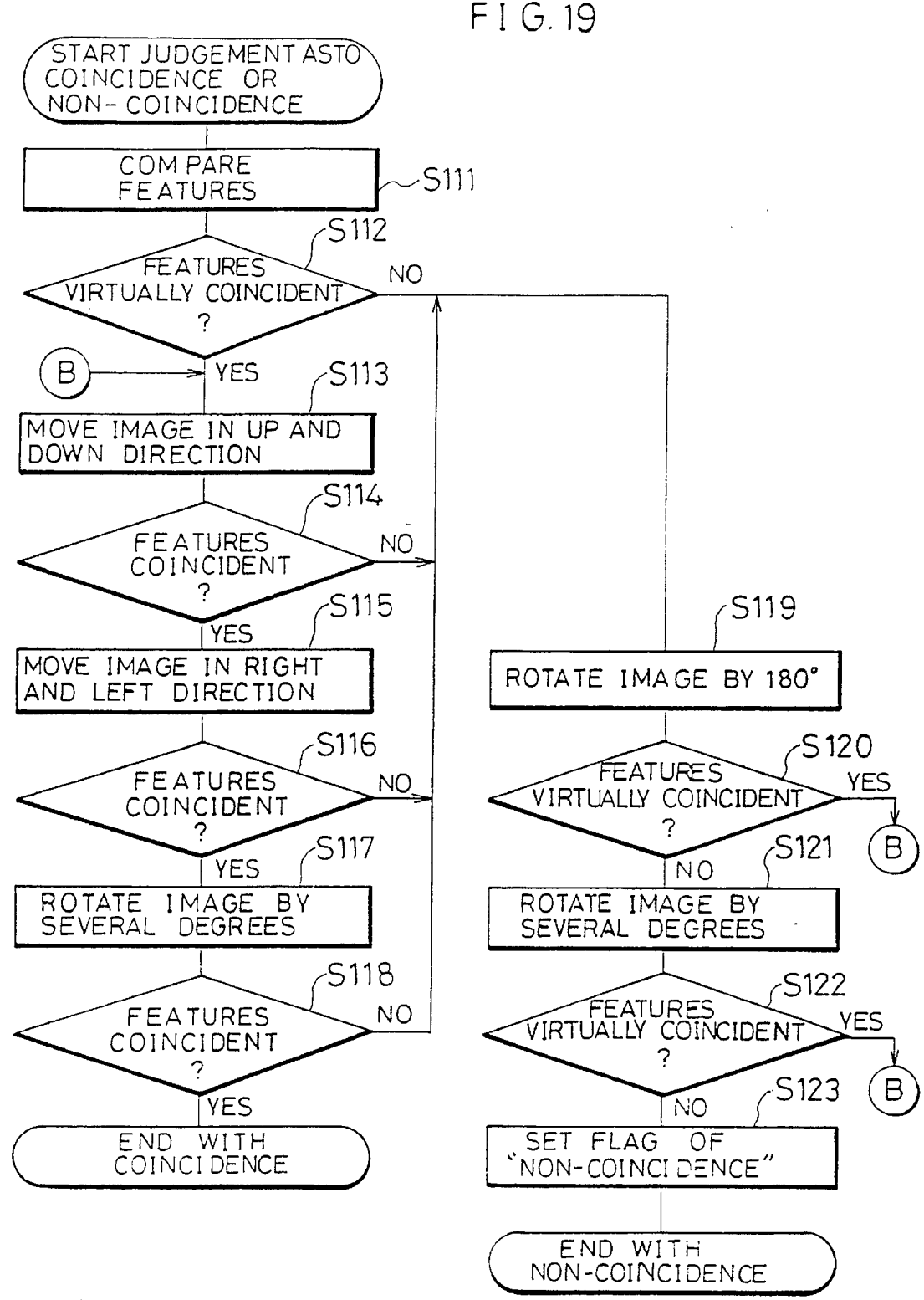
FIG. 19 is a flow chart showing the sequence of processes that are carried out during a decision on coincidence or non-coincidence of the document data in the flow chart of FIG. 15

After extracting respective features and the comparisons are made between the amounts of data forming the features in the manner as described above, a judgement is made as to the coincidence or non-coincidence of the data beginning with the sides having the largest amount of data forming the features, in accordance with a sequence of processes as shown in the flow chart of FIG. 19.

Firstly, features of a pair of sides to be joined, that is, features of a pair of sides having almost the same amounts of data, are roughly compared with each other (S111), and a judgement is made as to whether or not the features thus compared coincide with each other within a range of a predetermined approximation (S112). If the features almost coincide with each other, the partial document data are arranged so that the corresponding sides are aligned side by side with each other, and positioning is performed in the image memory 43 so that the arrangement, pattern, etc. of the data are well suited. In other words, the images are compensated for their offsets caused when they are read by shifting one of the images in an up and down direction and in a right and left direction (S113 and S115), and also compensated for their tilts caused by the tilts of the documents when they are read by rotating one of the images by several degrees (S117).

Moreover, if it is determined that no coincidence is found between the features when the features are roughly compared, or when one of the images is shifted in an up and down direction and in a right and left direction, or when one of the images is rotated (S112, S114, S116, and S118), a judgement is again made as to whether or not the features coincide with each other within a range of a predetermined approximation (S120) after one of the images is rotated by 180° (S119). If it is determined at S120 that no coincidence is found between the features even within the range of the predetermined approximation, one of the images is further rotated by several degrees (S121). Even after these processes, if it is determined that no coincidence is found between the features (S122), a flag indicating "no coincidence" is set (S123).

More specifically, since the documents have a rectangular shape in most cases, their image might be read upside down in an up and down direction. Therefore, even if no coincidence is found between the images in their stored states, the coincidence is again confirmed in the image memory 43 by rotating one of the partial document data by 180°. Further, taking account of the case when upon reading, the document is set in a slightly tilted state, even if no coincidence is found between the images after making the 180° rotation, the features are again compared by rotating one of the images by several degrees.

In contrast, if it is determined at S120 and S122 that the features coincide with each other within the range of the predetermined approximation, the corresponding sides are recognized as joints and the sequence proceeds to S113. Then, the shift of the images in an up and down direction and in a right and left direction, the rotation of the images, etc. are performed as described earlier so that the arrangement, pattern, etc. of the data are well suited, thus making the positioning of the partial document data.

Figure 20:
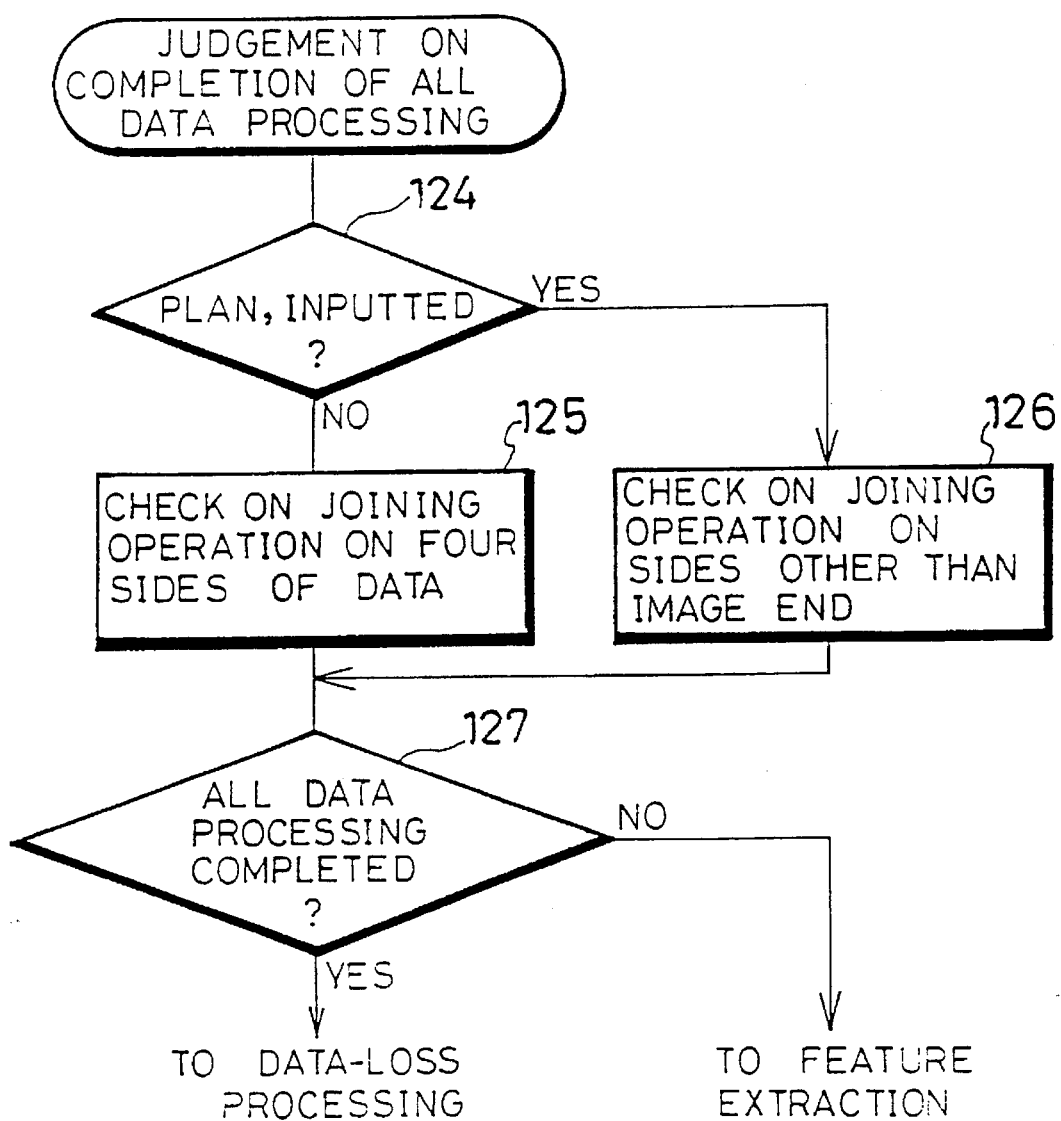
FIG. 20 is a flow chart showing the sequence of processes that are carried out during a judgement as to the completion of all the data processing in the flow chart of FIG. 15.
Figure 22:
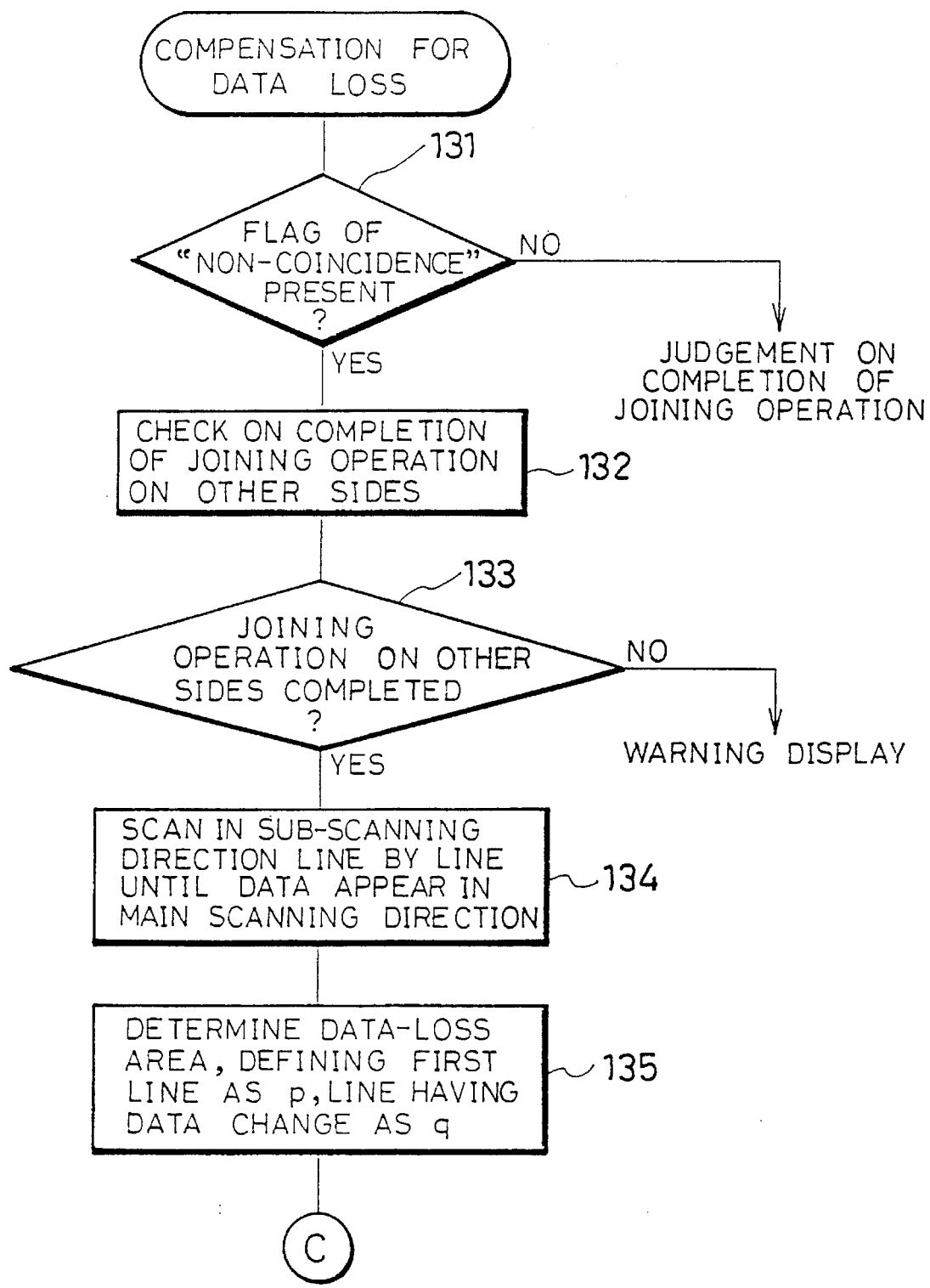
FIG. 22 is a flow chart showing the sequence of processes that are carried out during a compensation for loss of data in the flow chart of FIG. 15.

Next, referring to the flow chart of FIG. 20, an explanation will be given in detail concerning the judgement on the completion of all the data processing.

If a plan for the joining operation is preliminarily inputted through a certain method upon reading images or other occasions, it is determined at S124 that there is an inputted plan. In this case, since the layout of the partial document data is set by the inputted plan and since the sides merely including the ends of images are preliminarily known, the joining operation is not carried out on the sides merely including the ends of images. Therefore, a judgement is made as to whether or not all the data processing has been completed (S127), by making a check to see if the joining operation is being carried out on sides other than the sides merely including the ends of images (S126).

In contrast, if document data are randomly inputted, that is, if no plan for the joining operation is specified, the judgement is made as "NO" at S124. Therefore, a judgement is made as to whether or not all the data processing has been completed (S127), by making a check to see if the joining operation is being carried out on the four sides in the data (S125). Additionally, in this case where the document data are randomly inputted, it is determined that the sides on which no coincidence of the features is found are sides merely including the ends of images, and the joining operation is successively carried out on the other sides.

Here, referring to FIG. 21, an explanation will be given on this in detail. For example, if four images a through d are randomly inputted, judgements as to the coincidence or non-coincidence of the data are made on the four sides of the respective images a through d. At the time when all the data processing has been completed on the partial document data, the joining operation has been made on each of the pairs of sides $a_4$ and $b_3$, $b_2$ and $d_1$, $a_2$ and $c_1$, as well as $c_4$ and $d_3$ following the order determined by the amounts of the features as described earlier, while flags for indicating "no coincidence" are set for the other eight sides merely including the ends of images ($a_1$, $a_3$, $b_1$, $b_4$, $c_2$, $c_3$, $d_2$ and $d_4$).

After completion of all the data processing as described above, if any flags for indicating "no coincidence" are found at any portions other than the ends of images, a compensating operation for the loss of data is carried out. As to the compensating operation for the loss of data, an explanation will be given with reference to the flow chart of FIG. 22.

Firstly, a judgement is made as to the presence or absence of the flags for indicating "no coincidence" (S131), and if no flags are found, the sequence proceeds to the step for determining the completion of the joining operation because the compensating operation for the loss of data is not necessary. In contrast, if the flags for indicating "no coincidence" are found, a check is made to see if the joining operation has been completed on each of the other sides (S132). More specifically, if the joining operation is not applicable due to a certain problem, the flag for indicating "no coincidence" is set. Therefore, in order to make a judgement as to whether the cause of the setting of the flag lies in an error in setting the document, which interrupts the images from being joined into one image, or lies in a loss of the image occurred during the reading process of the document, a check is made to see if the joining operation has been completed on each of the other sides.

If it is determined at S133 that the joining operation has not been completed on the other sides, it is determined that the setting of the flag is caused by an error in setting the document, and a warning display is given to inform that no joining operation is possible. In contrast, if it is determined at S133 that the joining operation has been completed on each of the other sides, it is determined that the setting of the flag is caused by a loss of the image, and a check is initiated to determine a data-loss area in order to conduct a compensating operation for the loss of data.

In other words, taking account of the joining operation that has been carried out on the rest of the sides except the side on which the loss of image is supposed to exist, the check is made to determine the data-loss area assuming that the position of the image having the data-loss has already been determined in relation to the other images. Firstly, a side to be joined to the side having the data-loss is defined as a first line, and scanning in the sub scanning direction is executed line by line in the main scanning direction until any change appears in the data (S134). Thus, the data-loss area is determined by defining the first line as p as well as defining the line at which a change in the data has first appeared as q (S135).

Figure 23:
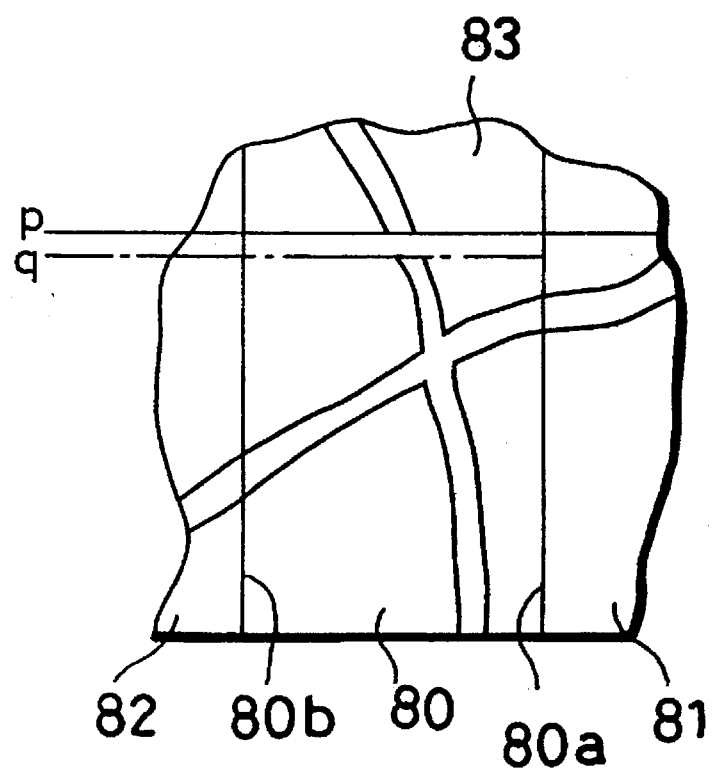
FIG. 23 is a schematic drawing which shows the partial document data in question on which the compensation for loss of data is carried out.

For example, in the case where images shown in FIG. 23 are stored in the image memory 43 as partial document data, partial document data 80 containing a loss of data are positioned in relation to adjacent partial document data 81 and 82 in accordance with sides 80a and 80b having no data-loss. Therefore, the position of partial document data 80 is also determined with respect to partial document data 83 which is placed opposite to the loss of data. Thus, the start line for scanning is given by q (the end of the document data 83) and the line at which a change in the data has first appeared is indicated by p; therefore, it is determined that the data-loss area of the image corresponds to an area between the lines p and q.

Figure 24:
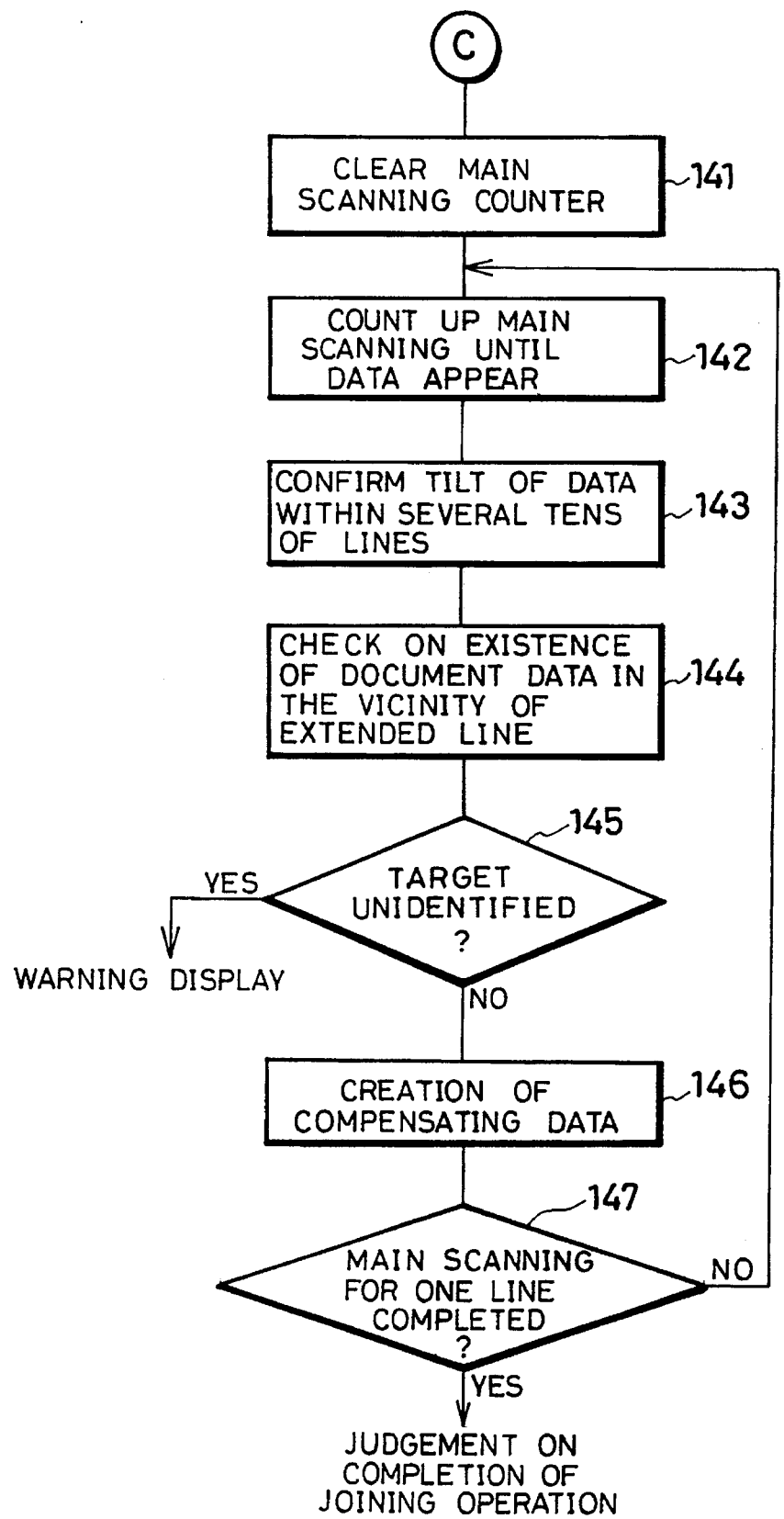
FIG. 24 is a flow chart showing the sequence of processes that are carried out during a compensation for loss of data in the flow chart of FIG. 15.

Next, referring to the flow chart of FIG. 24, an explanation will be given on the creating operation of compensating data for compensating for the data-loss of the images that have been determined as described above.

Firstly, the main scanning counter is initialized (S141), and the main scanning counter counts up to a line where data first appear in the area on which the above judgement has been made, on one of the partial document data (S142). Thus, data, for example, corresponding to several tens of lines are retrieved, and a check is made to see the tilt, etc. thereof (S143). Successively, a check is made to see if any data of the other partial document data are present in the vicinity of an extended line from the data that have been confirmed on the tilt thereof (S144). If no data are present, it is determined that no target is identified (S145), a warning display is given to inform that no joining operation is possible.

In contrast, data are present in the vicinity of the extended line, the judgement is made as "NO" at S145, and compensating data for the data-loss area are created so as to connect the both of the partial document data (S146). The abovementioned steps (S142 through S146) are carried out for one line in the main scanning direction. If it is determined at S147 that the creation of the data has been completed for all the one line in the main scanning direction, the sequence proceeds to the steps for determining the completion of the joining operation.

Figure 25:
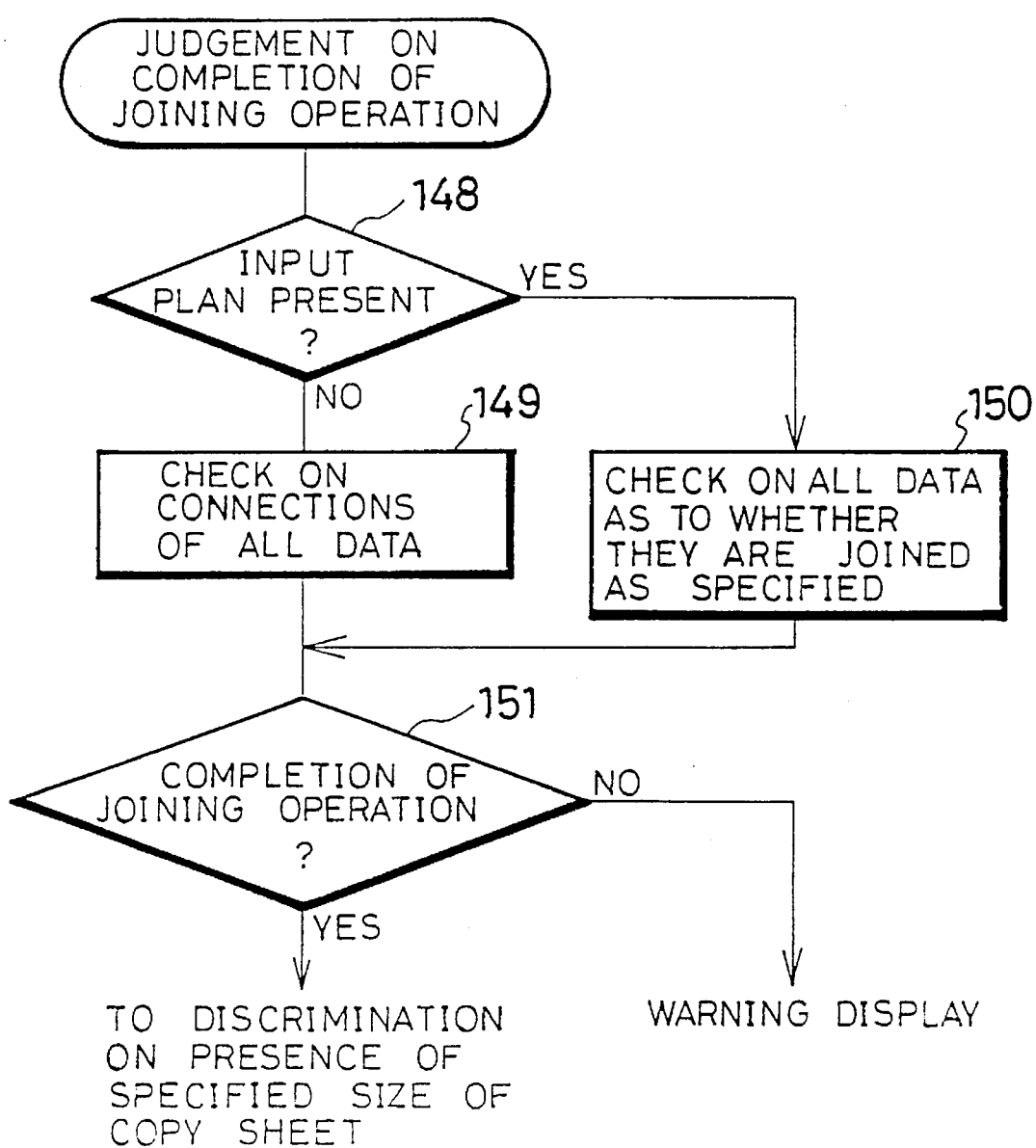
FIG. 25 is a flow chart showing the sequence of processes that are carried out during a judgement as to the completion of all the data processing in the flow chart of FIG. 15.

Referring to the flow chart of FIG. 25, an explanation will be given below on the decision on the completion of the joining operation. If a plan for the joining operation is preliminarily inputted, it determined at S148 that there is an inputted plan, and according to the plan, a check is made to see if all the data are joined together to form one image in the manner as instructed (S149). In contrast, if no plan is specified, a check is made to see if all the data are joined together (S150). Then, if it is determined at S151 that the joining operation has not been completed, a warning display is given to inform that no operation is possible. However if it is determined that the joining operation has been completed, the sequence proceeds to the steps for checking to see if the size of copy sheets has been specified. Thereafter, the aforementioned operations, such as the variable magnification operation, coordinates-converting operation, are carried out, thereby copying the combined image.

Next, referring to an example wherein six documents 85 through 90 shown in FIGS. 26(a) through 26(f) are used, an explanation will be given in detail on the joining operation that is carried out in the order determined in accordance with the amounts of data forming features.

Firstly, images on the documents 85 through 90 are successively read, and after the feature-extracting from the respective partial document data, the amounts of data that are present on the respective sides are compared with one another. Based on the results of these comparisons, the order of the joining operation is determined in accordance with the amounts of data that are present on the respective sides. Thus, in the above case, the joining operation is carried out in the following order: between side $A_1$ of document 86 and side $A_2$ of document 89; side $B_1$ of document 86 and side $B_2$ of document 87; side $C_1$ of document 89 and side $C_2$ of document 90; side $D_1$ of document 87 and side $D_2$ of document 90; side $E_1$ of document 85 and side $E_2$ of document 86; side $F_1$ of document 85 and side $F_2$ of document 88; as well as side $G_1$ of document 88 and side $G_2$ of document 89.

Figure 27:
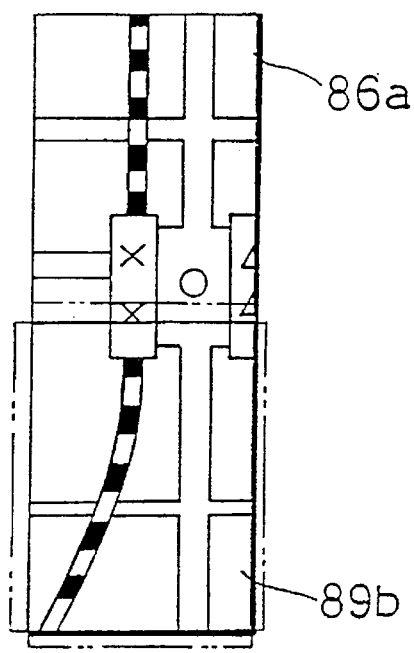
FIG. 27 is a schematic drawing which explains the positioning process of the partial document data in the joining operation.

To begin with, a judgement is made as to the coincidence or non-coincidence of data forming the features between side $A_1$ of document 86 and side $A_2$ of document 89. If the coincidence of the data is found, it is determined that the joining is operable, and the partial document data are arranged so that side $A_1$ and side $A_2$ are aligned side by side with each other. Then, as shown in FIG. 27, the positioning is made so as to get the images connected to each other most smoothly by shifting one partial document data 89b in the main scanning direction or in the sub scanning direction as indicated by alternate long and two short dashes lines in FIG. 27 with the other partial document data 86a maintained in a fixed state, in search for the coincidence of data.

Figure 28:
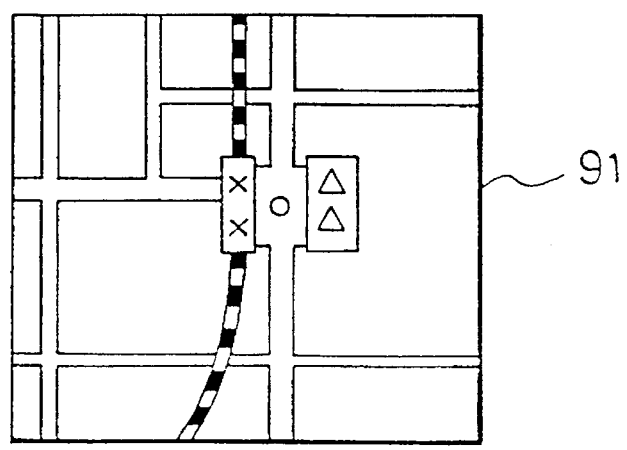
FIG. 28 is a plan view showing a copied image that is obtained by joining the partial document data together.

This operation is successively carried out on the respective sides according to the order that is determined as described above, and a combined image on one sheet is created by joining together the documents 85 through 90 that have been read in a divided manner. Then, the combined image is subjected to predetermined operations such as a variable magnification operation and a conversion of the coordinates, and the combined partial document data are released to the laser driver unit 7, thereby producing a copy 91 as shown in FIG. 28.

As described above, in the digital copying machine 0f the present embodiment, when divided images are joined together to form one combined image, the joining operation is successively carried out beginning with sides that contain the largest amount of data forming features. If a number of documents are used or if a complicated image is used, it will take a lot of time to find out sides whereon the data forming features coincide with each other, and the possibility of error will increase.

However, with the arrangement wherein the joining operation is carried out in succession beginning with sides that contain the largest amount of data, it is possible to shorten time required for recognizing joints, to shorten the processing time to a great extent, and to join images more accurately. Therefore, it becomes possible to improve the efficiency of operation in joining divided images, and to ensure high quality in the images.

[EMBODIMENT 6]

Referring to FIG. 2 as well as FIGS. 29 through 32, the following description will discuss still another embodiment of the present invention. Here, for convenience of explanation, those members that have the same functions and that are described in the aforementioned embodiments are indicated by the same reference numerals and the description thereof is omitted.

Figure 29:
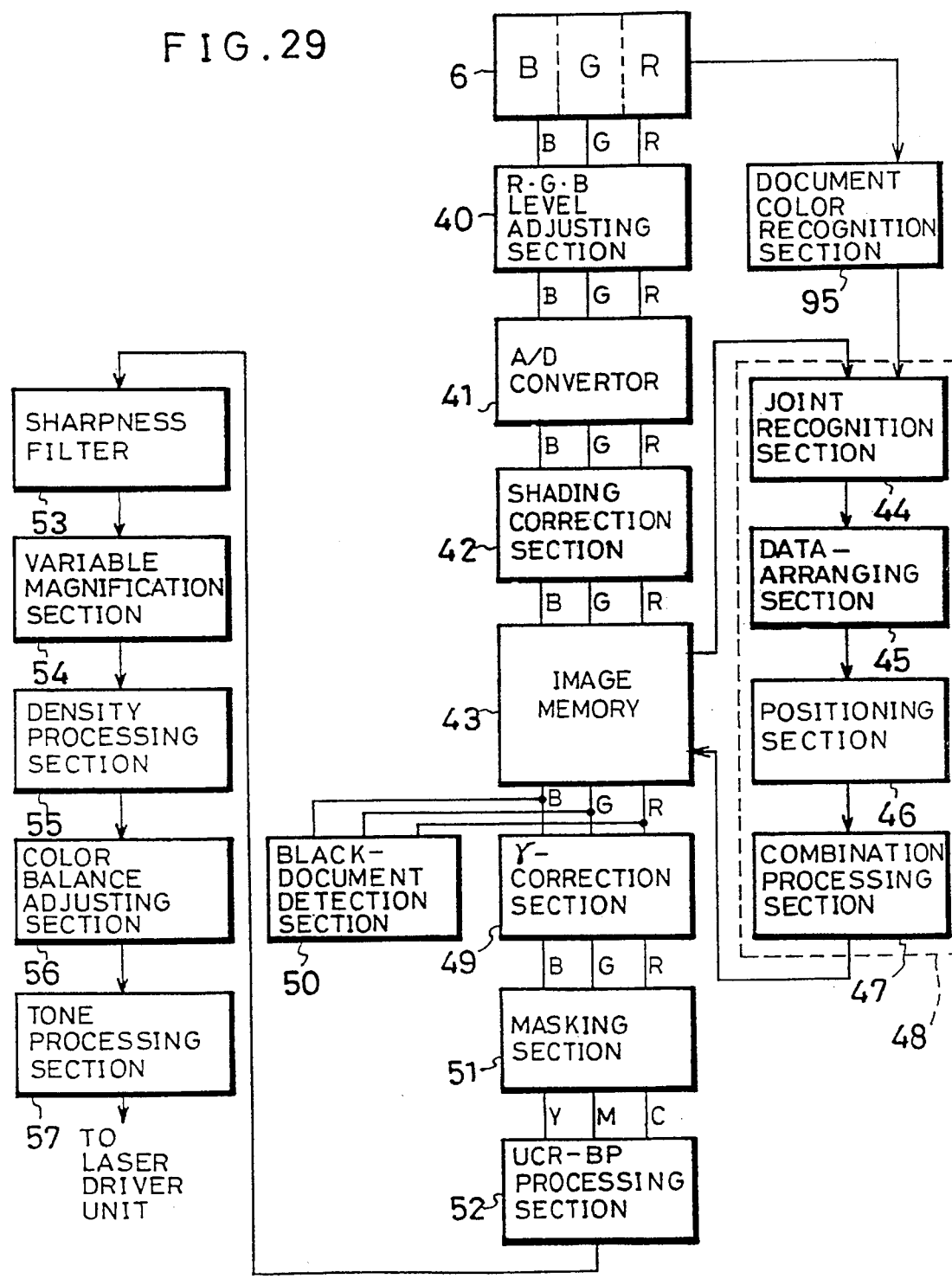
FIG. 29 is a block diagram showing a construction of an image processing system that is installed in a digital copying machine in still another embodiment of the present invention.

As with the digital copying machine described in the aforementioned embodiment 1, a digital copying machine of the present embodiment has a structure shown in FIG. 2. Further, the digital copying machine is provided with an image processing section, which has a construction as shown in FIG. 29. The image processing section has a document-color recognition section 95 (document-color recognition means) for recognizing colors of a document read by the CCD sensor 6. Here, except for the document-color recognition section 95, the construction of the image processing section is the same as that of the image processing section (see FIG. 1) that is provided in the digital copying machine of the aforementioned embodiment 1.

Partial document data read by the CCD sensor 6 are inputted to the image memory 43 through the R, G, B level adjusting section 40, the A/D convertor 41, and the shading correction section 42. Also, the partial document data are inputted from the CCD sensor 6 to the document-color recognition section 95 where the colors of the document are respectively recognized. The subsequent color data obtained from the document-color recognition section 95 are inputted to the joint recognition section 44 in the joint processing section 48 whereto the partial document data from the image memory 43 are inputted.

In this arrangement, when the joint mode is instructed, a plurality of documents are successively scanned, and partial images of the respective documents are read as respective partial document data and subjected to predetermined processing. Thereafter, the partial document data are temporarily stored in the image memory 43, and further sent to the joint recognition section 44. The joint recognition section 44 retrieves data corresponding to predetermined lines from the edges of the partial document,data while comparing the color data from the document-color recognition section 95 with the respective partial document data. Through the retrieving process, the joint recognition section 44 recognizes the arrangements of colors in the vicinity of the edges of the image, thereby recognizing as joints a pair of sides whereon the arrangements of colors coincide with each other between the edges of the image.

After recognizing the joints in accordance with the colors of the partial document data, the various operations such as rearranging, positioning, combining and variable magnification operations are successively carried out, and the images that have been read in a divided manner are joined together to form a combined image on one sheet.

Figure 30A:
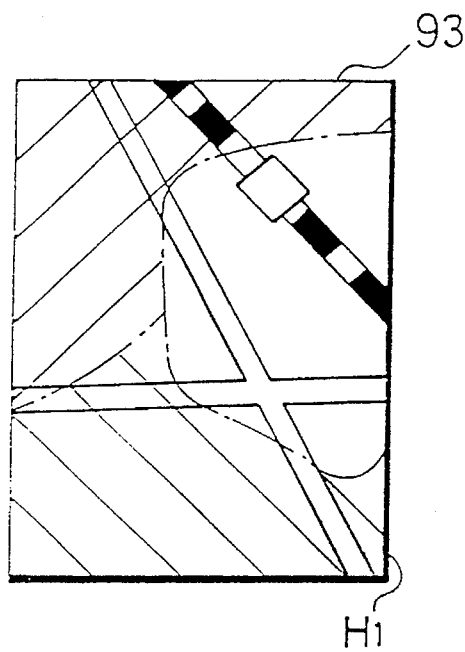
FIGS. 30(a) and 30(b) are plan views showing original documents on which the joining operation is carried out in the digital copying machine.
Figure 30B:
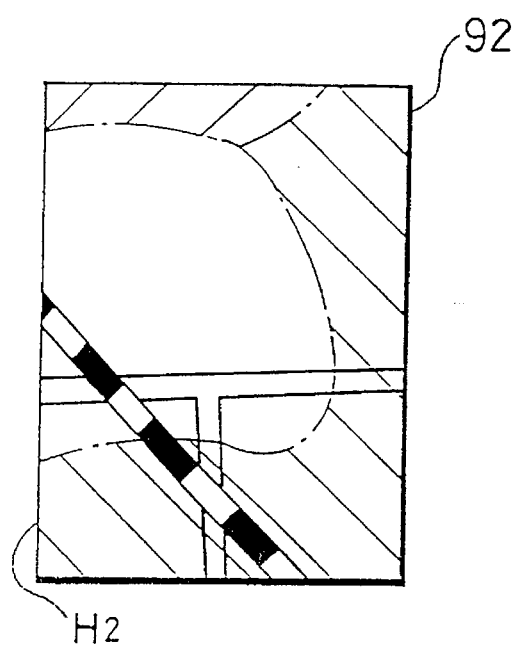

For example, referring to documents 92 and 93 as shown in FIGS. 30(a) and 30(b), an explanation will be given in detail on the joining operation which is carried out in accordance with the colors of the documents, as described above. After documents 92 and 93 have been successively scanned and the partial images of those documents have been read as partial document data, joints are recognized by determining whether or not the arrangements of colors on the documents are almost the same. Here, in the drawings, the difference of colors on the documents is indicated by the directions of hatching. Therefore, it is detected that the color of the upper portion of side $H_1$ in document 93 is the same as that of the upper portion of side $H_2$ in document 92. Also, it is detected that the color of the lower portion of side $H_1$ in document 93 is the same as that of the lower portion of side $H_2$ in document 92. Thus, it is recognized that these sides $H_1$ and $H_2$ can be joined together.

Figure 31:
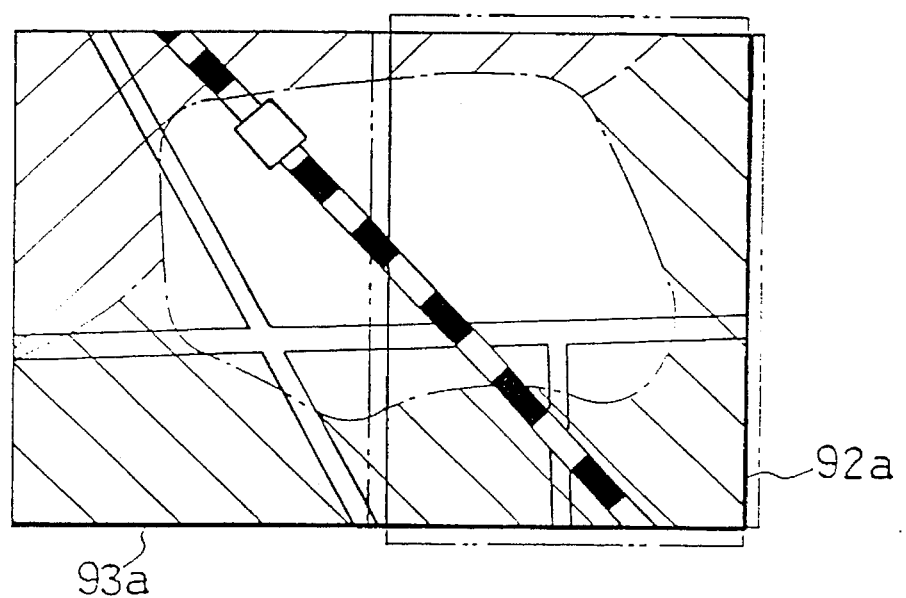
FIG. 31 is a schematic drawing which explains the positioning process of the partial document data in the joining operation.
Figure 32:
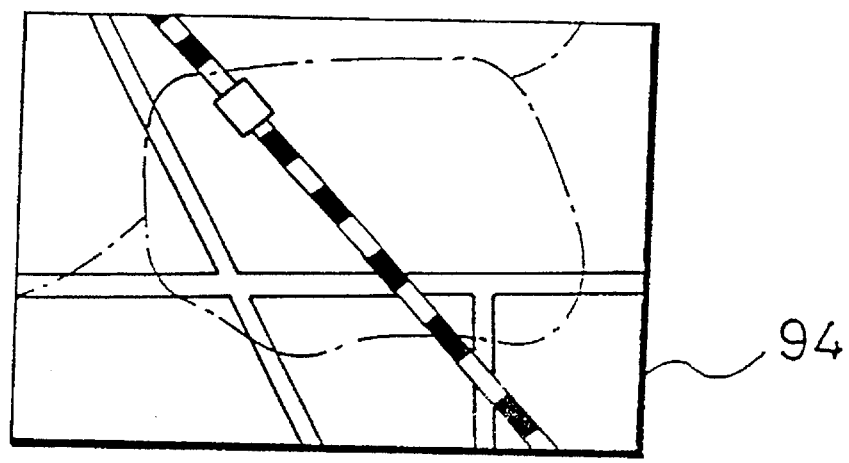
FIG. 32 is a plan view showing a copied image that is obtained by joining the partial document data together.

As illustrated in FIG. 31, after coincidence of the arrangements of colors on sides $H_1$ and $H_2$ is determined, the positioning is made in the image memory 43 so that the color data coincide with each other by shifting one partial document data 92a in the main scanning direction or in the sub scanning direction, as is indicated by alternate long and two short dashes lines in the drawing, with the other partial document data 93a maintained in a fixed state. Thereafter, the predetermined operations are carried out in the same manner as described in the aforementioned embodiment 1, and the variable magnification operation, conversion of the coordinates, etc. are carried out, if necessary. Then, the subsequent combined document data are released to the laser driver unit 7, thereby producing a copy 94 on one sheet as shown in FIG. 32.

As described above, in the digital copying machine in the present embodiment, the document-color recognition section 95 is provided in the image processing section, and the joining operation is carried out based on the color data of documents that have been recognized in the document-color recognition section 95. Therefore, even in the case of using a number of documents, it is possible to shorten time required for the operation and to ensure an accurate joining operation by preventing errors. Thus, it becomes possible to improve the efficiency of the operation and to enhance the quality of the images.

[EMBODIMENT 7]

Figure 15:
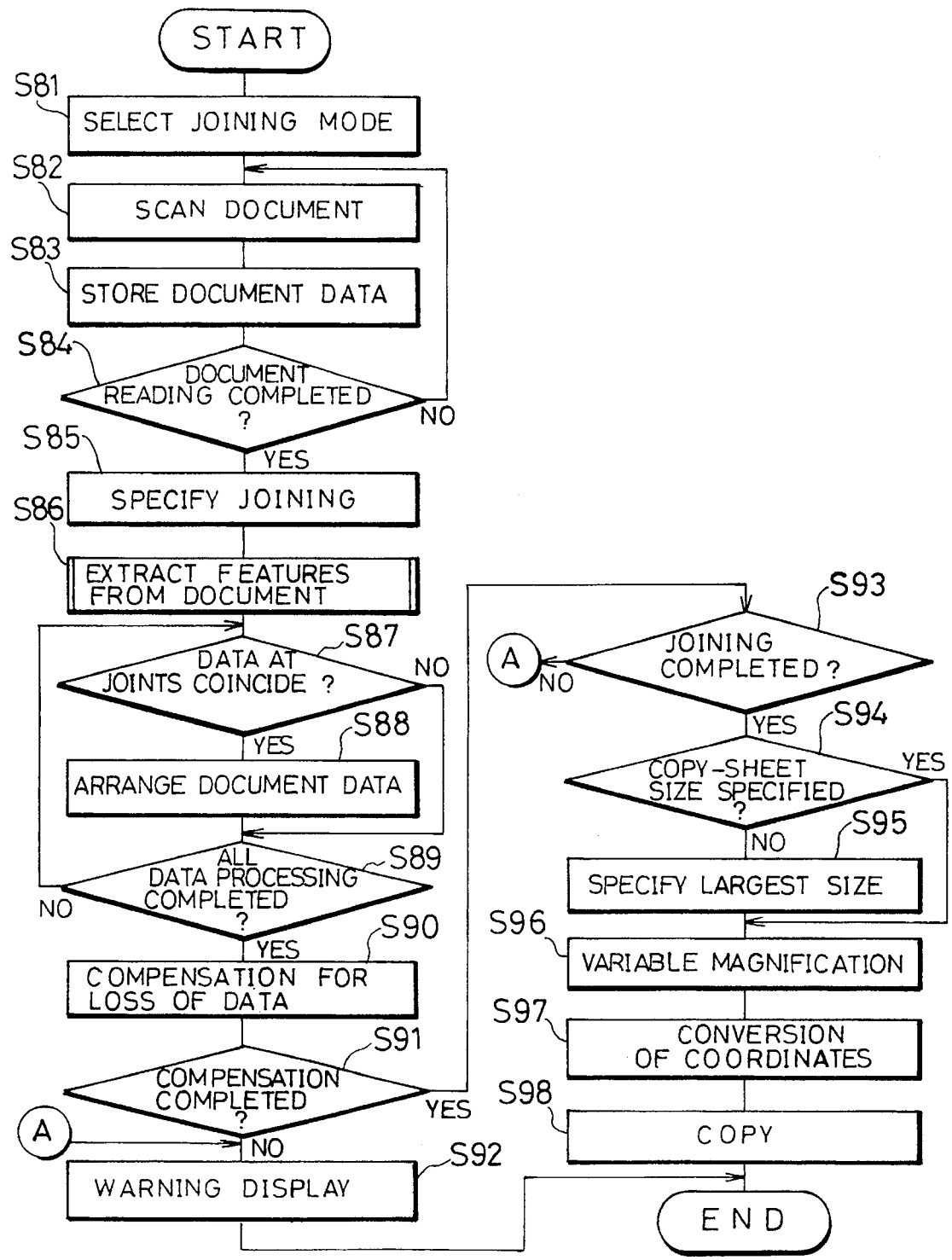
FIG. 15 is a flow chart showing the sequence of processes that are carried out during a joining operation on partial document data in the digital copying machine of still another embodiment of the present invention.

Referring to FIG. 2, FIG. 15, and FIG. 21 as well as FIGS. 33 through 36, the following description will discuss still another embodiment of the present invention. Here, for convenience of explanation, those members that have the same functions and that are described in the aforementioned embodiments are indicated by the same reference numerals and the description thereof is omitted.

Figure 33:
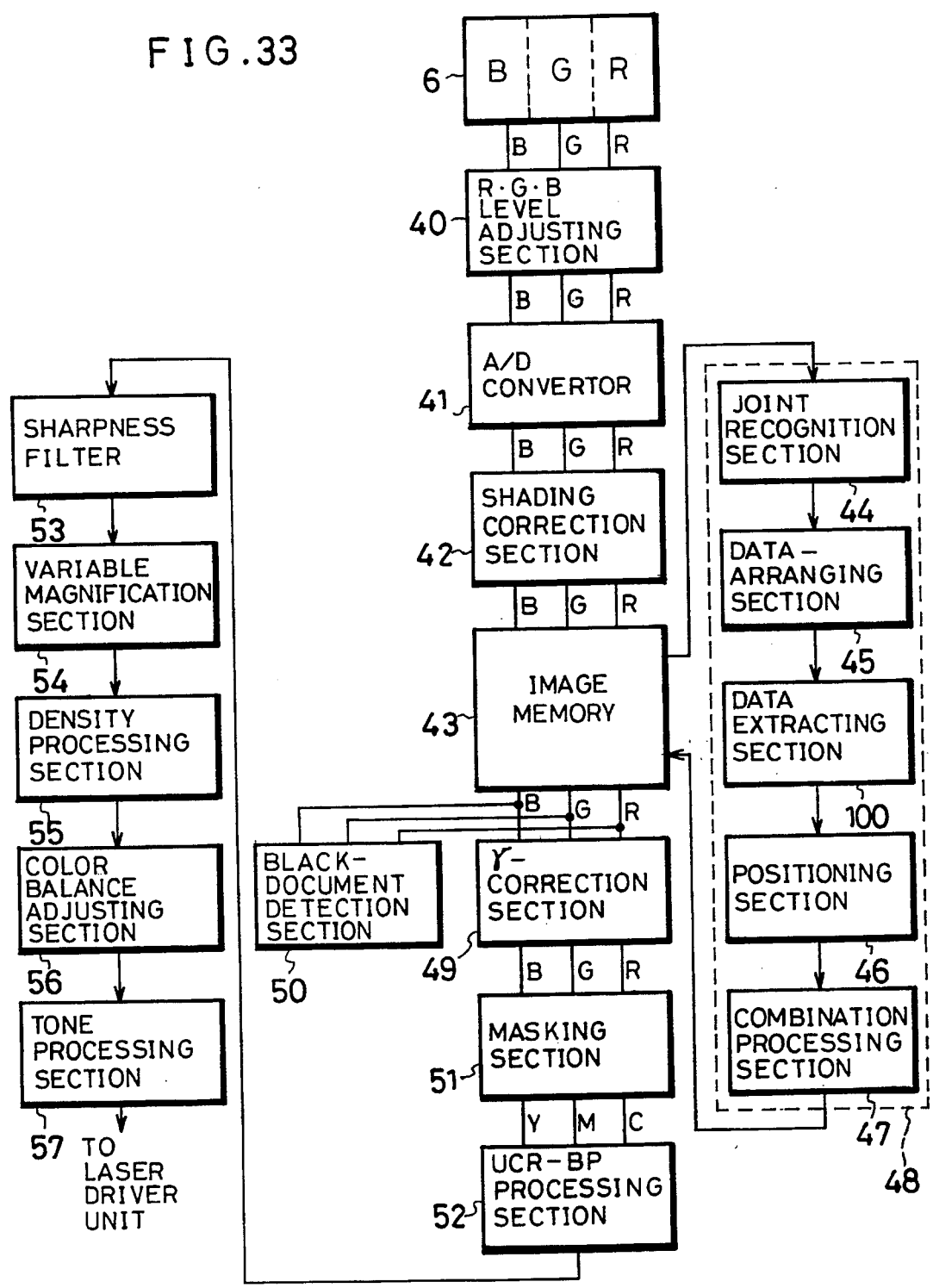
FIG. 33 is a block diagram showing a construction of an image processing system that is installed in a digital copying machine in still another embodiment of the present invention.

As with the digital copying machine described in the aforementioned embodiment 1, a digital copying machine of the present embodiment has a structure shown in FIG. 2. Further, the digital copying machine is provided with an image processing section, which has a construction as shown in FIG. 33. The joint-portion processing section 48 in this image processing section has an image-data extracting section 100 that is installed between the data-arranging section 45 and the positioning section 46. The image-data extracting section 100 extracts image data that lie in a direction orthogonal to the joints of respective partial document data. Here, except for the image-data extracting section 100, the construction of the image processing section is the same as that of the image processing section (see FIG. 1) that is provided in the digital copying machine of the aforementioned embodiment 1.

In this image processing section, partial document data, which are inputted to the joint-portion processing section 48 from the image memory 43, are first sent to the joint recognition section 44. Here, features are extracted from the respective partial document data, and joints in the documents are recognized based on the extracted features. The partial document data, from which the joints have been recognized, are arranged in the data arranging section 45 so that the joints at which the data forming the features coincide with each other are placed side by side with each other. Then, in the image-data extracting section 100, image data that lie in a direction orthogonal to the joints are extracted from the partial document data in order to carry out the positioning. Thereafter, the partial document data are positioned in the positioning section 46 so that their shapes and images coincide with each other at the joints, and the subsequent partial document data are combined together in the combination processing section 47.

Further, if there are shadow data due to shadows on the documents that appeared upon reading the images at the joints on the partial document data that have been stored in the image memory 43, the range of the shadow data is recognized by the combination processing section 47, and the shadow data is erased. The partial document data that have been subjected to the processing in the joint-portion processing section 48 are again inputted to the image memory 43.

Moreover, as with the digital copying machine of the aforementioned embodiment 5, the digital copying machine of the present embodiment carries out the joining operation following the sequence of processes as shown in the flow chart of FIG. 15, thereby forming one image by joining together a plurality of documents. However, the digital copying machine of the present invention differs from the digital copying machine of the aforementioned embodiment 5 in that upon positioning the partial document data which have been rearranged so that the joints are placed side by side with each other, the image data lying in a direction orthogonal to the joints on the partial document data are extracted.

In the above-mentioned digital copying machine, a quick joining operation shown in FIG. 34(c) is available by the use of the joint processing section 48, for example, with respect to partial document data 101 and 102 having divided images from one image as shown in FIG. 34(a).

Referring to an example wherein two partial document data 101 and 102, shown in FIG. 34(a), are stored in the image memory 43 in the digital copying machine of the present embodiment, an explanation will be given hereinbelow on the feature-extracting process of the respective partial document data 101 and 102 in accordance with the flow chart of FIG. 35. Firstly, one side of the image is selected from one document first scanned (S161), and an area corresponding to predetermined lines from the end of the selected side, for example, corresponding to several tens of lines inward from the end, is specified as a feature-extraction area (S162). In this area, a selection is made to find a best-suited method for making the features clear among methods using the arrangement, pattern, and color tone of the data depending on the image in question, and features are extracted from the side of the image in question (S163). The features thus extracted are digitized and stored (S164). Successively, one side of the image is selected from the other document secondly scanned (S165), and the feature-extraction area is specified in the same manner as the former image (S166), thereby carrying out the feature-extracting operation on the image (S167).

Here, an explanation will be given on the feature-extracting operation more specifically. From the periphery of the two partial document data 101 and 102, shown in FIG. 34(a), data corresponding to predetermined lines (indicated by an area enclosed by a broken line in the drawing) are retrieved, and sides 101a and 102a whereon image data present are detected depending on the presence or absence of image data.

Here, the feature-extraction area which is discussed in the present invention is not limited to one place; the place and number of the feature-extraction area are different depending on the contents of the documents in question. In this operation, it is desirable if there are feature-extraction areas in the central portion and both of the end portions of the side in question. Further, the central portion and both of the end portions of the side, portions containing images that are different from those of the surrounding portions, and image data portions having distinct differences in density are preferentially extracted as the features.

After the features are extracted from the respective partial document data 101 and 102 as described above, the features extracted from both of the partial document data 101 and 102 are compared with each other, thereby determining the coincidence or non-coincidence of the data. Here, in the feature-comparing process, features of data corresponding to the rear side of the document first scanned are firstly compared with features of data corresponding to the leading side of the document next scanned. Then, if those data do not coincide with each other, features of data corresponding to the rest of the sides are compared, on demand.

In this operation, assuming it is highly possible that the partial document data 101 and 102 are read in a state, for example, as shown in FIG. 34(a), the features are compared beginning with sides which have a high possibility of data coincidence. Therefore, even in a case different from the above case using two documents to form one image, that is, in the case using a plurality of documents to form one image by joining them together, wherein the joining operations have to be conducted on the other sides, the feature-comparing process is readily conducted on the other sides. This thereby makes it possible to conduct the joining operations more quickly.

Figure 36A:
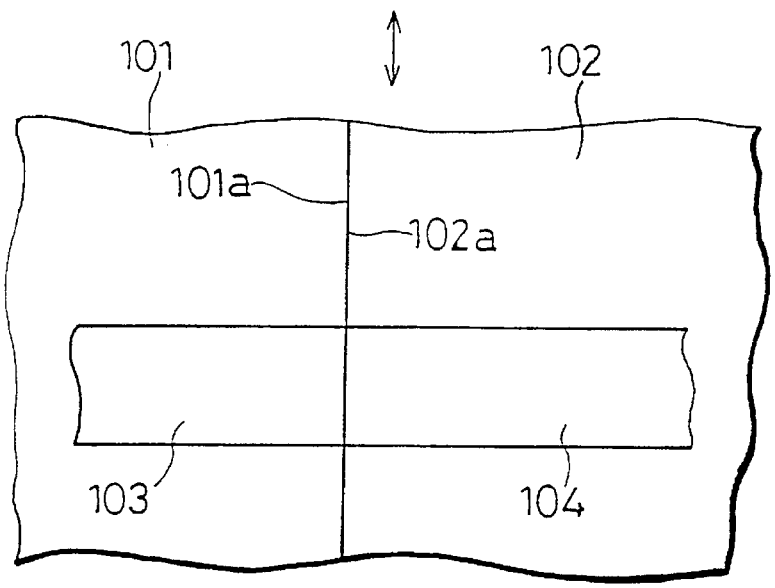
FIG. 36(a) is a schematic drawing which shows a state wherein positioning is made on the partial document data by the use of image data that lie in a direction orthogonal to the joints.

After it is determined that the data coincide with each other, the positioning is carried out on the partial document data 101 and 102. More specifically, as shown in FIG. 34(b), the partial document data 102 is shifted in an up and down direction with the partial document data 101 maintained in a fixed state. At this time, as shown in FIG. 36(a) the image-data extracting section 100 extracts image data 103 and 104 that lie in a direction orthogonal to the joints of the respective partial document data 101 and 102, that is, the seams between the sides 101a and 102a as features. Then, the positioning is made on the partial document data 101 and 102 based on the image data 103 and 104.

Figure 36B:
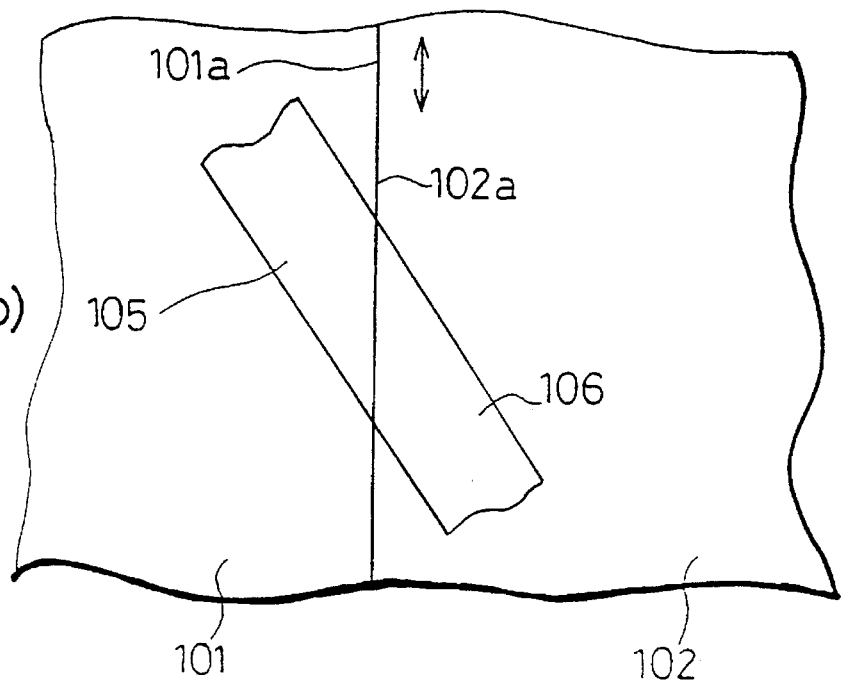
FIG. 36(b) is a schematic drawing which shows a state wherein positioning is made by the use of image data that have a slant angle with respect to the joints.

As described above, in comparison with the case where image data 105 and 106 that lie in a direction diagonal to the seams of the sides 101a and 102a are extracted during the positioning, for example, as shown in FIG. 36(b), this case, where the image data 103 and 104 that lie in a direction orthogonal to the seams of the sides 101a and 102a are used for the positioning, makes the change of image data clearer. This makes it possible to perform the positioning of the partial document data more accurately in a short time.

Next, the positioning is made by shifting the partial document data 102 in a right and left direction with the partial document data 101 maintained in a fixed state based on the image data 103 and 104 forming the features. Here, if the image data 105 and 106 in the diagonal direction have been extracted, the shift in the right and left direction will again cause offsets in an up and down direction. This results in a problem that the positioning has to be conducted repeatedly.

In the present embodiment, since the image data 103 and 104 that lie in a direction orthogonal to the joints are extracted for use in the positioning, the position in the up and down direction remains unchanged even if the shift is made in the right and left direction. Therefore, with this arrangement wherein the image data 103 and 104 that lie in a direction orthogonal to the joints are extracted as the features, when the positioning of the partial document data is made in a right and left direction, it is possible to make the positioning only at one time. Thus, it becomes possible to perform the positioning of the partial document data 101 and 102 more accurately in a short time. Thereafter, the partial document data 101 and 102 having been subjected to the positioning are jointed together to form a combined document data 107 as shown in FIG. 34(d) through the processes that are carried out in the image processing section 47.

Additionally, during the above-mentioned combining operation of the partial document data 101 and 102, the shape of documents and the features of images are extracted by recognizing lines, characters and image data, as described earlier. Therefore, based on these data, data other than the data indicating the shape of documents and the features of images, that is, data other than the data of the lines, characters and images, are erased through the processes in the image processing section 47 as shadow data produced by the edges of the documents. Thus, shadows that would appear at the joints of the documents are erased.

Next, a judgement is made as to whether or not the data processing of all the partial document data stored in the image memory 43 has been completed. Here, if no plan for the joining operation is specified, that is, if partial document data are randomly inputted, a check is made to see if the joining operation is being carried out on the four sides in the partial document data. Additionally, in this case where the document data are randomly inputted, it is determined that the sides on which no coincidence of the features is found are sides merely forming the ends of images, and the joining operation is successively carried out on the other sides.

Here, referring to FIG. 21, an explanation will be given on this in detail. For example, if four images a through d are randomly inputted as document data, judgements as to the coincidence or non-coincidence of the data are made twelve times in the total number: [4 (sheets)×4 (times)−4 (sides, where the coincidence is found)=12]. As a result, the joining operation is carried out on each of the pairs of sides $a_4$ and $b_3$, $b_2$ and $d_1$, $a_2$ and $c_1$, as well as $c_4$ and $d_3$, while flags for indicating "no coincidence" are set for the other eight sides merely including the ends of images ($a_1$, $a_3$, $b_1$, $b_4$, $c_2$, $c_3$, $d_2$ and $d_4$).

After completion of all the data processing as described above, if any flags indicating "no coincidence" are found at any portions other than the ends of images, a compensating operation for the loss of data is carried out. After completion of the compensating operation, if it is determined that the joining operation has been completed, the predetermined variable magnification operation, conversion of the coordinates, copying operation, etc. are carried out.

As described above, in the digital copying machine of the present embodiment, the images on the partial documents are read by the scanner unit 22, and stored in the image memory 43 individually as the partial document data 101 and 102. In the joint-portion processing section 48, joints are recognized from the partial document data 101 and 102 stored in the image memory 43, and the positioning section 46 positions the partial document data 101 and 102 by shifting both of the data in a parallel and vertical direction with respect to the joints so that the partial documents are joined together.

Further, upon positioning the partial document data 101 and 102, the image-data extracting section 100 extracts the image data 103 and 104 that lie in a direction orthogonal to the joints of the respective partial document data 101 and 102. Therefore, the positioning is made so that the image data 103 and 104 in the orthogonal direction coincide with each other. In comparison with the case where the image data 105 and 106 that have a slant angle with respect to the joints are extracted during the positioning, and used for the positioning by shifting them in a parallel and vertical direction, this arrangement makes the change of data clearer during the positioning.

Therefore, since the positioning of the partial document data 101 and 102 is carried out more effectively by the use of less image data, it becomes possible not only to accurately join together the documents read in a divided manner without causing any adverse effects on its efficiency, but also to shorten the time of the joining operation by reducing the amount of information.

[EMBODIMENT 8]

Referring to FIGS. 2, 15, 37, and 38, the following description will discuss still another embodiment of the present invention. Here, for convenience of explanation, those members that have the same functions and that are described in the aforementioned embodiments are indicated by the same reference numerals and the description thereof is omitted.

Figure 37:
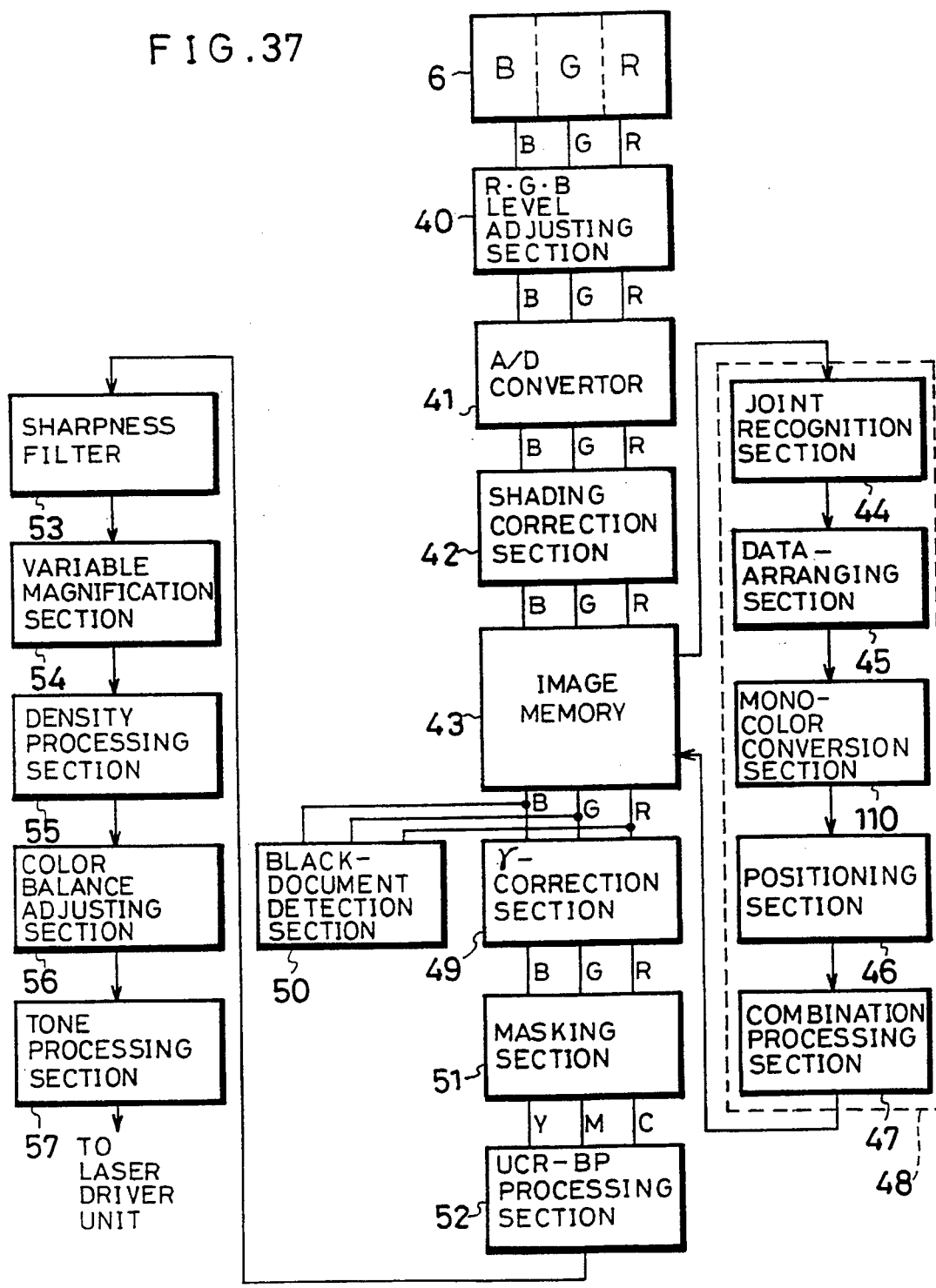
FIG. 37 is a block diagram showing a construction of an image processing system that is installed in a digital copying machine in still another embodiment of the present invention.
Figure 38:
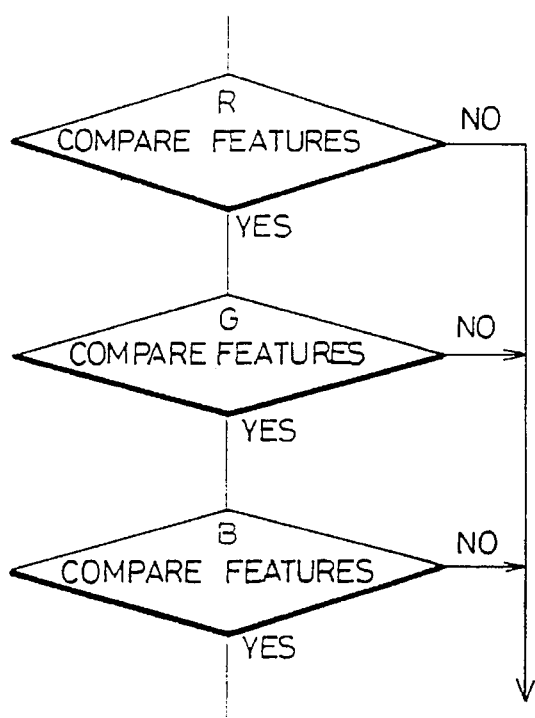
FIG. 38(a) is a schematic drawing which explains a feature-extracting process by the use of color document data.
FIG. 38(b) is a schematic drawing which explains a feature-extracting process by the use of mono-color document data.
Figure 38:
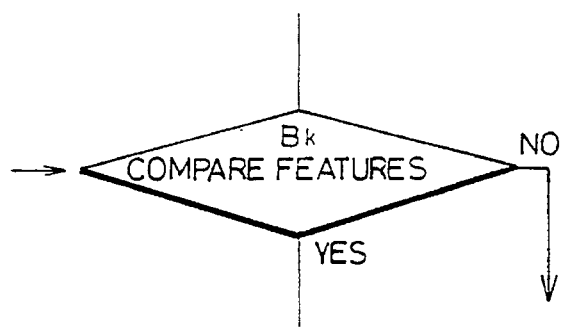

As with the digital copying machine described in the aforementioned embodiment 1, a digital copying machine of the present embodiment has a structure shown in FIG. 2. Further, the digital copying machine is provided with an image processing section, which has a construction as shown in FIG. 37. The joint-portion processing section 48 in this image processing section has a mono-color conversion section 110 that is installed between the data-arranging section 45 and the positioning section 46. The mono-color conversion section 110 converts color document data of R, G, B into mono-color document data. Further, in the image processing section, the black-document detection section 50 has a function as a black-document discrimination means, which makes a discrimination as to whether the partial document data stored in the image memory 43 are mono-color document data or color document data. Here, except for the mono-color conversion section 110, the construction of the image processing section is the same as that of the image processing section (see FIG. 1) that is provided in the digital copying machine of the aforementioned embodiment 1.

Moreover, as with the digital copying machine of the aforementioned embodiment 5, the digital copying machine of the present embodiment forms one combined image from a plurality of documents by carrying out a joining operation in accordance with the sequence shown by the flow chart of FIG. 15. However, the digital copying machine of the present embodiment is different from that of the aforementioned embodiment 5 in that the joint-portion processing section 48 carries out the positioning on the partial document data based on the mono-color document data that are obtained by converting the color document data in the mono-color conversion section 110.

Upon positioning the partial document data, the black-document detection section 50 first makes a discrimination as to whether the partial document data in question stored in the image memory 43 are mono-color document data or color document data. If the discrimination is made in the black-document detection section 50 that the data in question are color document data, the mono-color conversion section 110 in the joint-portion processing section 48 converts the color document data into mono-color document data. The mono-color document data thus converted are stored in the image memory 43.

In the aforementioned embodiments, features are extracted from each of the color document data, R, G, B, as shown in FIG. 38(a), and the judgement is made as to the coincidence or non-coincidence of the data by comparing those features. For this reason, as the amount of data increases, the processing time of the joining operation increases.

However, as illustrated in FIG. 38(b), in the joint-portion processing section 48 of the present embodiment, which is provided with the mono-color conversion section 110, the color document data, R, G, are converted into mono-color document data $B_K$ by the mono-color conversion section 110. Therefore, it is possible to make the judgement as to the coincidence or non-coincidence of the data by using only the mono-color document data.

Therefore, since the positioning of the partial document data is carried out more effectively by the use of less image data, it becomes possible not only to accurately join together the documents read in a divided manner without causing any adverse effects on its efficiency, but also to shorten the time of the joining operation by reducing the amount of information.

[EMBODIMENT 9]

Figure 34:
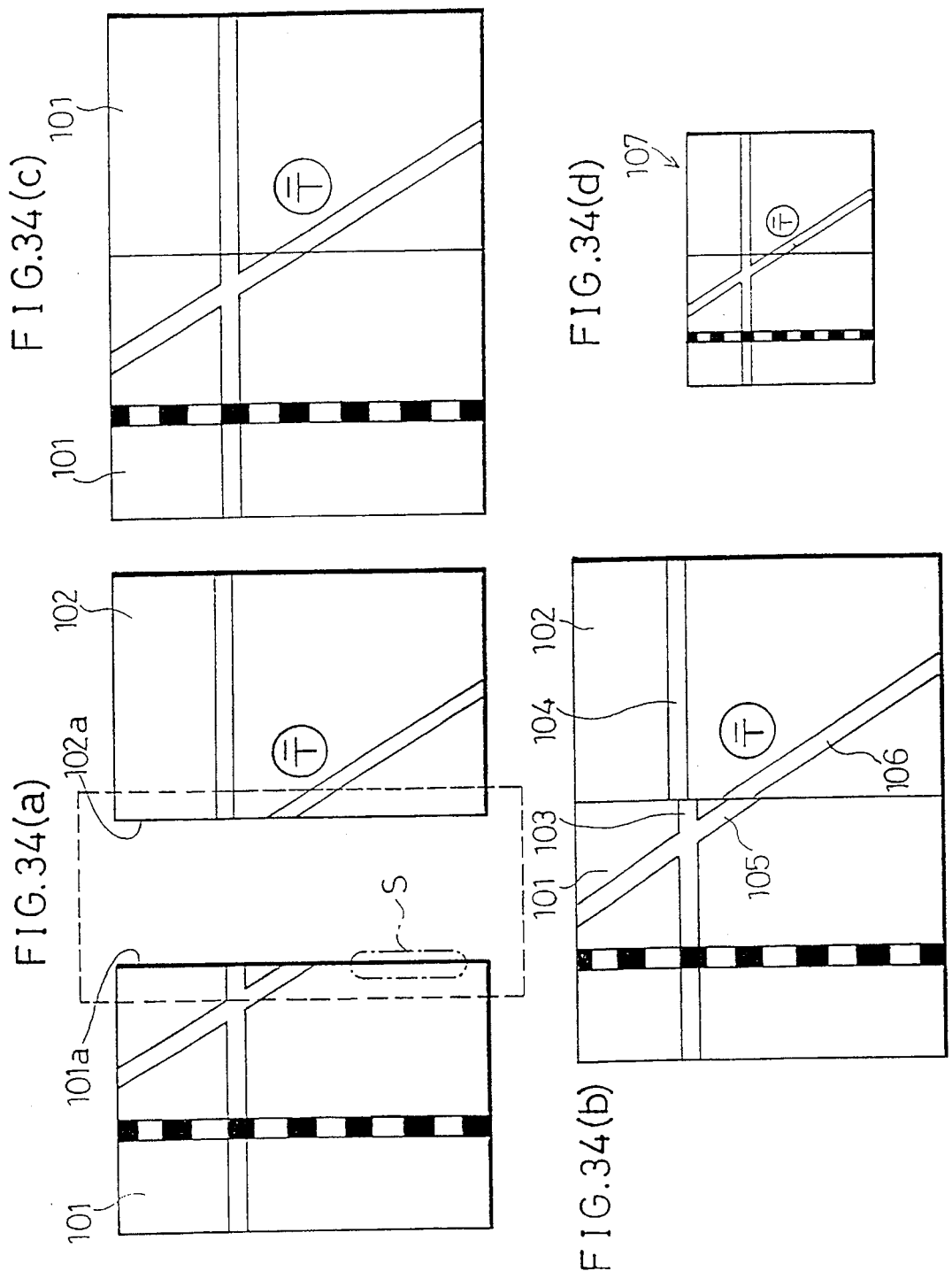
FIG. 34(a) is a schematic drawing which shows partial document data stored in the image memory of the image processing system.
FIG. 34(b) is a schematic drawing which shows a state wherein positioning is made by extracting image data that lie in a direction orthogonal to the joints.
FIG. 34(c) is a schematic drawing which shows the image data after the positioning has been completed.
FIG. 34(d) is a schematic drawing which shows a reduced state of the document data that have been joined together.
Figure 35:
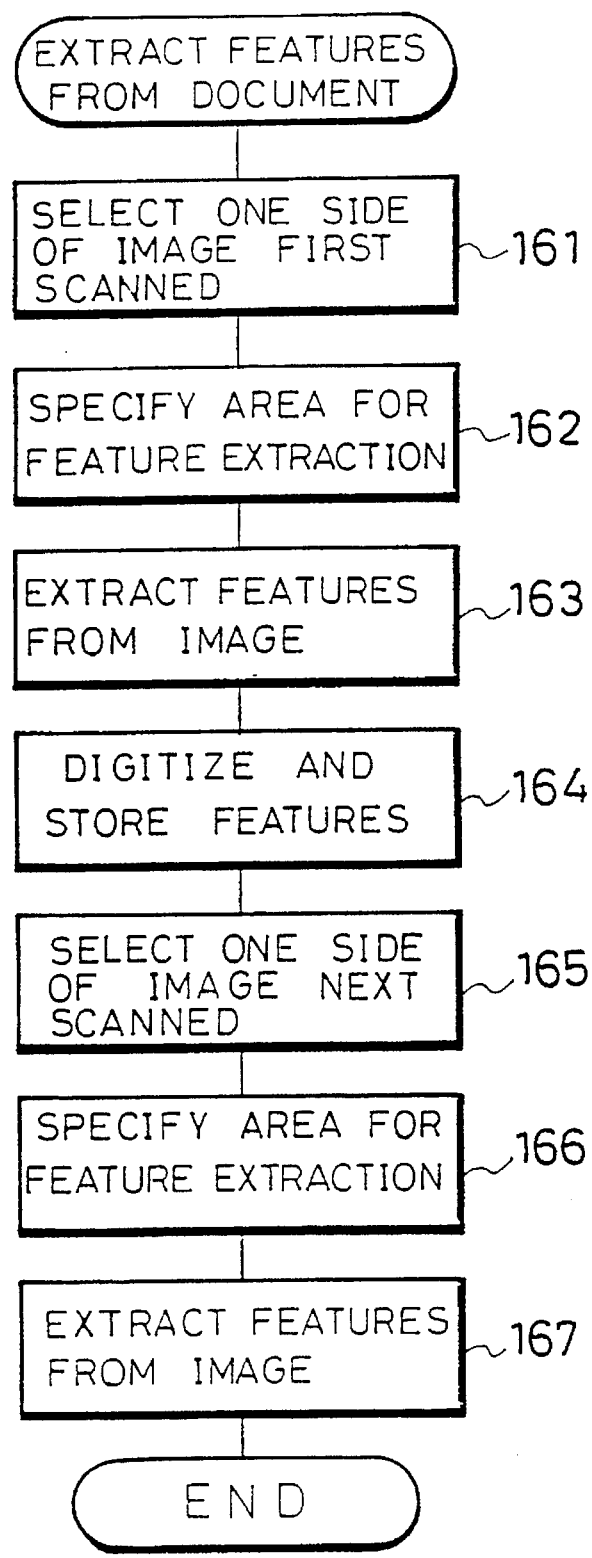
FIG. 35 is a flow chart showing the sequence of processes that are carried out during a data extraction on each side of the partial document data in the operation shown in the flow chart of FIG. 15.

Referring to FIGS. 2, 15, and 34 as well as FIGS. 39 through 42, the following description will discuss still another embodiment of the present invention. Here, for convenience of explanation, those members that have the same functions and that are described in the aforementioned embodiments are indicated by the same reference numerals and the description thereof is omitted.

Figure 39:
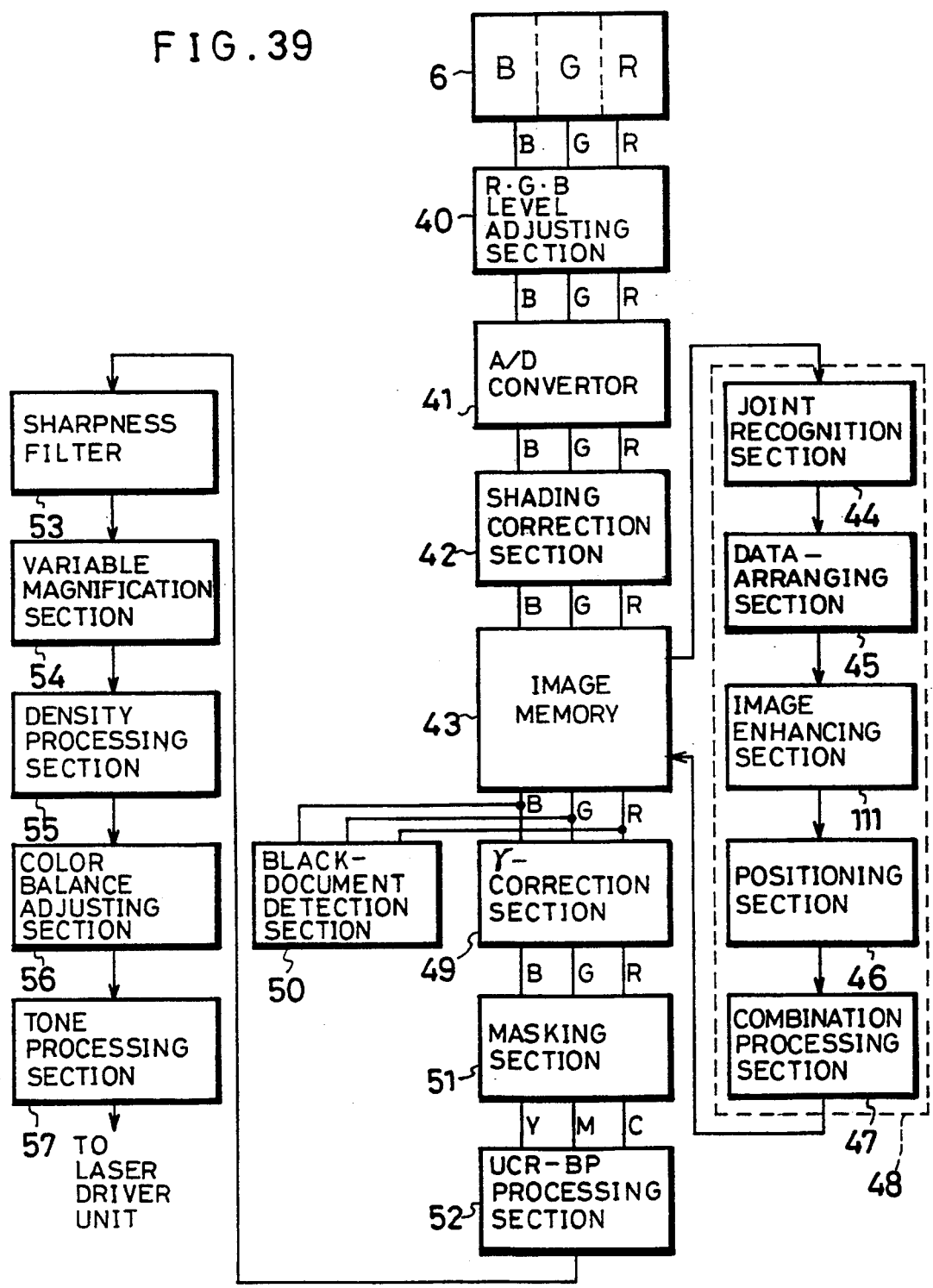
FIG. 39 is a block diagram showing a construction of an image processing system that is installed in a digital copying machine in still another embodiment of the present invention.

As with the digital copying machine described in the aforementioned embodiment 1, a digital copying machine of the present embodiment has a structure shown in FIG. 2. Further, the digital copying machine is provided with an image processing section, which has a construction as shown in FIG. 39. The joint-portion processing section 48 in this image processing section has an image enhancing section 111 which is installed between the data-arranging section 45 and the positioning section 46. The image enhancing section 111 carries out a compensating operation for edges on image data that exist at joints in the partial document data. Here, except for the image enhancing section 111, the construction of the image processing section is the same as that of the image processing section (see FIG. 1) that is provided in the digital copying machine of the aforementioned embodiment 1.

Moreover, as with the digital copying machine of the aforementioned embodiment 5, the digital copying machine of the present embodiment forms one combined image from a plurality of documents by carrying out a joining operation in accordance with the sequence shown by the flow chart of FIG. 15. However, the digital copying machine of the present embodiment, to which the image enhancing section 111 is added, makes it possible to form good images even in the case of conducting a joining operation on original half-tone documents such as photographs.

Figure 40A:
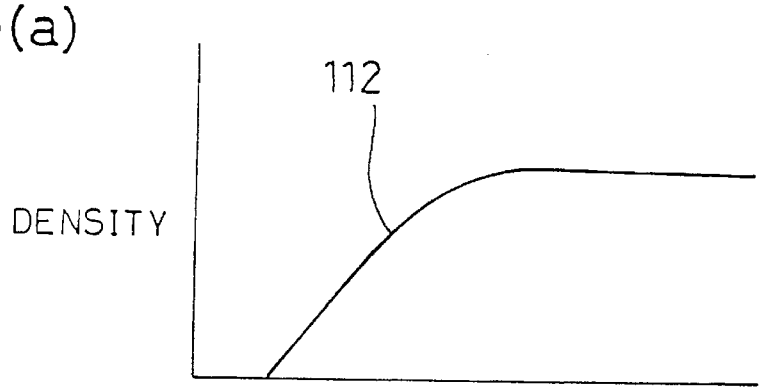
FIG. 40(a) is a graph which shows the change in density on the edges of partial document data before the application of an image-enhancing process.

In other words, partial document data that have been read are subjected to the shading correction and the diffused-portion correction in the shading correction section 42. Therefore, in the case of using original half-tone documents such as photographs, the density distribution of images on the partial document data after the corrections is shown in FIG. 40(a). In FIG. 40(a), since a portion of the waveform corresponding to an edge 112 on the image forms a gentle slope, the position of the edge 112 is indistinct. Therefore, if a joining operation is carried out in this condition, the positioning of the partial document data is not conducted appropriately. Further, in the case of conducting the joining operation accurately by using analog density values with this slope remaining unsolved, since it is necessary to provide predetermined calculating processes, the processing time will be prolonged.

Figure 40B:
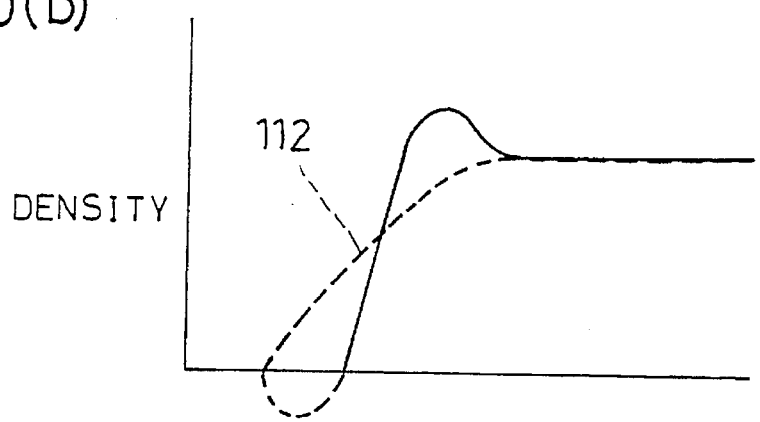
FIG. 40(b) is a graph which shows the change in density on the edges of the partial document data after the image-enhancing process has been made by highlighting the edges.

Therefore, in order to solve this problem, the image enhancing section 111 further emphasizes the edge-emphasizing operation that has been given by the normal data correction, and as shown in FIG. 40(b), increases the degree of slope of the edge 112 to an extent where the edge 112, which corresponds to a changing point in data, is subject to under shoot or over shoot. Thus, since it is possible to make the edge 112 of the image clearer and to conduct the positioning within an appropriate range of densities, the positioning can be performed more accurately and the processing time can be shortened.

An explanation will be given below in detail on the effects of such an edge-emphasizing operation that is provided by the image enhancing section 111. When an area S (enclosed by an alternate long and short dashes line) within the side 101a on the partial document data 101, for example, shown in FIG. 34(a), is enlarged, the state of change in density at the area S is shown in FIG. 41(a). At the edge 112, since the density changes in a moderate fashion, the image is formed in a diffused state. Therefore, supposing that the error during reading at a point in a certain density level (the dispersion due to noise, etc.) is $\Delta v$, the area on the partial document data wherein the density of image lies within $\Delta v$ is given by $\Delta l_1$. In other words, in the edge 112, the dispersion of position caused on the image is $\Delta l_1$ with respect to the error during reading of $\Delta v$.

However, after the image enhancing section 111 has conducted the edge-emphasizing operation on the edge 112, the dispersion of position caused on the image becomes $\Delta l_2$ with respect to the error during reading of $\Delta v$, as shown in FIG. 41(b). Therefore, the dispersion of position caused on the image can be reduced with respect to $\Delta v$ by the use of the edge-emphasizing operation. As a result, it is possible to reduce the diffused portion on the image. Therefore, as shown in FIG. 34(c), the positioning is performed more accurately in a short time.

Moreover, as another method for enhancing image on the edge 112, a differential operation may be adopted in the image enhancing section 111.

Figure 40C:
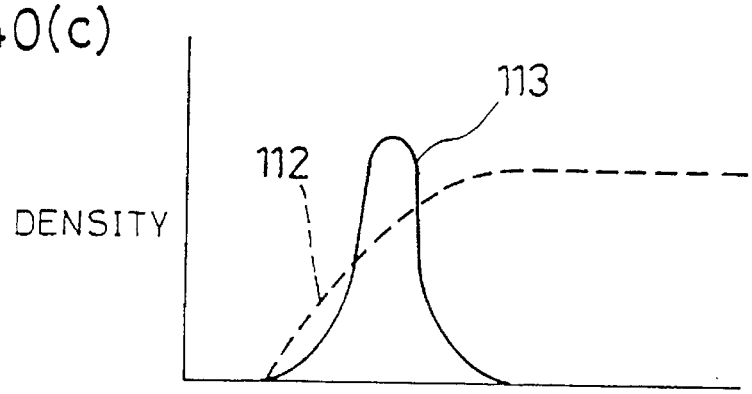
FIG. 40(c) is a graph which shows the change in density on the edges of the partial document data after the image-enhancing process has been made by means of a differential processing.

More specifically, when the differential operation is conducted on the edge 112, one raised portion 113 is formed as shown in FIG. 40(c). Therefore, as shown in FIG. 42, outline data 118 and 119 are formed from the image data 116 and 117 of the partial document data 114 and 115 by detecting the raised portion 113. Since it is possible to make the edges of image clearer by the use of these outline data 118 and 119, the positioning is performed within an appropriate range of densities. Consequently, the positioning can be performed more accurately on the partial document data 114 and 115, and the processing time can be shortened.

This operation will be explained hereinbelow more specifically. The area S shown in FIG. 34(a), that is, the edge 112 shown in FIG. 41(a), is subjected to the differential operation in the image enhancing section 111, thereby forming an outline as shown in FIG. 41(c). That is, the dispersion of position caused on the image becomes $\Delta l_3$ with respect to the error during reading of $\Delta v$, as shown in FIG. 41(c). Therefore, the dispersion of position caused on the image can be reduced with respect to $\Delta v$, and it becomes possible to reduce the diffused portion on the image. This arrangement makes it possible to distinguish border portions that lie between the presence and absence of image data, and a combined image, as shown in FIG. 34(c), can be obtained more accurately through the positioning for a short time.

In the digital copying machine of the present embodiment, upon positioning image data of half-tone images such as photographs, the image enhancing section 111, which is installed in the joint-portion processing section, conducts image enhancing operations, such as an edge-density enhancing operation and an out-line data formation by the use of the differential operation, on image data that lie in the vicinity of joints. As a result, it becomes possible to make borders of image data clearer, and the positioning is carried out more accurately.

Therefore, since the positioning of the partial document data is carried out more effectively by the use of less image data, it becomes possible not only to accurately join together the documents read in a divided manner without causing any adverse effects on its efficiency, but also to shorten the time of the joining operation by reducing the amount of information.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for joining together a plurality of partial document data in an image processing apparatus, comprising the steps of:

reading a plurality of partial images in succession;

storing each of the read partial images as respective partial document data in a storage device;

obtaining specific image data containing features from the partial document data by retrieving the partial document data stored in the storage device;

selecting a pair of partial document data, an order of selection being determined by an amount of specific image data, such that partial document data containing a relatively largest amount of specific image data are selected first;

comparing the specific image data of each of the pair of selected partial document data;

recognizing joints of the pair of partial document data based upon coincidence of the specific image data; and positioning the respective partial document data in accordance with the recognized joints.

2. The method of claim 1, wherein the step of selecting a pair of partial document data includes selection of two partial document data containing substantially equal amounts of specific image data.

3. The method of claim 2, further comprising the step of:

repeatedly selecting pairs of partial document data, each pair including substantially equal amounts of specific image data, wherein pairs of partial image data are sequentially selected from among the plurality of stored partial image data, wherein partial image data containing relatively largest amounts of specific image data are sequentially selected, and repeatedly positioning the respective selected partial document data in accordance with the recognized joints to form an image from the plurality of partial document data.

4. An image processing apparatus comprising:

input means for reading a plurality of images of a plurality of documents, in succession;

storage means for storing each of the plurality of images of the plurality of documents as respective partial document data, the plurality of documents being successively scanned by the input means and stored by the storage means at a time when the image processing apparatus is set into a joint-portion processing mode, each of the images of the plurality of documents being a partial image of a whole image obtainable by joining the plurality partial images in a non-overlapping manner; and joint-portion processing means for extracting features, of images appearing on edges of the plurality of documents as specific image data, from the partial document data according to a method corresponding to the images, for selecting partial document data corresponding to a pair of documents among the plurality of documents in an order determined by an amount of specific image data such that a pair of documents including partial document data containing a relatively largest amount of specific image data are selected first, and for joining the selected partial document data, wherein the joint-portion processing means repeatedly performs selection and joining of the remaining ones of the plurality of documents.

5. The image processing apparatus of claim 4, wherein the joint-portion processing means comprises:

joint recognition means for recognizing joints of the partial document data by retrieving the selected partial document data and determining coincidence of the specific image data of the selected partial document data;

data-arranging means for arranging the selected partial document data so that a pair of the recognized joints are aligned side by side;

positioning means for positioning the selected partial document data so that images at the joints coincide; and combination processing means for combining the selected partial document data after positioning.

6. The image processing apparatus as defined in claim 5, wherein the joint recognition means includes a joint recognition section which detects edge data corresponding to a predetermined area of the partial document data by retrieving the partial document data, and which recognizes joint portions by comparing the detected edge data with edge data detected from other partial document data.

7. The image processing apparatus as defined in claim 5, wherein the positioning means includes a positioning section which positions the partial document data to join images on two of the partial document data together by shifting one of the partial document data relative to another partial document data.

8. The image processing apparatus as defined in claim 5, wherein the positioning means includes a positioning section which positions the partial document data to join images on two of the partial document data together by shifting one of the partial document data relative to another partial document data in a main scanning direction and in a sub scanning direction.

9. The image processing apparatus as defined in claim 4, further comprising:

variable magnification means for variably magnifying the joined document data after the joining operation in accordance with the largest size of a recording medium whereon the image of the original document is formed.

10. The image processing apparatus as defined in claim 9, wherein the variable magnification means includes a variable magnification section which, if a size of a recording medium whereon an image is formed is not specified, selects a recording medium of the largest size among recording medium that are prestored in the image processing apparatus and variably magnifies the joined document data after the joining operation in accordance with the size of the selected recording medium.

11. The image processing apparatus as defined in claim 5, wherein the positioning means comprises a positioning section for, when the joint recognition means recognizes that specific image data of partial document data corresponding to the pair of documents do not coincide with each other, rotating partial document data corresponding to one of the pair of documents by 180 degrees.

12. The image processing apparatus of claim 4, wherein the joint-portion processing means includes an image processing section which discriminates a data-loss area of image proximate to a joint portion, caused upon scanning the image through an input means based on a positional relationship of the respective partial document data that have been set through the positioning, and which forms data for compensating in the data-loss area in accordance with divided images to be joined together.

13. The image processing apparatus of claim 4, wherein the joint portion processing means selects partial document data corresponding to a pair of documents containing substantially equal amounts of specific image data.

14. An image processing apparatus comprising:

input means for scanning a plurality of partial images to thereby read an image of an original document that is a composite image of the plurality of partial images and that is separately unscannable as a whole;

storage means for storing the respective plurality of partial images as respective partial document data, the partial images having been scanned by the input means; and joint-portion processing means for recognizing reference data in response to an output of the input means, for using the recognized reference data to retrieve joint portions of the partial document data stored in the storage means, for using the recognized reference data to recognize the joint portions, and for positioning the respective partial document data in accordance with the recognized joint portions, wherein the plurality of partial images are on partial documents, the reference data are marks indicating joint portions that have been preliminarily included on the respective partial documents and the joint-portion processing means detects the joint portions in accordance with the marks, the marks being a predetermined color and after having joined the partial document data together, the joint-portion processing means removes the marks from the respective partial document data using a predetermined color-omitting operation.

15. An image processing apparatus comprising:

input means for scanning a plurality of partial images to thereby read an image of an original document that is a composite image of the plurality of partial images and that is separately unscannable as a whole;

storage means for storing the respective plurality of partial images as respective partial document data, the partial images having been scanned by the input means; and joint-portion processing means for recognizing reference data in response to an output of the input means, for using the recognized reference data to retrieve joint portions of the partial document data stored in the storage means, for using the recognized reference data to recognize the joint portions, and for positioning the respective partial document data in accordance with the recognized joint portions, wherein the plurality of partial images are on partial documents, the reference data are numbers that have been preliminarily included on the partial documents and the joint-portion processing means detects joint portions that coincide among the partial document data, in accordance with the numbers, the numbers being a predetermined color and after having joined the partial document data together, the joint-portion processing means removes the numbers from the respective partial document data using a predetermined color-omitting operation.

* * * * *